United States Patent
Ma et al.

(10) Patent No.: US 8,406,525 B2
(45) Date of Patent: Mar. 26, 2013

(54) RECOGNITION VIA HIGH-DIMENSIONAL DATA CLASSIFICATION

(75) Inventors: Yi Ma, Champaign, IL (US); Allen Yang Yang, Berkeley, CA (US); John Norbert Wright, Urbana, IL (US); Andrew William Wagner, Urbana, IL (US)

(73) Assignees: The Regents of the University of California, Oakland, CA (US); The Board of Trustees of the University of Illinois, Urbana, IL (US)

( * ) Notice: Subject to any disclaimer, the term of this patent is extended or adjusted under 35 U.S.C. 154(b) by 275 days.

(21) Appl. No.: 12/865,639

(22) PCT Filed: Jan. 29, 2009

(86) PCT No.: PCT/US2009/032413
§ 371 (c)(1),
(2), (4) Date: Nov. 29, 2010

(87) PCT Pub. No.: WO2009/134482
PCT Pub. Date: Nov. 5, 2009

(65) Prior Publication Data
US 2011/0064302 A1    Mar. 17, 2011

Related U.S. Application Data

(60) Provisional application No. 61/025,039, filed on Jan. 31, 2008.

(51) Int. Cl.
*G06K 9/66* (2006.01)
(52) U.S. Cl. .................. 382/191; 382/159; 704/236

(58) Field of Classification Search .................. 382/191, 382/159
See application file for complete search history.

(56) References Cited

U.S. PATENT DOCUMENTS

| | | | |
|---|---|---|---|
| 7,328,111 B2 | 2/2008 | Porikli | |
| 8,073,287 B1 * | 12/2011 | Wechsler et al. | 382/278 |
| 2002/0057838 A1 | 5/2002 | Steger | |
| 2003/0161504 A1 | 8/2003 | Inoue | |
| 2004/0091137 A1 | 5/2004 | Yoon et al. | |
| 2005/0238200 A1 | 10/2005 | Gupta et al. | |
| 2007/0258645 A1 | 11/2007 | Gokturk et al. | |

FOREIGN PATENT DOCUMENTS

| | | |
|---|---|---|
| WO | 2006034256 A2 | 3/2006 |
| WO | WO 2006/034256 A2 | 3/2006 |

OTHER PUBLICATIONS

Wang, Shuang; "Vehicle Identification via Sparse Representation", Dec. 2010; "http://www.osti.gov/eprints/topicpages/documents/record/521/5439245.html".*

(Continued)

*Primary Examiner* — Samir Ahmed
*Assistant Examiner* — Totam Le
(74) *Attorney, Agent, or Firm* — John P. O'Banion

(57) ABSTRACT

A method is disclosed for recognition of high-dimensional data in the presence of occlusion, including: receiving a target data that includes an occlusion and is of an unknown class, wherein the target data includes a known object; sampling a plurality of training data files comprising a plurality of distinct classes of the same object as that of the target data; and identifying the class of the target data through linear superposition of the sampled training data files using $l^1$ minimization, wherein a linear superposition with a sparsest number of coefficients is used to identify the class of the target data.

22 Claims, 34 Drawing Sheets

OTHER PUBLICATIONS

Donoho, David; "For Most Large Underdetermined Systems of Equations, the Minimal L1-norm Near Solution Approximates the Sparsest Near Solution"; Aug. 2004, Department of Statistics, Standford University.*

State Intellectual Property Office, P.R. China, related Chinese patent application No. 200980000494.0, First Office Action issued May 3, 2012 (pp. 1-4), English translation (pp. 5-12), with claims (pp. 13-29), counterpart to PCT/US2009/032413, claiming priority to U.S. Appl. No. 61/025,039, pp. 1-29.

Swedish Patent Office, Supplemental International Search Report issued on Dec. 18, 2009, including claims searched, related PCT International Patent Application No. PCT/US2009/032413, pp. 1-21.

Wright, J. et al.—"Robust Face Recognition via Sparse Representation" —IEEE Trans. on Pattern Analysis and Machine Intelligence, vol. 31, No. 2, Feb. 2009, pp. 1-17.

Achlioptas, Dimitris, "Database-friendly random projections: Johnson-Lindenstrauss with binary coins," *Journal of Computer and System Sciences* 66:671-687 (2003).

Amaldi, Edoardo, et al., "On the approximability of minimizing nonzero variables or unsatisfied relations in linear systems," *Theoretical Computer Science* 209:237-260 (1998).

Baraniuk, Richard G., et al., "Random Projections of Smooth Manifolds," Foundations of Computational Mathematics, 9(1):51-77 (2009).

Baraniuk, Richard, et al., "A simple proof of the restricted isometry property for random matrices," Constructive Approximation, 28(3):253-263 (2008).

Basri, Ronen, et al., "Lambertian Reflectance and Linear Subspaces," *IEEE Transactions on Pattern Analysis and Machine Intelligence* 25(2):218-233 (Feb. 2003).

Belhumeur, Peter N., et al., "Eigenfaces vs. Fisherfaces: Recognition Using Class Specific Linear Projection," *IEEE Transactions On Pattern Analysis and Machine Intelligence* 19(7):711-720 (Jul. 1997).

Bickel, Peter J., et al., "Regularization in Statistics," *Test* 15(2):271-344 (2006).

Bingham, Ella, et al., "Random projection in dimensionality reduction: Applications to image and text data," Proceedings of the seventh ACM SIGKDD, (2001).

Candés, Emamnuel J., "Compressive sampling," Proceedings of the International Congress of Mathematicians, Madrid, Spain, 1433-1452 (2006).

Candés, Emamnuel, et al., "Near Optimal Signal Recovery From Random Projections: Universal Encoding Strategies?" IEEE Transactions on Information Theory, 52(12):5406-5424 (2006).

Candés, Emamnuel, et al., "Stable Signal Recovery from Incomplete and Inaccurate Measurements," *Communications on Pure and Applied Mathematics* 59(8):1207-1223 (Aug. 2006).

Chen, Scott Shaobing, et al., "Atomic Decomposition by Basis Pursuit," *SIAM Review* 43(1):129-159 (Mar. 2001).

Donoho, David L., et al., "Counting Faces of Randomly-Projected Polytopes When the Projection Radically Lowers Dimension," Journal of the AMS, 22(1), 1-53 (2009).

Donoho, David L., et al., "Fast Solution of $l_1$-norm Minimization Problems When the Solution May be Sparse," *Preprint*, 45 pages (Oct. 2006).

Donoho, David L., et al., "For Most Large Underdetermined Systems of Equations, the Minimal $l_1$-norm Near-Solution Approximates the Sparsest Near-Solution," Communications on Pure and Applied Mathematics, 59(7), 907-934 (2006).

Donoho, David L., "Aide-Memoire. High-Dimensional Data Analysis: The Curses and Blessings of Dimensionality," AMS Lecture on Math Challenges of $21^{st}$ Century, (Aug. 8, 2000).

Donoho, David L., "Neighborly Polytopes and Sparse Solution of Underdetermined Linear Equations," *Preprint*, 21 pages (Dec. 2004).

Fern, Xiaoli Zhang, et al., "Random Projection for High Dimensional Data Clustering: A Cluster Ensemble Approach," *Proceedings of the Twentieth International Conference on Machine Learning* (ICML-2003), Washington DC, 8 pages (2003).

Georghiades, Athinodoros S., et al., "From Few to Many: Illumination Cone Models for Face Recognition under Variable Lighting and Pose," *IEEE Transactions on Pattern Analysis and Machine Intelligence* 23(6): 643-660 (Jun. 2001).

Heisele, Bernd, et al., "A Component-based Framework for Face Detection and Identification," *International Journal of Computer Vision* 74(2):167-181 (2007).

He, Xiaofei, et al., "Face Recognition Using Laplacianfaces," *IEEE Transactions on Pattern Analysis and Machine Intelligence* 27(3):328-340 (Mar. 2005).

Ho, Jeffrey, et al., "Clustering Appearances of Objects Under Varying Illumination Conditions," *Proceedings of the 2003 IEEE Computer Society Conference on Computer Vision and Pattern Recognition* (CVPR'03), 8 pages (2003).

Kaski, Samuel, "Dimensionality Reduction by Random Mapping: Fast Similarity Computation and Clustering," *Proceedings of 1998 IEEE International Joint Conference on Neural Networks* (IJCNN'98), Anchorage, Alaska, 6 pages (May 1998).

Kim, Jongsun, et al., "Effective Representation Using ICA for Face Recognition Robust to Local Distortion and Partial Occlusion," *IEEE Transactions on Pattern Analysis and Machine Intelligence* 27(12):1977-1981 (Dec. 2005).

Lee, Daniel D., et al., "Learning the parts of objects by non-negative matrix factorization," *Nature* 401:788-791 (Oct. 1999).

Lee, Kuang-Chih, et al., "Acquiring Linear Subspaces for Face Recognition under Variable Lighting," *IEEE Transactions on Pattern Analysis and Machine Intelligence* 27(5):1-15 (May 2005).

Li, Stan Z., et al., "Learning Spatially Localized, Parts-Based Representation," Proceedings of the IEEE Conference on Computer Vision and Pattern Recognition, 207-212 (2001).

Liu, Chengjun, "Capitalize on Dimensionality Increasing Techniques for Improving Face Recognition Grand Challenge Performance," *IEEE Transactions on Pattern Analysis and Machine Intelligence* 28(5):725-737 (May 2006).

Martinez, Aleix, et al., "The AR Face Database," url: http://www2.ece.ohio-state.edu/~aleix/ARdatabase.html, 10 pages (Jun. 1998).

Mutch, Jim, et al., "Multiclass Object Recognition with Sparse, Localized Features," *Proceedings of the 2006 IEEE Computer Society Conference on Computer Vision and Pattern Recognition* (CVPR'06), 8 pages (2006).

Phillips, P. Jonathon, et al., "FRVT 2006 and ICE 2006 Large-Scale Results," *National Institute of Standards and Technology* (NISTIR 7408), Gaithersburg, MD, 56 pages (Mar. 2007).

Savvides, M., et al., "Partial & Holistic Face Recognition on FRGC-II data using Support Vector Machine Kernel Correlation Feature Analysis," *Proceedings of the 2006 Conference on Computer Vision and Pattern Recognition Workshop* (CVPRW'06), 6 pages (2006).

Sharon, Yoav, et al., "Computation and Relaxation of Conditions for Equivalence between $I_1$ and $I_0$ Minimization," UIUC Technical Report UILU-ENG-Jul. 2008, 2008.

Shashua, Amnon, et al., "The Quotient Image: Class-Based Re-Rendering and Recognition with Varying Illuminations," *IEEE Transactions on Pattern Analysis and Machine Intelligence* 23(2):129-139 (Feb. 2001).

Sinha, Pawan, et al., "Face Recognition by Humans: Nineteen Results All Computer Vision Researchers Should Know About," *Proceedings of the IEEE* 94(11):1948-1962 (Nov. 2006).

Turk, Matthew, et al., "Eigenfaces for Recognition," *Journal of Cognitive Neuroscience* 3(1):71-86 (1991).

Wang, Haitao, et al., "Generalized Quotient Image," *Proceedings of the 2004 IEEE Computer Society Conference on Computer Vision and Pattern Recognition* (CVPR'04), 8 pages (2004).

Wikipedia, "k-nearest neighbor algorithm," retrieved Mar. 15, 2011, from http://en.wikipedia.org/wiki/K-nearest_neighbor_algorithm, 5 pages (Nov. 24, 2007).

Wright, John, et al., "Robust Face Recognition via Sparse Representation," IEEE Transactions on Pattern Analysis and Machine Intelligence, 31(2), 210-227 (Feb. 2009).

Yang, Ming-Hsuan, "Kernel Eigenfaces vs. Kernel Fisherfaces: Face Recognition Using Kernel Methods," Proceedings of the Fifth IEEE International Conference on Automatic Face and Gesture Recognition (FGR'02), pp. 215-220 (2002).

NG, Andrew, "Feature Selection, L1 vs. L2 regularization, and rotational invariance," ICML, 20 pages (2004).

Porikli, Fatih, "Inter-Camera Color Calibration Using Cross-Correlation Model Function," Proceedings of 2003 IEEE International Conference on Image Processing, vol. 2, On page(s): II-133-6 vol. 3, 4 pages (Sep. 2003).

Russell, Richard, et al., "Perceptually-based Comparison of Image Similarity Metrics," Massachusetts Institute of Technology, 13 pages (Jul. 2001).

Wright, John, et al., "Robust Face Recognition via Sparse Representation," Manuscript Revised for IEEE Trans. Pami, 48 pages (Jan. 2008).

Written Opinion and International Search Report for corresponding International Application No. PCT/US2009/032413, 7 pages (Nov. 24, 2009).

Wright, J. et al.—"Manuscript Revised for IEEE Trans. PAMI, Jan. 2008. Robust Face Recognition via Sparse Representation", published online Mar. 26, 2008, pp. 1-48.

* cited by examiner

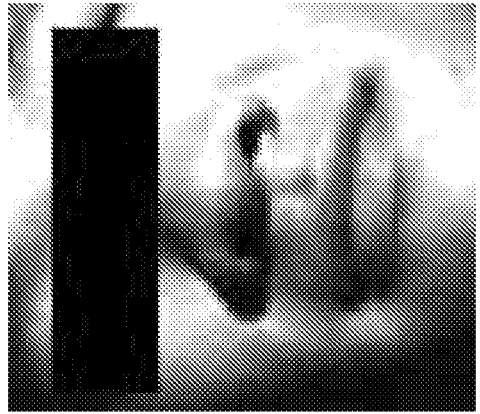
FIG. 13C
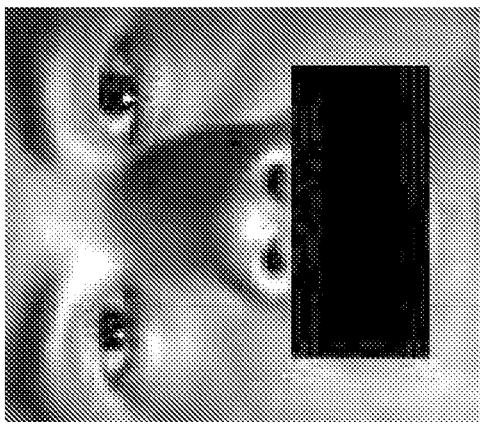
FIG. 13B
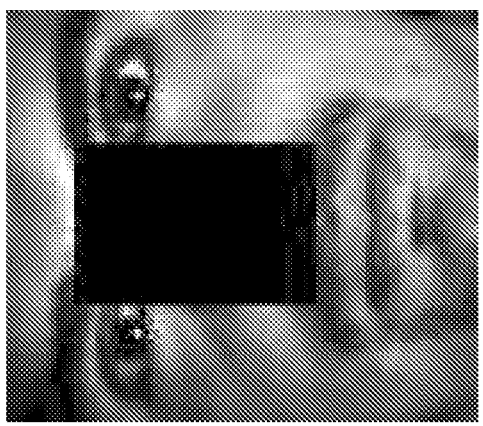
FIG. 13A
| Region occluded | Rec rate |
|---|---|
| Nose | 98.7% |
| Mouth | 97.1% |
| Eyes | 95.6% |
FIG. 13D

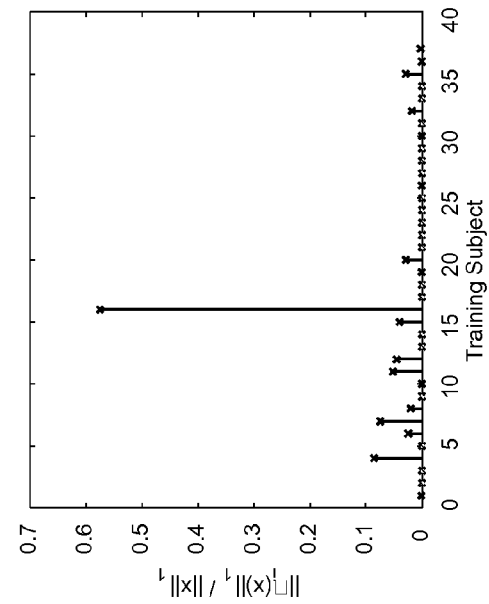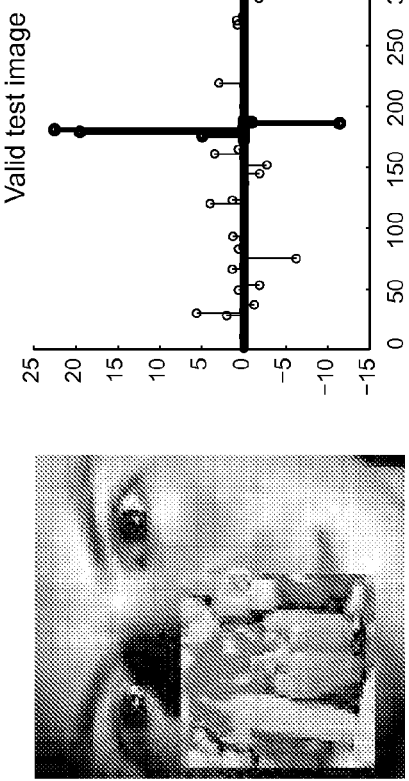
FIG. 16A  FIG. 16B  FIG. 16C
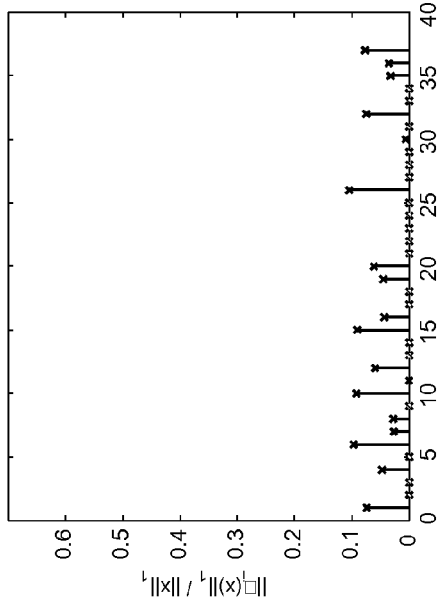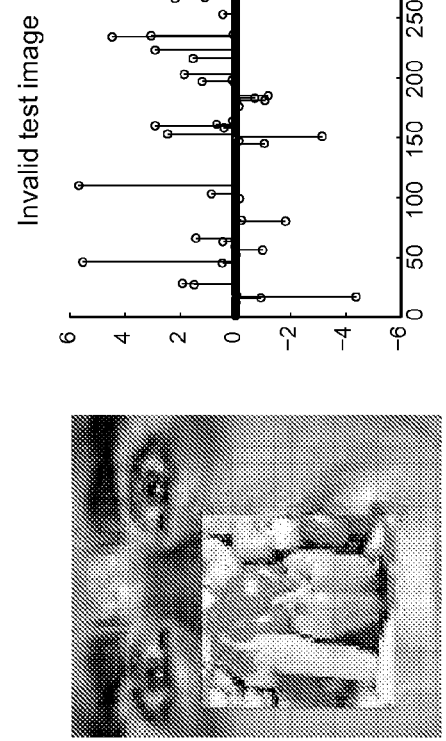
FIG. 17A  FIG. 17B  FIG. 17C Subset 4

Subset 3

Subset 2

Subset 1

Screening (S)

Angry (A)

Happy (H)

Neutral (N)

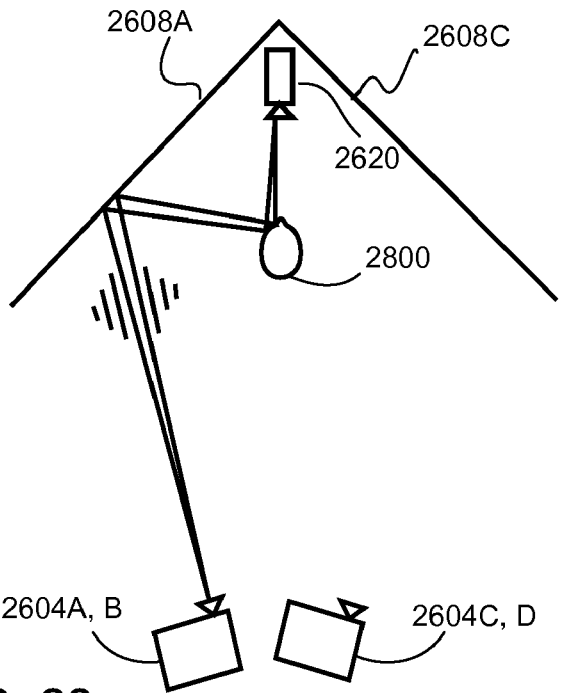
FIG. 28
FIG. 29A
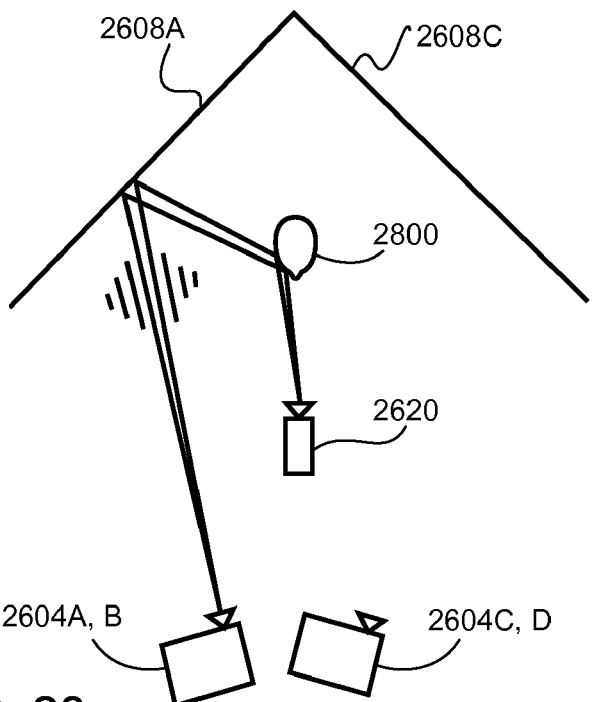
FIG. 28
FIG. 29B

RECOGNITION VIA HIGH-DIMENSIONAL DATA CLASSIFICATION

RELATED APPLICATIONS

This application is a 371 national phase of PCT/US2009/032413, filed Jan. 29, 2009, and claims the benefit under 35 U.S.C. §119(e) of priority to U.S. Provisional Application No. 61/025,039, the disclosures of which are herein incorporated by reference in their entireties.

FEDERALLY SPONSORED RESEARCH

This invention was made with Government support under Contract Numbers NSF CAREER IIS-0347456, NSF CRS-EHS-0509151 and Contract NSF CCF-TF-051495 awarded by the National Science Foundation (NSF), ONR YIP N00014-05-1-063 by the Office of Naval Research (ONR), and ARO MURI W911NF-06-1-0076 by the Army Research Office (ARO). The United States Government has certain rights in the invention.

TECHNICAL FIELD

The present disclosure relates to methods and a system for recognition via high-dimensional data classification that spans from voice recognition to other object and facial recognition, even when the data is at least partially occluded.

BACKGROUND

Methods exist for recognizing voices and images, for instance, but historically they have not been very robust to occlusion. Occlusion often occurs in the context of data objects generally, and appears with reference to faces when an image is captured of a human wearing a hat, sunglasses, or varying levels of facial hair coverage. Additional unexpected objects such as noise, reflections, etc., may also occlude a data object that needs to be recognized or identified. These occlusions may include noise or electromagnetic interference of voice data when attempting to recognize a voice. Many of the existing methods require prior knowledge of a test object or image and/or prior knowledge of the location of, or other information in regards to, the occlusion within the test object or image.

One method that has been used for image recognition is a classical recognition algorithm called nearest-neighbor (NN), which will be compared with the methods disclosed herein below. The NN classifier computes the Euclidean distances between a test vector y and training vectors $v_1, \ldots, v_n$, and assigns the membership of y to be equal to one of the training vectors with the closest distance.

Another method that has been used for image recognition is a related algorithm called nearest subspace (NS), e.g., a minimum distance to the subspace spanned by images of each subject. As will be shown, the methods of the present disclosure are far superior in rates of recognition, especially when in the presence of occlusion.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIGS. 13A to 13D display an effect of occluding different regions, respectively, the nose, the mouth, and eyes, and a recognition rate of each.

FIGS. 16A, 16B, and 16C display a valid test image, respectively: (A) test image, 30% occluded; (B) recovered coefficients; and (C) value of equation (10) for each class, i.

FIGS. 17A, 17B, and 17C display an invalid test image to contrast FIGS. 16A-16C, respectively: (A) test image, 30% occluded; (B) recovered coefficients; and (C) value of Equation 12 for each class, i, wherein the coefficients for the valid test image (FIG. 16B) are much more sparse, and the ratio from Equation 10 is much larger.

FIGS. 29A and 29B are, respectively, front and rear illuminations of the subject viewable from the top view of FIG. 28.

DETAILED DESCRIPTION

Figure 1A:
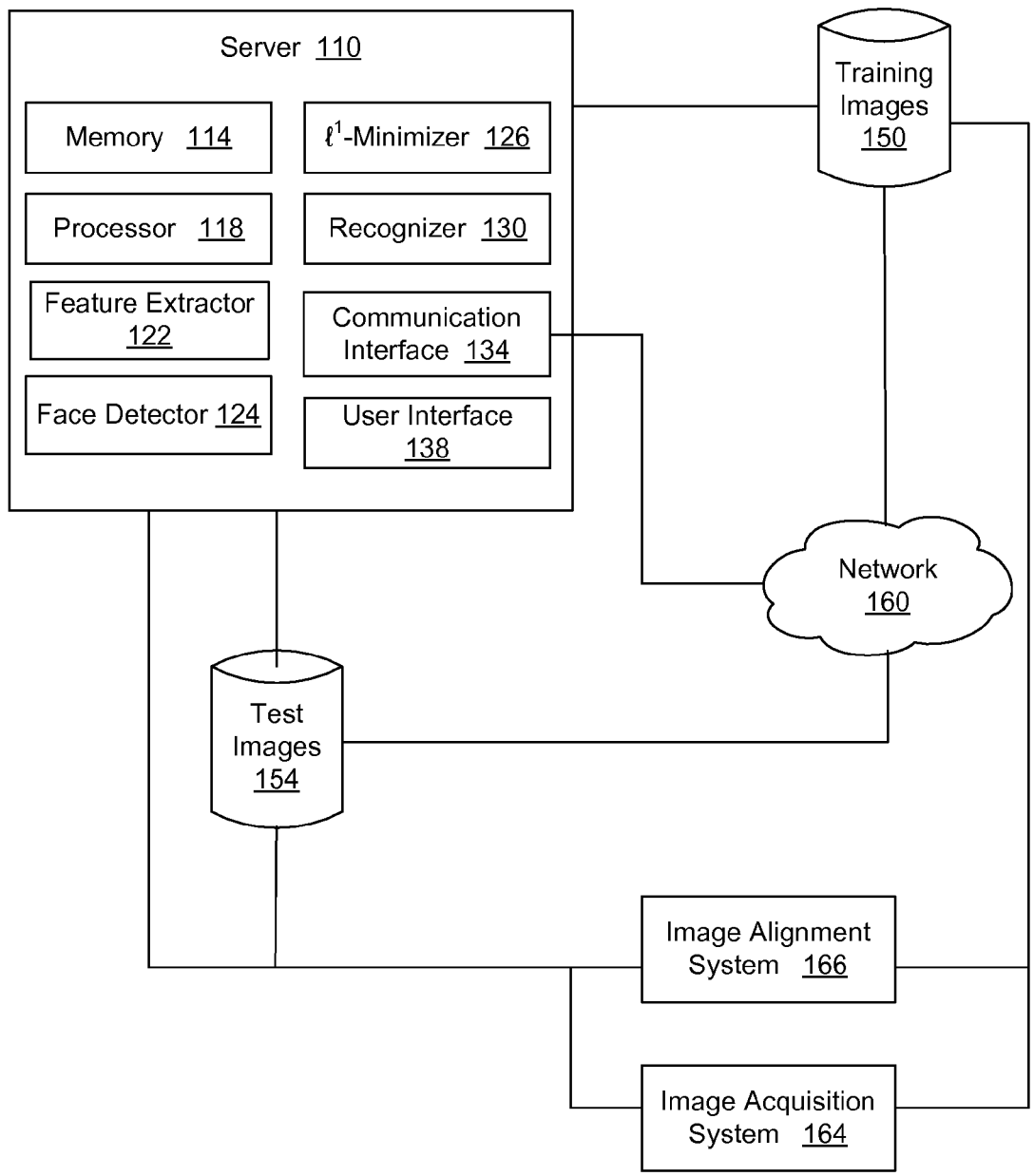
FIG. 1A is a block diagram of a system 100 for capture, alignment, and recognition of an object in a partially occluded test image using high-dimensional data classification.

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details.

In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations. The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

As referred to herein, an object refers to of what recognition is desired, such as a particular subject (or person) within an image or a particular voice from a person within an audio clip, etc. The object refers to the data that represents something capable of recognition through classification. Accordingly, with reference to a face, one subject has one unique three-dimensional (3-D) facial shape and color, etc. The system disclosed herein is capable of identifying the 3-D face as an object, and after identification thereof, the object may be referred to as a human subject.

As referred to herein, class describes a partition of all the objects captured, for instance, in a database. Each subject assumes a single class, e.g., the 3-D facial appearance of that subject. Class makes the partition exclusive, which means that an object is classified as a single class such as class A (Michael Chase) or class B (Andrew Wight), but not as both classes A and B or some mixture thereof. An image is the digital information that is captured and stored that contains an object and on which classification may be performed. Outlier images are those that have no correspondence to any of the available classes or have a correspondence only through a mixture of more than one class. Outlier images or test data is, as a general rule, rejected.

Most contemporary face recognition algorithms work well under laboratory conditions but degrade when tested in less-controlled environments. This is mostly due to the difficulty of simultaneously handling variations in illumination, alignment, pose, and occlusion. A practical face recognition system is proposed that achieves a high degree of robustness and stability to all these variations. Use of tools from sparse representation is demonstrated to align a test face image with a set of frontal training images in the presence of significant registration error and occlusion. Thoroughly characterized are the regions of attraction for a proposed alignment algorithm on public face datasets such as Multi-PIE, a public face database developed at Carnegie Mellon University (CMU).

Studies described herein show how to obtain a sufficient set of training illuminations for linearly interpolating practical lighting conditions. A complete face recognition system has been implemented, including a projector-based training acquisition system, in order to evaluate how developed algorithms work under practical testing conditions. The disclosed system can efficiently and effectively recognize faces under a variety of realistic conditions, using only frontal images under the proposed illuminations as training.

Figure 2A:
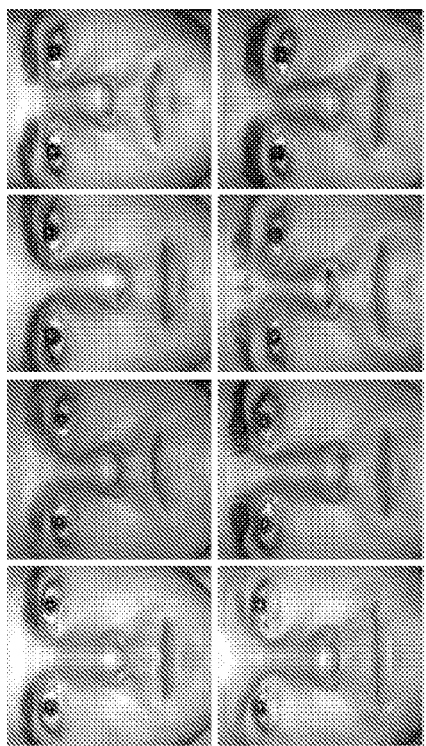
FIG. 2A displays an occluded face on the left that belongs to one of the eight individuals on the right.
Figure 2A:
Figure 2B:
FIG. 2B displays successful recognition of the person in FIG. 2A, represented by a test image as a sparse linear combination of a set of training images plus sparse error due to occlusion.
Figure 2B:
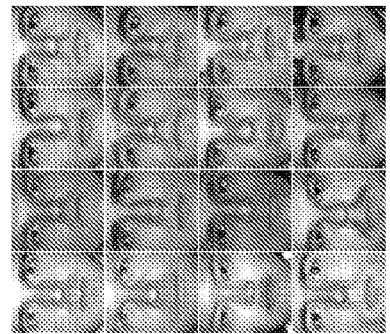
Figure 2B:
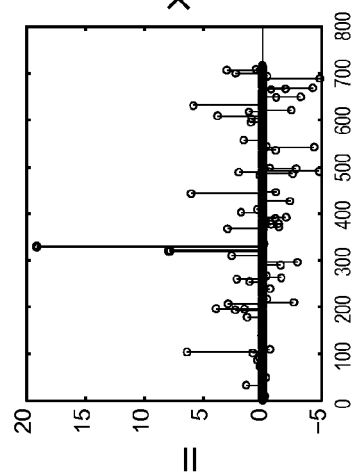
Figure 2B:
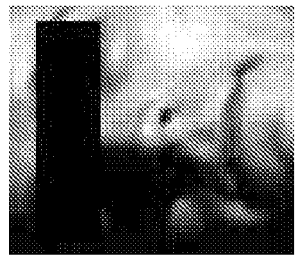

Occlusion poses a significant obstacle to robust, real-world object recognition. Consider a camera capturing an image of a human face, automatic recognition of which is desired. The image can be viewed as a measurement, sampled from the fairly restricted set of possible images of the same face. Now suppose that the face is partially occluded (FIGS. 2A and 2B). Occlusion corrupts the measured image, introducing errors that are: large in magnitude (gross errors); concentrated only on part of the image (sparse errors); and/or unpredictable in location (randomly supported errors).

FIG. 1A is a block diagram of a system 100 for capture, alignment, and recognition of an object in a partially occluded test image using high-dimensional data classification as disclosed herein. The system 100 may include a server 110, which may include, but is not limited to: a memory 114, a processor, 118, a feature extractor 122, a face detector 124, an $l^1$ minimizer 126, a recognizer 130, a communication interface 134, and a user interface 138, any of which may be coupled to one another. The server 110 may further include, or be coupled with, an images database 150 of training images and a test images database 154 representing a source of test images, which could include any memory source sufficient to pass a test image to the server 110 through the user interface 138. Herein, the phrase "coupled with" is defined to mean directly connected to or indirectly connected through one or more intermediate components. The system 100 may include a network 160 such that the server 110 may communicate over the network 160 to receive and send images and/or test images, and may execute any part of its processing remotely.

Finally, the system 100 may further include an image acquisition system 164 and an image alignment system 166, which will be disclosed in more detail with reference to FIGS. 26A, 26B, and 27-35. The images stored in the training database 150 may be multiple in numbers for a given subject, each varying in some degree in pose, angle, and/or illumination. Accordingly, the image acquisition system 164 disclosed herein allows acquiring and recording for later use a plurality of varying images from the same subject to be stored in the training images database 150. The test images in database 154 and the training images in database 150 need to be aligned to each other before identification of a test image may occur based on the training images. The image alignment system 166 provides such mutual alignment. The image alignment system 166 and the image acquisition system 164 are coupled together and may be integrated as a single acquisition and alignment system, including but not excluded to being integrated within the server 110.

The feature extractor 122 may be used to extract features of images from either of the images database 150 and the test images database 154. The $l^1$ minimizer 126 may be employed by the server 110—or another computing device, including a mobile device—to recover sparse coefficients in an effort to recover relevant and uncorrupted data of an object in a partially occluded test image so that it may be recognized by the recognizer 130, as will be explained in detail below. The user interface 138 may be employed to seek and/or acquire a test image to be recognized, e.g., from the test images database 154 or from the image acquisition system 164. The communication interface 134 may be used by the server 110 to communicate over the network 160. The network 160 may include the internet or World Wide Web ("Web"), a wide area network (WAN), a local area network ("LAN"), and/or an extranet, connected to through use of either a wired or wireless connection.

Figure 1B:
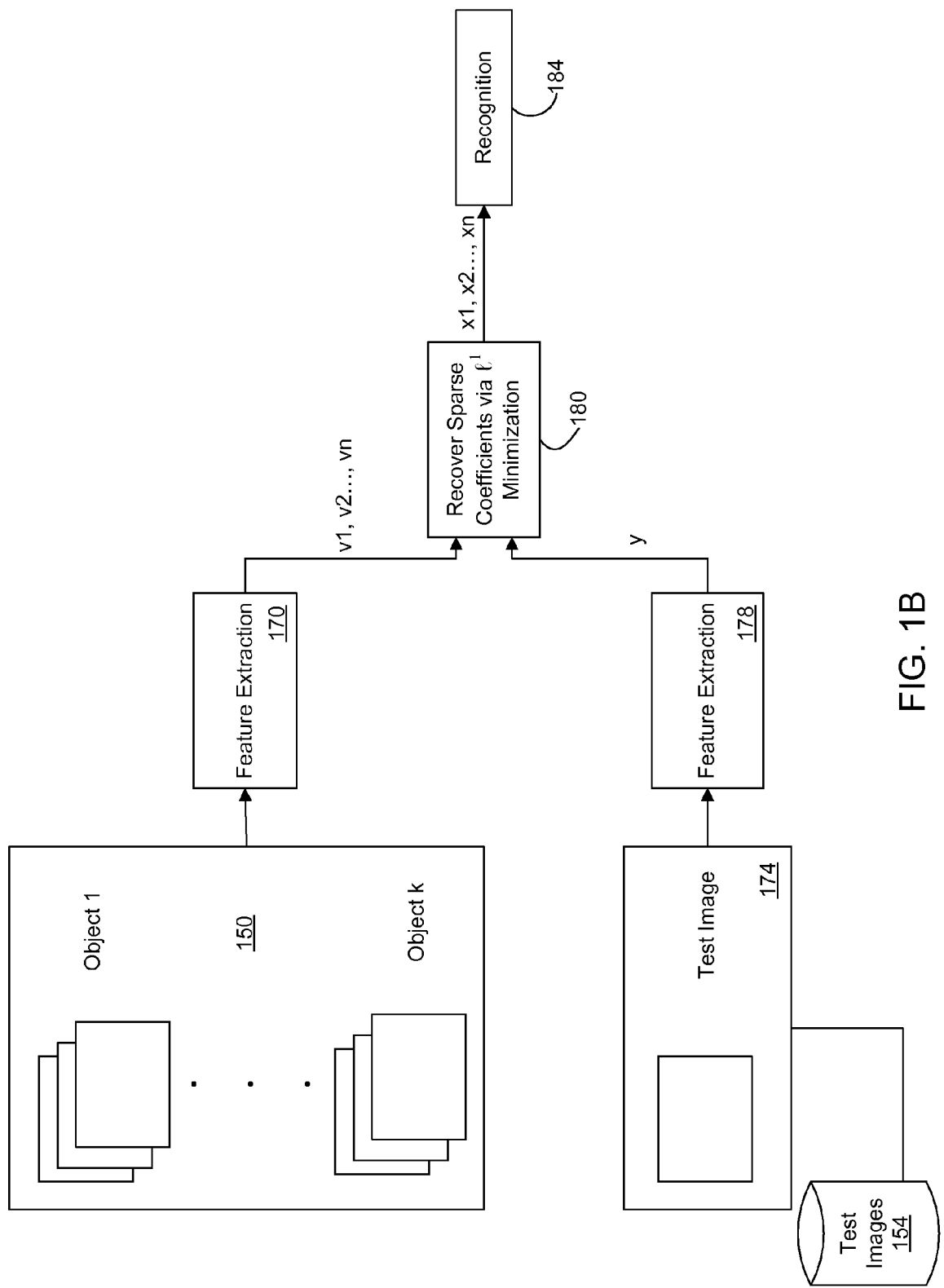
FIG. 1B is a system diagram depicting the execution of the recognition system, which uses $l^1$-minimization to recover sparse coefficients to enhance recognition.

FIG. 1B is a system diagram depicting the execution of the recognition system 100, which uses $l^1$-minimization to recover sparse coefficients to enhance recognition. The training images database 150 contains n images, which undergo feature extraction at block 170. A test image 174 undergoes feature extraction at block 178. Feature extraction may be executed by the feature extractor 122. The system 100 recovers sparse coefficients via $l^1$-minimization, at block 180, which are denoted by $x_1, x_2, \ldots, x_n$, leading ultimately to recognition of the test image 174 at block 184. The $l^1$ minimizer 126 may be used to recover the sparse coefficients in the former while the recognizer 130 may be used to recognize the test image 174, despite the partial occlusion, in the latter.

To recognize an unknown object in a test image, the system 100 first computes meaningful image features for both the test image, through feature extraction at block 178, and an image database of n training images for k objects, one of which is the test object, through feature extraction at block 170. Second, an $l^1$-minimization process recovers a sparse representation of the test features as a linear superposition of the training features through recovery, at block 180. Finally, the recognition of the object is achieved, at block 184, based on the recovered sparse coefficients of the representation. Details of the implementation of the system 100 follow.

Given an image I, a feature selection or extraction process (blocks 170 and 178) converts the image into a d-dimensional feature vector $v \in \Re^d$. Some examples of image features include Discrete Fourier Transform (DFT), Discrete Cosine Transform (DCT), Wavelet transforms, Principal Component Analysis (PCA), Independent Component Analysis (ICA), Linear Discriminant Analysis (LDA), and Nonlinear Kernel Maps. In FIG. 1B, the feature vectors for the n images in the database are denoted as $v_1, v_2, \ldots, v_n$, while the feature vector for the test image is denoted as y.

The recognition of the test image is based on a sparse representation of its feature vector y with respect to the feature vectors $v_1, v_2, \ldots, v_n$ of the training images in the database 150. More specifically, assume $$y = x_1 v_1 + x_2 v_2 + \ldots + x_n v_n = Ax, \quad (1)$$

where $x = (x_1, x_2, \ldots, x_n)^T \in \Re^n$ are unknown scalar coefficients, $A = (v_1, v_2, \ldots, v_n) \in \Re^{d \times n}$ is a matrix of feature vectors, which may include all image pixels stacked as vectors, or the matrix could include the image after certain transformations. The sparsity constraint states that the test feature vector y should only be linearly represented using the training images of the same object. Equivalently, the coefficients $x_1, x_2, \ldots, x_n$ in Equation 1 should all be zero except for those that are associated with the images of the same object as the test object. That is to say, the coefficients are sparse.

Such sparse representation is computed using $l^1$-minimization: The unknown coefficients $x = (x_1, x_2, \ldots, x_n)^T$ are computed via either of the following two optimization methods:

$$(P_1) \min \|x\|_1 \text{ subject to } y = Ax; \quad (2)$$

$$(P_2) \min \|x\|_1 \text{ subject to } \|y - Ax\|_2 < \sigma,$$

where σ is an estimate of the bounded energy of the data noise. The optimization can be efficiently solved using either linear programming or convex programming algorithms.

Ideally, after x is recovered, the nonzero entries in x will all be associated with a single subject, and the test image y is easily assigned to that subject. However, due to noise, the nonzero entries may be associated with multiple subjects. Many classifiers can resolve this problem. For instance, y may be assigned to the subject with the most non-zero entries in x (majority vote); or y can be assigned to the subject with the single largest entry of x.

FIG. 2A displays an occluded face on the left that belongs to one of the eight individuals on the right. FIG. 2B displays successful recognition of the person in FIG. 2A by generating a test image as a sparse linear combination of a set of training images plus sparse error due to occlusion.

A fundamental principle of coding theory is that redundancy in the measurement is essential to detecting and correcting gross errors. Redundancy arises in object recognition because the number of image pixels is typically far greater than the number of degrees of freedom in generating the image. In this case, even if a fraction of the pixels are completely corrupted by occlusion, recognition may still be possible based on the remaining pixels. On the other hand, schemes based on dimension reduction or feature extraction (e.g., PCA, ICA, LDA) discard redundant information, decreasing the error-tolerance of the representation. The deficiency of discarding redundant information is noted in A. Leonardis and H. Bischof, "Robust recognition using eigenimages," *Computer Vision and Image Understanding*, vol. 78, no. 1, pp. 99-118, 2000, which proposes random sampling to handle occlusion in the PCA framework. No representation is more redundant or more informative than the original image itself.

Of course, redundancy is useless without efficient computational tools for exploiting it. The difficulty of directly harnessing the redundancy of raw images has led researchers to instead focus on spatial locality as a guiding principle for robust recognition. Local features computed from only a small fraction of the image pixels are clearly less likely to be corrupted by occlusion than holistic features. In face recognition, methods such as ICA and local non-negative matrix factorization (LNMF) attempt to exploit this observation by adaptively choosing filter bases that are locally concentrated. A related approach partitions the image into fixed regions and computes features for each region. Notice, though, that projecting onto locally concentrated bases transforms the domain of the occlusion problem, rather than eliminating the corruption. Errors on the original pixels become errors in the transformed domain, and may even become less local. The role of feature extraction in achieving spatial locality is therefore questionable: no bases or features are more spatially localized than the original image pixels.

A central factor for robust and accurate recognition is the sparsity that naturally arises in object recognition. Preferably, the test image should only be interpreted in terms of training images of the same object, a small portion of the entire training set. The corruption incurred by occlusion is also typically sparse, affecting only a fraction of the image pixels.

Sparse representations have attracted a great deal of attention in signal processing and information theory. Recent progress has focused on the effectiveness of the $l^1$-norm for recovering sparse representations. One significant implication is that under quite general conditions, the combinatorial problem of finding sparse solutions to systems of linear equations can be efficiently and exactly solved via convex optimization, by minimizing the $l^1$-norm. In face recognition, the $l^1$-norm has been previously proposed as a distance measure for nearest neighbor (NN) classifiers. This use of the $l^1$-norm is not directly related to the subject matter of this application, and does not convey the same advantages in terms of sparsity or robustness.

Early work on sparse representation has been applied by D. Geiger, T. Liu, and M. Donahue, "Sparse Representations for Image Decompositions," IJCV, vol. 33, no. 2, 1999, to detect translated face templates from a small library. Whereas the disclosed use of the $l^1$-norm leads to tractable, convex problems, Geiger, et al. utilize the non-convex $l^p$-norm (p<1) and so must resort to a greedy matching pursuit strategy. Sparsity induced by the identity of the test image is not identified as a critical factor in Geiger, et al. due to the use of much smaller image libraries.

In contrast, herein is disclosed for the first time how $l^1$-minimization provides a principled framework for exploiting the two types of sparsity inherent in the robust recognition problem: sparsity in interpreting the test image and sparsity in the measurement error incurred by occlusion. Proposed is an algorithm for recognition in the presence of occlusion. The algorithm uses $l^1$-minimization to harness the redundancy in the raw imagery data, expressing the test image as a sparse linear combination of the given training images plus a sparse error due to occlusion.

Directly exploiting the sparse structure of the problem enables the methods to achieve state-of-the-art performance using raw imagery data, with no need for dimension reduction, feature selection, synthetic training examples or domain-specific information (such as required by illumination models). Also investigated are the implications of this framework for the engineering of recognition systems, showing how to predict how much occlusion the algorithm can handle and how to choose the training data to maximize robustness to occlusion. Extensive experiments on publicly available databases verify the efficacy of the proposed method.

While the proposed method is general as discussed above, the experimental results below are confined to human face recognition. The proposed methods discussed through FIG. 21 do not explicitly account for object pose. The $l^1$-based framework is robust to small variations in pose, for example, due to registration errors. Such detection is not assumed, and therefore, cropping and normalization of the face have been performed prior to applying the disclosed algorithms in the first half of the application. In the second half of this application, beginning with FIGS. 22A, 22B, and 22C, a system and methods are disclosed for automatic alignment and compensation for pose or misalignment. Accordingly, the algorithmic steps disclosed vary to some degree in the second half of the application when compared with the first half because the second half automates the alignment and recognition process from beginning to end.

Figure 3A:
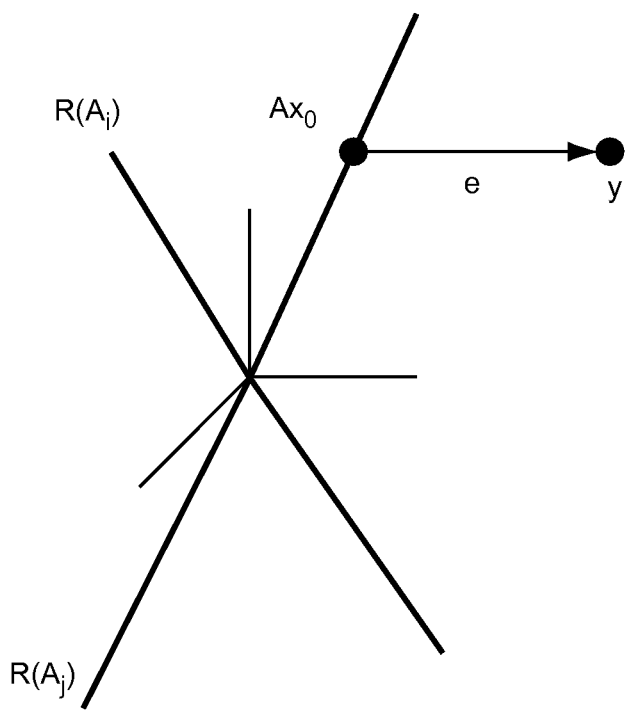
FIG. 3A displays an occluded test image y is generated by sampling a point $Ax_0$ from one of the subspaces $R(A_1)$ and perturbing it by a sparse vector, e.
Figure 3B:
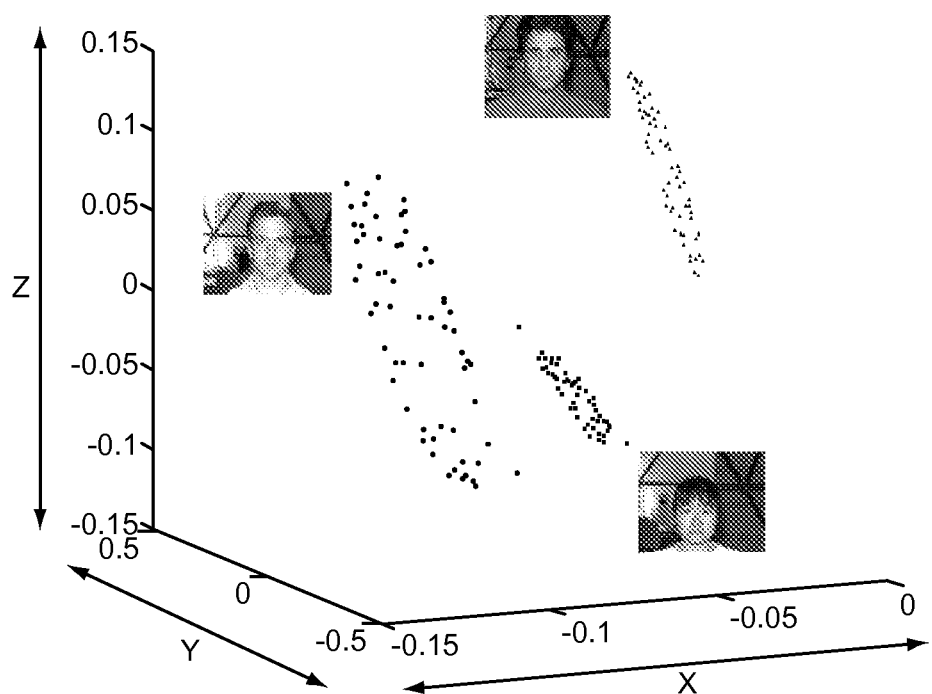
FIG. 3B displays a hybrid linear structure of images of three individuals in the Yale Face Database B; images of each individual are well approximated by an (affine) three-dimensional subspace.

FIG. 3A displays an occluded test image y represented by sampling a point $Ax_0$ from one of the subspaces $R(A_j)$ and perturbing it by a sparse vector, e. FIG. 3B displays a hybrid linear structure of images of three individuals in the Yale Face Database B; images of each individual are well approximated by an (affine) three-dimensional subspace.

The basic problem in object recognition is to use labeled training images from k distinct object classes to correctly determine the class of a test image whose identity is initially unknown. Identified is a w×h grayscale image with the vector $v \in \Re^m$ (m=wh) given by stacking its columns or rows. The system 100 arranges the given training images as columns of a single matrix $A=[v_1, \ldots, v_n] \in \Re^{m \times n}$, and let $A_i \in \Re^{m \times n_i}$ denote the sub-matrix of $n_i$ training images from the i-th class. An immense variation of statistical, generative and discriminative models have been proposed for exploiting the structure of the $A_i$ for recognition. One particularly simple and effective approach models the images from a single class as lying on a linear subspace. Subspace models are flexible enough to capture much of the variety in real datasets, and are especially well-motivated in the context of face recognition, where it has been observed that the images of faces under varying lighting conditions lie on a special 9-dimensional subspace (see FIG. 3A).

Thus, given sufficient training images, a test image y of the i-th object will approximately lie in the linear span of the training images from the same class: $y=A_i x_i$, where $x_i \in \Re^{n_i}$ is a vector of coefficients. The test image y can also be expressed in terms of the entire training set $A=[A_1 \ldots A_k]$:

$$y=Ax_0, \quad (3)$$

where $x_0 \doteq [0 \ldots 0 x_i^T 0 \ldots 0]^T$. In the presence of noise, the linear subspace model does not hold exactly, and it may be more realistic to write $y=Ax_0+z$, where z is a vector of small-magnitude (e.g., Gaussian) errors. For simplicity of the exposition, the system 100 may neglect the effect of z. The geometry and algorithms described, however, are provably stable under noise. The term z can be explicitly accounted for by replacing the linear program in Algorithm 1 (Table 1), below, with a second-order cone program disclosed in E. Candes and P. A. Randall, "Highly robust error correction by convex programming," preprint, http://arxiv.org/abs/cs.IT/0612124, 2006.

Now suppose that the observed image y is also partially occluded. Let ρ be the fraction of pixels in the occluded region. Then a fraction (1−ρ) of the pixels belong to an image $y_0$ from one of the K object classes:

$$y=y_0+e=Ax_0+e, \quad (4)$$

where $e \in \Re^m$ is a vector of errors. The errors may have arbitrary magnitude and, therefore, cannot be ignored or treated with techniques designed for small-magnitude noise. Notice, however, that the true e is sparse; its non-zero entries lie on a set of size ρm corresponding to the occluded pixels (FIGS. 3A and 3B).

Given this formulation, consider the following problem (Problem 1) that addresses recognition under occlusion. Given labeled sets of training images $A_1, \ldots, A_k$ from k classes and a test image y generated by sampling an image from the $i_0$-th class and then perturbing a fraction ρ of its values arbitrarily, the system 100 may identify the correct class $i_0$.

As a first step toward solving this problem, notice that due to its special, sparse structure the vector $x_0$ is extremely informative for classification. Since $x_0$ is initially unknown, we seek (approximate) solutions to the system of linear equations Ax=y. When the number of image pixels, m, is greater than the number of training images, n, the system is overdetermined, and may not have an exact solution. In this case, conventional wisdom overwhelmingly favors a solution in the least-squares sense, by minimizing the $l^2$ norm of the residual:

$$\hat{x}_2 = \arg\min_x \|y - Ax\|_2. \quad (5)$$

Conventional wisdom includes this common practice in computer vision. Some techniques represent y as a linear superposition of basis vectors whose coefficients are computed by minimizing the $l^2$ norm. For orthonormal bases, these coefficients are just the projection of y onto the basis vectors.

FIGS. 4A, 4B, 4C, and 4D display, respectively: (A) an occluded test image, y; (B) coefficients against the training set, $\hat{x}_2$, estimated by minimizing the $l^2$-norm; (C) error, $\hat{e}_2$; and (D) reconstruction from the estimated coefficients.

Figure 4A:
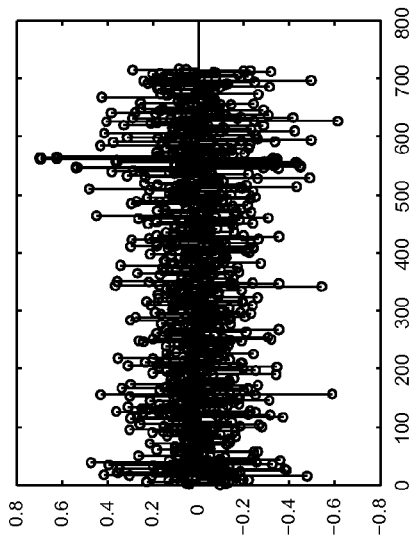
FIGS. 4A, 4B, 4C, and 4D display, respectively: (A) an occluded test image, y; (B) coefficients against the training set, $\hat{x}_2$, estimated by minimizing the $l^2$-norm; (C) error, $\hat{e}_2$; and (D) reconstruction from the estimated coefficients.
Figure 4B:
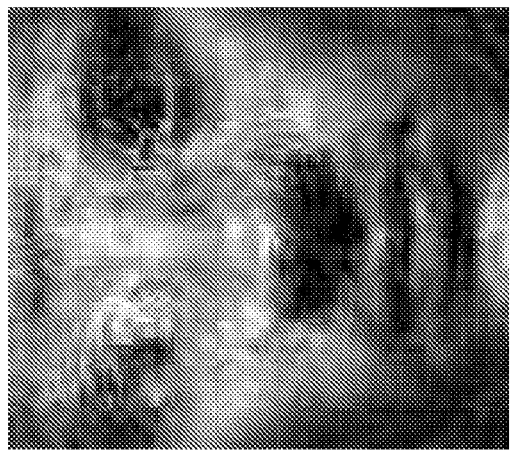
Figure 4C:
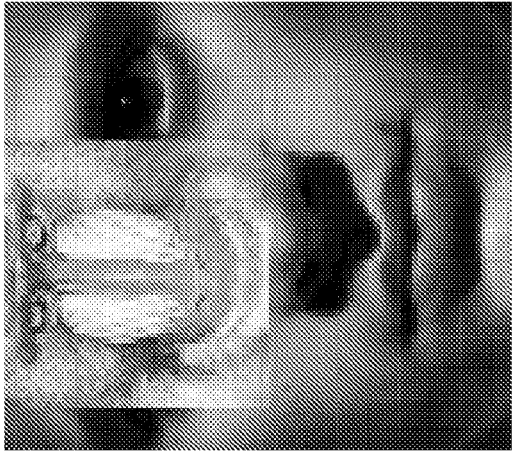
Figure 4D:
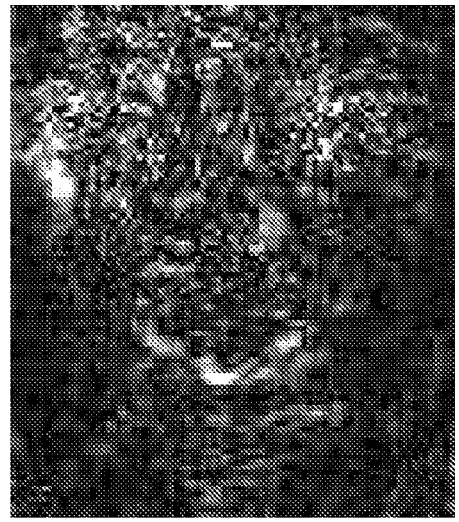

In the presence of isotropic Gaussian noise, $\hat{x}_2$ is the maximum likelihood estimate of e. Unfortunately, the error e introduced by occlusion is highly non-Gaussian, consisting of gross errors concentrated on a subset of the image pixels. In this situation, $\hat{x}_2$ can be arbitrarily bad: since $\|e\|_2$ is unbounded, $\|\hat{x}_2-x_0\|_2$ is also unbounded. FIGS. 4A through 4D give a visual demonstration of this phenomenon. Notice that both the coefficients $\hat{x}_2$ and the error $\hat{e}_2$ estimated by $l^2$-minimization are densely supported. Unsurprisingly, the reconstruction in FIG. 4D is quite poor (compare to the results of FIG. 11D). The conclusion is inescapable: the conventional least-squares solution does not properly harness the sparsity inherent in Problem 1, and as a result is not robust to occlusion.

Below is shown how to exploit sparsity by minimizing the $l^1$ norm, rather than the $l^2$ norm, leading to a simple, robust and efficient algorithm for recognition in the presence of occlusion.

Figure 5A:
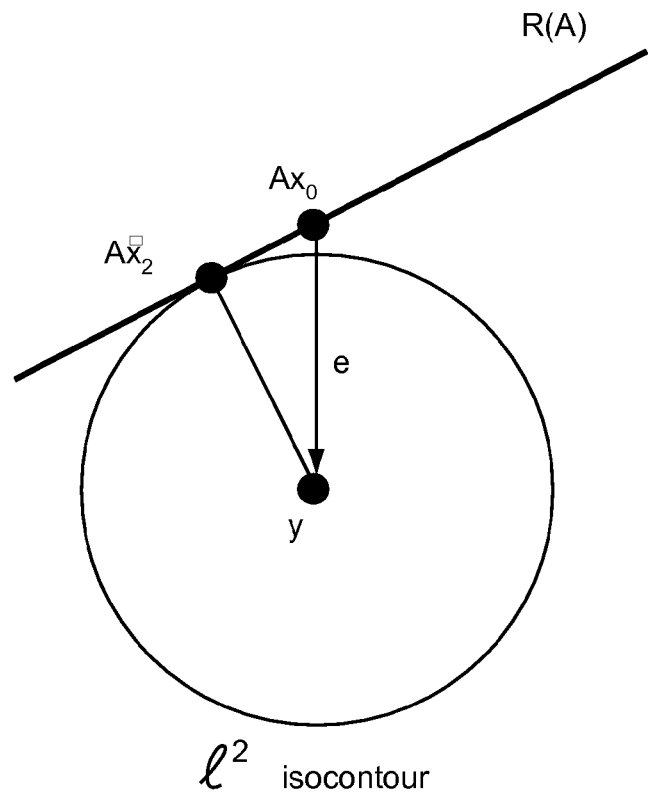
FIGS. 5A and 5B display robustness of the $l^1$ minimizer to sparse errors in which respectively display (A) the $l^2$ minimizer, obtained by placing a sphere ($l^2$-ball) centered at x and expanding it to touch R(A); and (B) the $l^1$ minimizer obtained by placing an $l^1$-ball (a polytope) centered at x and expanding it to touch R(A).
Figure 5B:
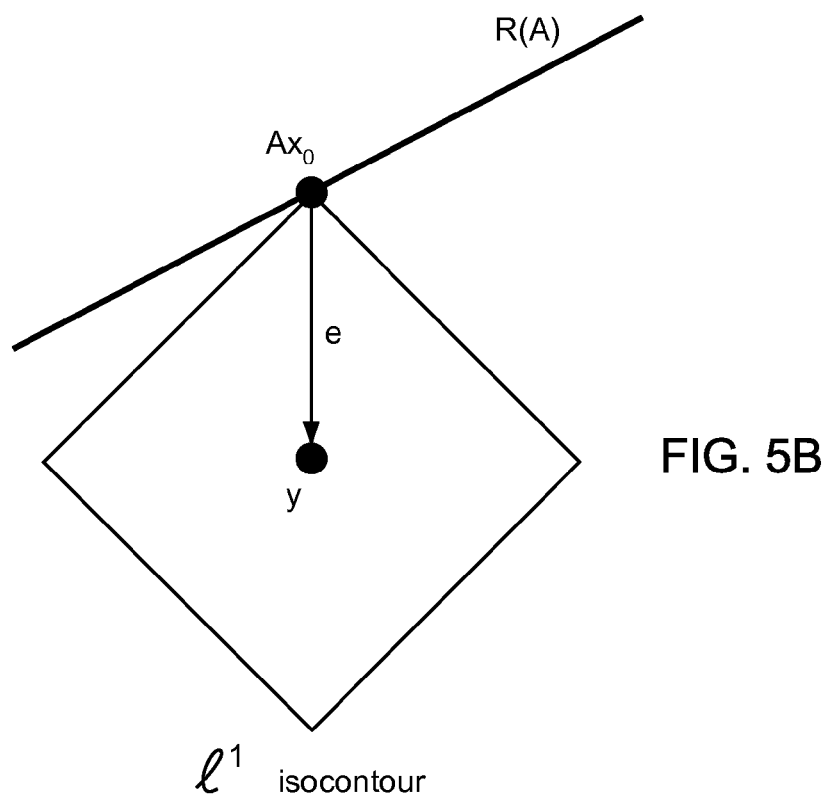

FIGS. 5A and 5B display robustness of the $l^1$ minimizer (126) to sparse errors in which respectively display (A) the $l^2$ minimizer, obtained by placing a sphere ($l^2$-ball) centered at x and expanding it to touch R(A); and (B) the $l^1$ minimizer obtained by placing an $l^1$-ball (a polytope) centered at x and expanding it to touch R(A).

Since the error e is known to be sparse, but of arbitrary magnitude, a reasonable alternative to minimizing the $l^2$ norm of the residual is to instead seek the x which gives the sparsest residual:

$$\hat{x}_0 = \arg\min_x \|y - Ax\|_0. \tag{6}$$

Here, the $l^0$ "norm" $\|x\|_0$ counts the number of nonzero entries of the vector x. $\|x\|_0$ is not a true norm, since $\|\alpha x\|_0 = \|x\|_0$ for $\alpha \neq 0$. Computing Equation 6 gives the vector $A\hat{x}_0$ in the range of A such that the error, $e=y-A\hat{x}_0$, has the fewest nonzero entries.

In fact, if A is in general position and the error e has support less than m/2 (less than half the image is occluded), $\hat{x}=x_0$. That is, the true solution $x_0$ gives the sparsest residual and can be found exactly by solving Equation (6). Unfortunately, computing $\hat{x}_0$ is nondeterministic polynomial (NP)-hard in general, and requires checking every possible support of the error, e. It may, therefore, seem that computing the true $x_0$ is hopelessly intractable. Fortunately, this is not the case for Problem 1. It can be shown that if the error e is sufficiently sparse, then the $l^0$ minimizer $\hat{x}_0$ is equal to the $l^1$ minimizer:

$$\hat{x}_0 = \hat{x}_1, \tag{7}$$

where $\hat{x}_1 = \arg\min_x \|y-Ax\|_1$. This is a convex optimization problem, whose solution is unique and can be efficiently computed by linear programming.

To summarize, if $y=Ax_0+e$ and the error e is sufficiently sparse, then by generating the coefficients, $x_0$ can be recovered exactly by minimizing the $l^1$ norm of the error e. A proof of this equivalence and a detailed exposition of the technical conditions under which it holds are beyond the scope of this application. For proof, see J. Wright and Y. Ma, "Dense Error Correction via L1-Minimization" submitted to IEEE Transactions on Information Theory," August 2008, http://perception.csl.uiuc.edu/~jnwright/Wright08-IT.pdf.

FIGS. 5A and 5B, however, give the basic intuition for why the $l^1$ minimizer conveys such dramatic advantages in terms of robustness, where the observation y is generated by sampling a point $Ax_0$ in the range of A and then perturbing it by e along one of the coordinate axes. Minimizing the $l^2$-norm is equivalent to finding the smallest radius sphere around y which touches the range, R(A), of A. The point where it touches is $A\hat{x}_2$, and is not equal to $Ax_0$ unless $e \perp R(A)$, a limited special subset.

On the other hand, the level sets of $\|\cdot\|_1$ are octahedral, aligned with the coordinate axes. Minimizing the $l^1$ norm is equivalent to centering an $l^1$-ball (octahedron) about y, and expanding it until it touches R(A). This point of intersection is $A\hat{x}_1$, which in this case is equal to $Ax_0$. Notice that the drawing in FIG. 5B is scale invariant. This implies that the ability of $l^1$-minimization to recover the true solution $x_0$ is independent of the magnitude of the e, and depends only on the signs of e and the relative geometry of the subspace R(A) and the unit $l^1$-ball. From the geometry of FIG. 5B, it should be clear that $\hat{x}_1=x_0$ if and only if the translate, $R(A)e/\|e\|_1$, of the subspace R(A) to the (sparse) point on the unit $l^1$-ball corresponding to e intersects the ball only at $e/\|e\|_1$.

Previously, it was shown how, in overdetermined systems (m>>n), minimizing the $l^1$ norm of the residual could recover $x_0$, even in the presence of arbitrarily large errors, provided those errors are sparsely supported. This approach does not explicitly enforce the sparseness of the estimated coefficient vector $\hat{x}_1$. Unfortunately, as the number of training images n increases, the equivalence $\hat{x}_1=\hat{x}_0=x_0$ begins to break down. The reason for this breakdown is clear from examining the linear system Ax=y. As n increases, this system becomes square, and then underdetermined. R(A) will then span all of $\Re^m$, and even the occluded test image x will be expressible as a linear combination of the columns of A.

From an error correction perspective, increasing n (e.g., by expanding the number of object classes K in the database) seems to decrease the redundancy of the representation: the same number of image pixels must express a greater number of degrees of freedom. Notice, however, that this is not the case. Each test image still has an expression, $y_0=Ax_0$, which is highly redundant—it depends only on a few ($\leq n_i$) nonzero entries of $x_0$. However, in order to exploit the robustness inherent in such a redundant representation, it needs to be enforced that the estimated coefficients $\hat{x}$ have such sparse structure.

Sought, therefore, is a simultaneously sparse solution for x and e. Rewriting Equation 4 as $$y = [A I]\begin{bmatrix} x \\ e \end{bmatrix} \doteq Bw. \tag{8}$$

Here, $B \in \Re^{m \times (n+m)}$, so the system Bw=y is underdetermined and does not have a unique solution. However, from the above discussion, generating w has at most $n_i + \rho m$ nonzeros. This motivates seeking the sparsest solution to this system of equations:

$$\hat{w}_0 = \arg\min \|w\|_0 \text{ s.t. } Bw=y(=Ax+e). \tag{9}$$

In fact, if the matrix B is in a general position, then as long as $y=B\hat{w}$ for some $\hat{w}$ with less than m/2 nonzeros, $\hat{w}$ is the unique sparsest solution: $\hat{w}_0=\hat{w}$. Thus, if the occlusion e covers less than $$\frac{m-n_i}{2} \text{ pixels,}$$

or about 50% of the image, the solution to Equation 9 is the true generator, $[x_0 \ e]$.

Like the overdetermined problem of Equation 6, finding the sparsest solution to a system of linear equations is NP-hard in general. Fortunately, a corresponding equivalence result states that if the sparsest solution $w_0$ is sufficiently sparse, then it is equal to the minimum $l^1$-norm solution, $$\hat{w}_1 = \arg\min\|w\|_1 \ s.t.\ Bw = y(=Ax+e). \tag{10}$$

In fact, the problem of robustly solving overdetermined systems $y=Ax+e$ and the problem of sparsely solving underdetermined systems $y=Bw$ are equivalent, and can be transformed from one to the other. The result of Equation 10 implies that as long as the occlusion e and the coefficients $x_0$ are sufficiently sparse, they can be efficiently and exactly computed by $l^1$-minimization.

Thus far, several results in the theory of $l^1$-$l^0$ equivalence have been sketched, and have shown how these provide an efficient and tractable means of exploiting the two types of sparsity inherent in the robust recognition problem. However, determining whether these results are practically relevant requires a more precise notion of when $w_0$ is "sufficiently sparse."

In an effort to quantify when $l^1$-$l^0$ equivalence holds (i.e. when $\hat{w}_1 = w_0$), Donoho defines the equivalence breakdown point (EBP) of a matrix B as the maximum number, k, such that if $y=Bw_0$ for some $w_0$ with less than k nonzero entries, then the minimal $l^1$ norm solution $\hat{w}_1$ to the system $Bw=y$ is equal to that sparse generator $w_0$. "For most large underdetermined systems of linear equations the minimal $l^1$-norm solution is also the sparsest solution," *Comm. Pure and Applied Math.*, vol. 59, no. 6, pp. 797-829, 2006. A number of sufficient conditions have been given in the literature for the existence of a constant, $\rho_0$, such that $EBP(B) > \rho_0 m$ (i.e. for solutions with a non-vanishing fraction of nonzeros to be recoverable by $l^1$-minimization). For example, Candes et al., show that even for a random matrix B drawn from a Gaussian ensemble, $EBP(B) > \rho_0 m$ with overwhelming probability as $m \to \infty$. E. Candes, M. Rudelson, T. Tao, and R. Vershynin, "Error correction via linear programming," in *IEEE Symposium on FOES*, pp. 295-308, 2005. An important upper bound on EBP(B) comes from the theory of centrally neighborly polytopes:

$$EBP(B) \leq \lfloor (m+1)/3 \rfloor. \tag{11}$$

D. Donoho, "Neighborly polytopes and sparse solution of underdetermined linear equations," preprint, 2005. This result indicates that we should not expect to perfectly recover $[x_0\ e]$ if $n_i+|support(e)| > m/3$. Generally, $(m \gg n)$, so Equation (11) implies that the largest fraction of occlusion under which we can hope to still achieve perfect reconstruction is 33%. This bound is corroborated by experimental results, as shown in FIGS. 11A through 11E, discussed below.

Suppose receipt of a test image y generated according to Equation 8, and further suppose that support $(\hat{w}_0) < EBP(B)$, so that Equations 9 and 10 are equivalent. Then, by minimizing $\|w\|_1$ subject to $[A\ I]w=y$, one can recover the coefficient vector $x_0$ and the error e induced by occlusion.

Figure 6:
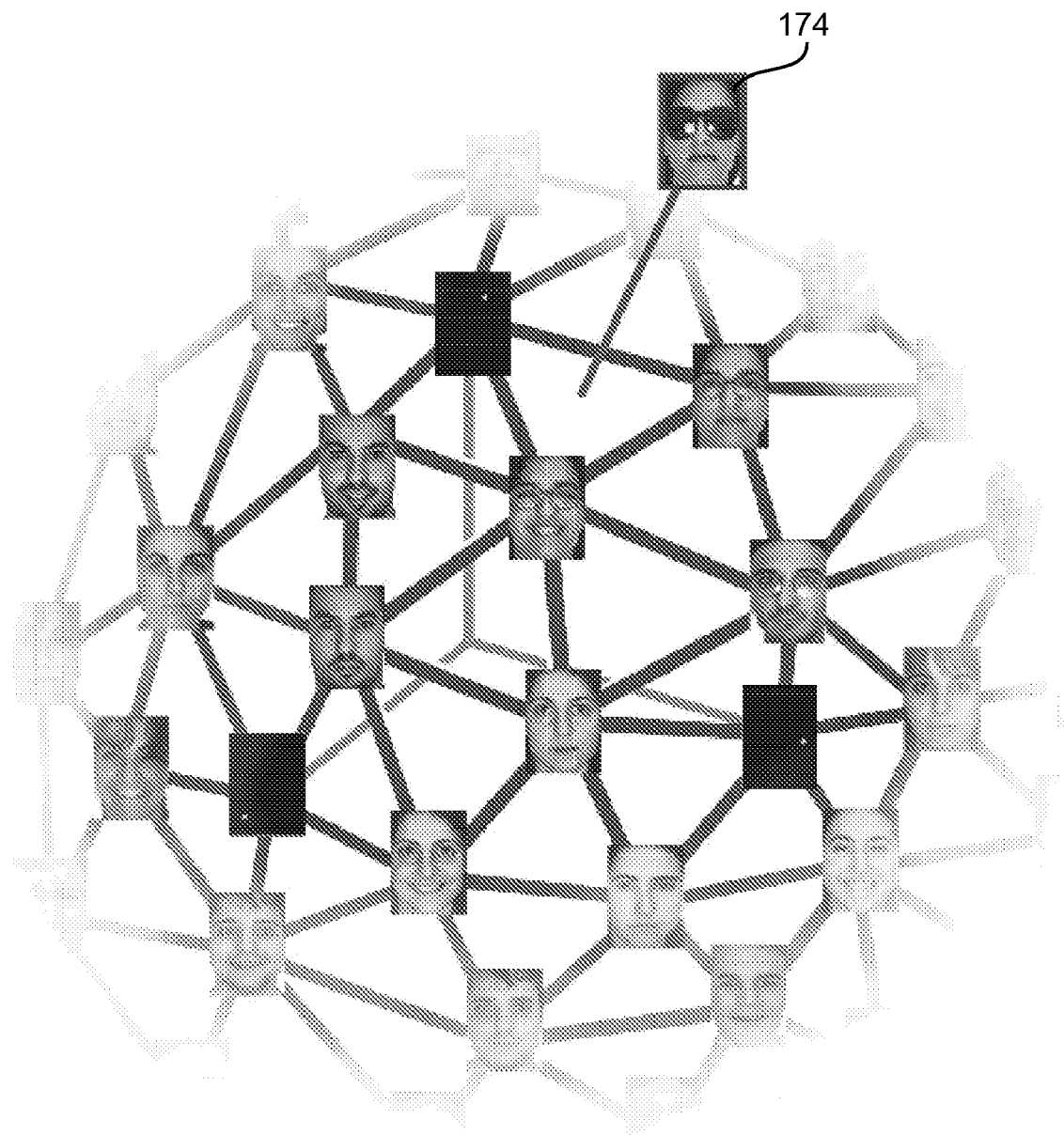
FIG. 6 displays the geometry of classification via $l^1$-minimization.

FIG. 6 displays the geometry of classification via $l^1$-minimization. The convex hull of the columns of $B=[A\ I]$ is a high-dimensional polytope in $\mathfrak{R}^m$. Each vertex of this polytope is either a training image or an image with just a single pixel illuminated (corresponding to the identity submatrix of B). Given a test image, solving the $l^1$-minimization problem essentially locates which facet of the polytope the test image falls on, where facet is an analogy to one of the flat polished surfaces cut on a gemstone or occurring naturally on a crystal. The algorithm finds the facet with the fewest possible vertices. Only vertices of that facet contribute to the representation; all other vertices have no contribution, or in other words, their coefficients in $\hat{x}_1$ are zero.

There are many potential ways that the estimates $\hat{x}_1$ and $\hat{e}_1$ can be used for classification. For example, setting $y_r \doteq y - \hat{e}_1$ compensates for the effect of occlusion. One could then classify the reconstructed image $y_r$ based on which of the face subspaces $R(A_1), \ldots, R(A_k)$ it is closest too. Notice, however, that the sparse coefficients $\hat{x}_1$ already encode the identity of the test subject. One can therefore directly use $\hat{x}_1$, assigning y to the class whose coefficients best approximate it. More precisely, k functions may be defined as $\delta_i: \mathfrak{R}^n \to \mathfrak{R}^n$ the i-th of which preserves the coefficients corresponding to the i-th group and sets the rest to zero: $\delta_i(x) = [0^T \cdots 0^T x_i^T 0^T \cdots 0^T]^T \in \mathfrak{R}^n$. The approximation in terms of the coefficients associated with the i-th group is then $\hat{y} = A\delta_i(x) + e$, and classification can be achieved by assigning y to the group that minimizes $\|y - A\delta_i(x) - e\|_2$. The entire process is summarized as Algorithm 1 in Table 1, below. This implementation minimizes the $l^1$-norm via a primal-dual algorithm for linear programming based on: S. Boyd and L. Vandenberghe, *Convex Optimization*, Cambridge University Press, 2004; and E. Candes and J. Romberg, "$l^1$-magic: Recovery of sparse signals via convex programming," http://www.acm.caltech.edu/l1magic/, 2005.

TABLE 1

Algorithm 1 (Robust Recognition via $l^1$-Minimization).

1: input: n training samples partitioned into k classes, $A_1, \ldots, A_k$ and a test sample y.
2: Set $B = [A_1 \ldots A_k\ I]$.
3: Compute $\hat{w}_1 = \arg\min_{w=[x\ e]} \|w\|_1$ such that $Bw = y$, by linear programming.
4: for i = 1 : k
5: Compute the residual $r_i = \|y - A\delta_i(\hat{x}_i) - \hat{e}_1\|_2$.
6: End
7: output: $\hat{i}(y) = \arg\min_{i=1,\ldots,k} r_i$ As discussed above, Algorithm I perfectly compensates for occlusions covering up to $(EBP(B)-n_i)$ pixels. Beyond this range, theory no longer guarantees exact recovery, and so recognition performance may suffer. Nevertheless, a body of experience suggests that minimizing the $l^1$ norm still encourages sparsity. Moreover, because the $l^1$-minimizer is stable in the presence of noise, estimates of $x_0$ computed from highly occluded images may still be useful for recognition. In the next section, this is shown to indeed be the case.

Figure 7:
FIG. 7 displays examples of human face images from the Extended Yale B database.

FIG. 7 displays examples of human face images from the Extended Yale B database (150). Here, an example is used to demonstrate the advantages of the above method over existing methods on a face recognition application. The Extended Yale B database (http://vision.ucsd.edu/~leekc/ExtYaleDatabase/ExtYaleB.html) is a free public database that provides a benchmark to test the performance of face recognition methods. The database (150) consists of 2,414 valid frontal images of image size 192×168 from 38 human subjects. The images were captured under laboratory-controlled illumination variations.

As a demonstration, half of the images in the database are randomly selected, i.e., 1207 images, for training, and the identities of the face images are therefore assumed to be known. Then the rest of the 1207 images are used for testing: for each test image, a sparse representation x is recovered with respect to the 1207 training images, and the identity of the subject in the image is classified.

Figure 8A:
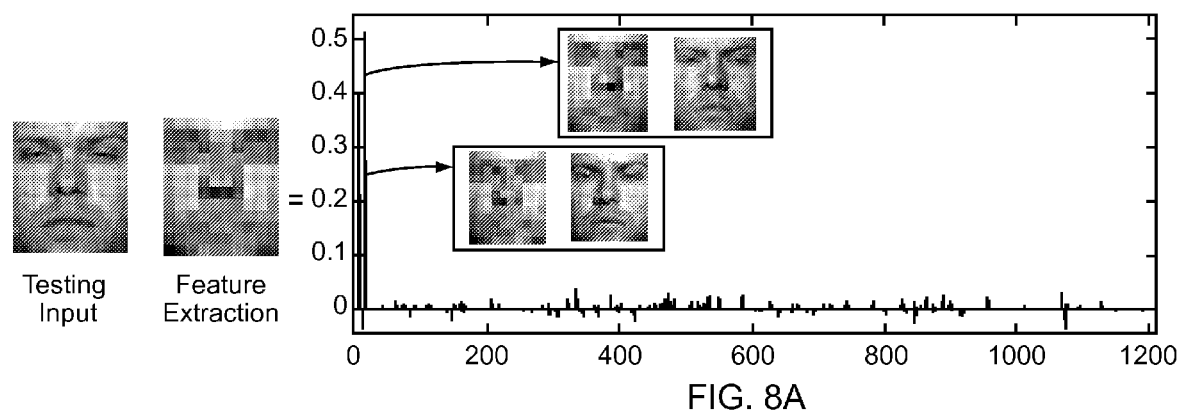
FIG. 8A displays facial recognition with 12×10 downsampled images as features, and plotted in the graph, the values of the sparse coefficients recovered from Algorithm 1 of test image y together with the two training examples that correspond to the two largest sparse coefficients.

FIG. 8A displays facial recognition with 12×10 downsampled images as features, and plotted in the graph, the values of the sparse coefficients recovered from Algorithm 1 of test image y together with the two training examples that correspond to the two largest coefficients. In this first experiment, a 12×10 down-sampled image is chosen as the image feature. The feature extraction function (block 170 of FIG. 1B) converts each image from the original resolution 192×168 to 12×10. The pixel values of the down-sampled image are used as 120-D features—stacked as columns of the matrix A in Algorithm 1. Hence, matrix A has size 120×1207, and the system y=Ax is underdetermined. FIG. 8A illustrates the sparse coefficients x recovered by Algorithm 1 for the test image 174 from the first subject using the $l^1$-minimization method. FIG. 8A also shows the features and the original images that correspond to the two largest coefficients. The two largest (or most dominant) coefficients are both associated with training samples from subject 1.

Figure 8B:
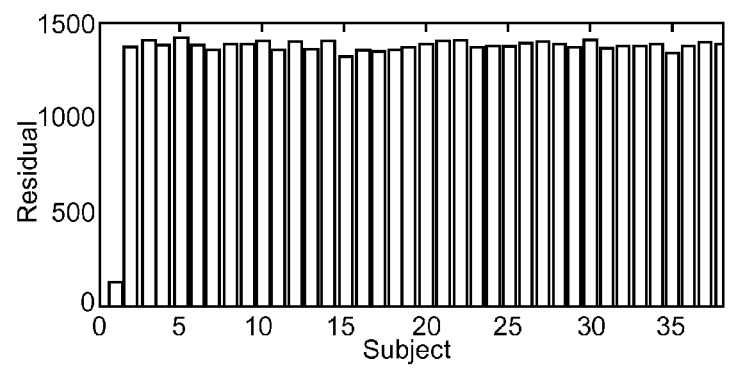
FIG. 8B displays the residuals $r_i(y)$ of the test image of FIG. 8A with respect to the projected sparse coefficients $\delta_i(\hat{x})$ by $l^1$-minimization.

FIG. 8B displays the residuals $r_i(y)$ of the test image of FIG. 8A with respect to the projected sparse coefficients $\delta_i(\hat{x})$ by $l^1$-minimization. The ratio between the two smallest residuals is about 1:8.6. The residuals are with respect to the 38 projected coefficients $\delta_i(\hat{x})$, i=1, 2, . . . , 38. With 12×10 down-sampled images as features, Algorithm 1 achieves an overall recognition rate of 92.1% across the Extended Yale B database. Whereas the more conventional minimum $l^2$-norm solution to the underdetermined system y=Ax is typically quite dense, minimizing the $l^1$-norm favors sparse solutions, and provably recovers the sparest solution when this solution is sufficiently sparse.

Figure 8C:
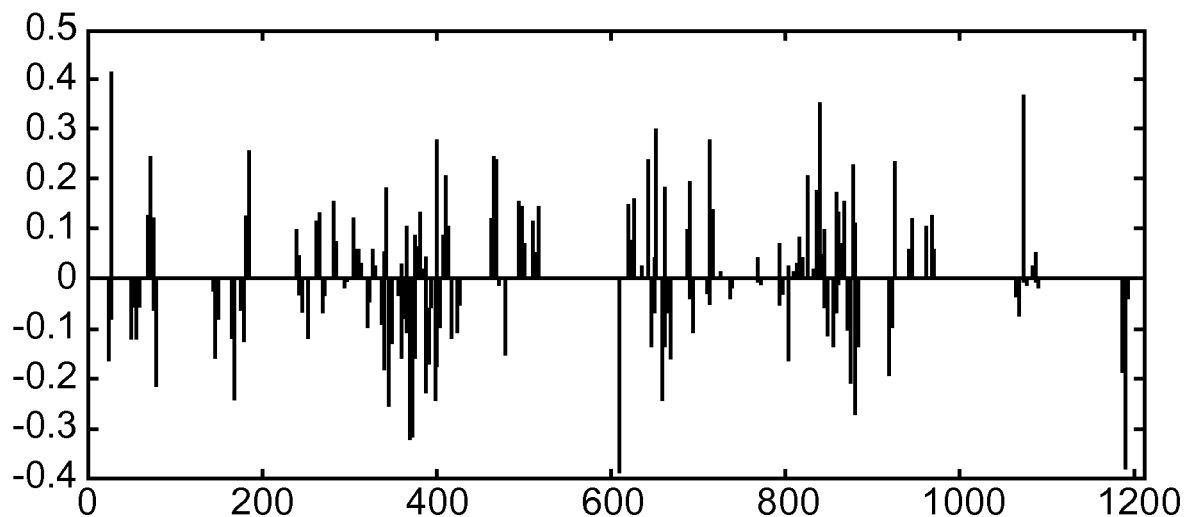
FIG. 8C displays coefficients from conventional $l^2$-minimization, using the test image from FIG. 8A, which shows a recovered solution that is not sparse.
Figure 8D:
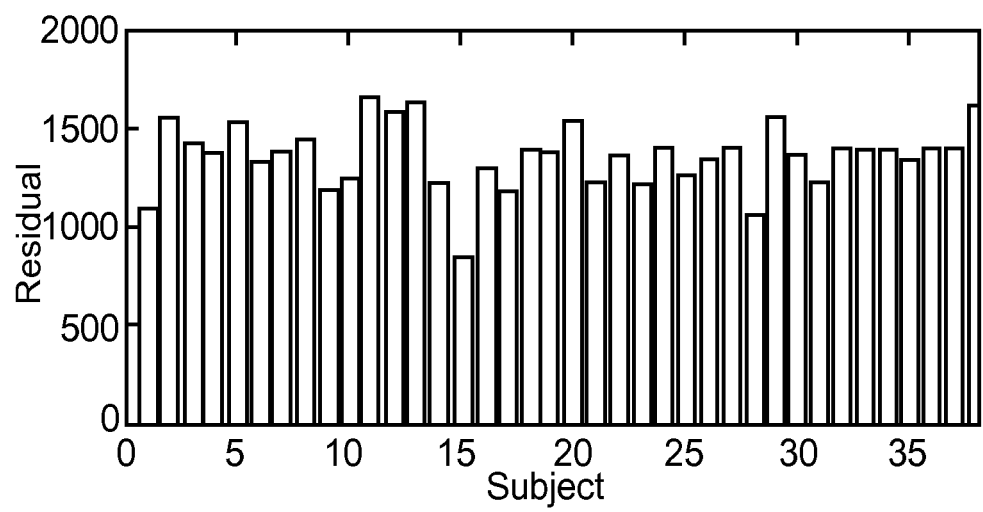
FIG. 8D displays residuals of the test image of FIG. 8C with respect to the projection $\delta_i(\hat{x})$ of the coefficients obtained by $l^2$-minimization.

To illustrate this contrast, FIG. 8C displays coefficients from conventional $l^2$-minimization, using the test image 174 from FIG. 8A, which shows a recovered solution that is not sparse. FIG. 8D displays residuals of the test image 174 of FIG. 8C with respect to the projection $\delta_i(\hat{x})$ of the coefficients obtained by $l^2$-minimization. The ratio between the two smallest residuals is about 1:1.3. The coefficients are much less sparse than those given by $l^1$-minimization in FIG. 8B, and the dominant coefficients are not associated with subject 1. As a result, the smallest residual in FIG. 8D does not correspond to the correct subject (subject 1).

Figure 9:
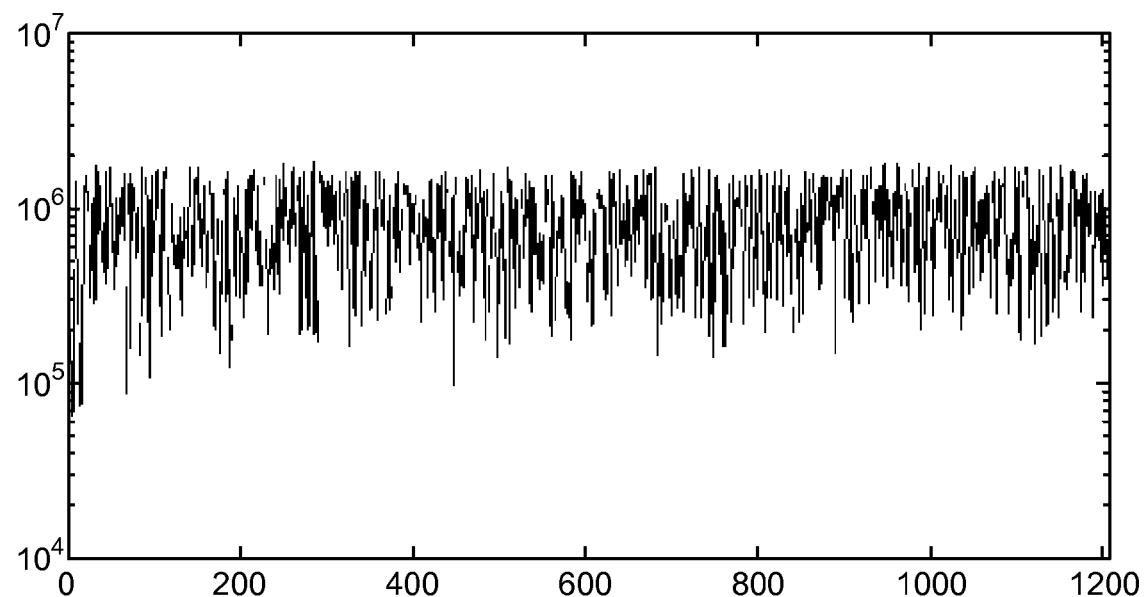
FIG. 9 displays the Euclidean distances between the test image of FIG. 8 and the training images.

Consider also a comparison of the disclosed method with the nearest-neighbor (NN) recognition algorithm. The NN classifier computes the Euclidean distances between the test vector y and the training vectors $v_1, \ldots, v_n$, and assigns the membership of y to be equal to the one of the training vectors with the closest distance. FIG. 9 displays the Euclidean distances between the test image 174 of FIG. 8A and the training images. Clearly, recognition performed using the distance metric is less effective than the $l^1$ solution in FIG. 8. Quantitatively, the total recognition accuracy for the disclosed method is 92.4% over the whole testing set, and the accuracy for NN is 61.81%.

Figure 10A:
FIGS. 10A and 10B display, respectively, examples of a right-eye feature and of a half-face feature.
Figure 10B:

FIGS. 10A and 10B display, respectively, examples of a right-eye feature and of a half-face feature. In the second experiment, the proposed algorithm is tested using the following two partial face features: (1) Half faces: the system 100 uses the left half of a face image as a partial face feature (shown in FIG. 10B and Table 2), which corresponds to the right half face of the subject; and (2) Right eyes: it is known in the study of human vision that the region around the eyes is one of the most informative features for face recognition (shown in FIG. 10A and Table 2). Extracted are 60×84 right-eye regions from the face images as another type of partial face feature.

Table 2, below, compares the performances of the proposed method and the NN classifier. In general, all state-of-the-art systems in image-based object recognition and image categorization do not utilize the sparsity constraint, and therefore, significantly underperform when compared with the proposed method.

TABLE 2

| | Features | |
|---|---|---|
| | Right-Eye | Half-Face |
| Dimension (d) | 5,040 | 16,128 |
| Algorithm 1 [%] | 93.5 | 98.4 |
| NN [%] | 60.73 | 65.12 |

FIGS. 11A, 11B, 11C, 11D, and 11E display recognition under varying levels of occlusion, respectively: (A) 30% occluded test face images from Extended Yale B; (B) Estimated sparse errors, $\hat{e}_1$; (C) plotted estimated sparse coefficients, $\hat{x}_1$; (D) reconstructed images, $y_r$; and (E) plotted recognition rates of Algorithm 1 and of three competitors.

The Extended Yale B Face Database (cropped and normalized) was used for this experiment. This dataset contains frontal images of 38 subjects under various illumination conditions. Subsets 1 and 2 (717 images, normal-to-moderate lighting conditions) were chosen for training, and Subset 3 (453 images, more extreme lighting conditions) for testing. Without occlusion, this is a relatively easy recognition problem. This choice is deliberate, in order to isolate the effect of occlusion. The images are resized to 96×84 pixels, so in this case B is an 8,064×8,761 matrix. Each of the training images $v_i$ is scaled to have unit $l^2$ norm. For this dataset, EBP(B)≈1,185, suggesting that perfect reconstruction can be achieved up to 13.3% percent occlusion.

The machinery used to estimate EBP(·) is based on the intuition of FIGS. 5A and 5B and the geometry of the $l^1$-ball. While known algorithms for exactly computing EBP(·) are combinatorial in nature, good upper bounds can be obtained by restricting the search for intersections between R(B) and the $l^2$-ball to an appropriate subset of R(B). We simulate various levels of occlusion, from 0% to 50%, by replacing a randomly located block of each test image with an unrelated image, as in FIG. 11A. Methods that select fixed facial features or blocks of the image are less likely to succeed here, due to the unpredictable location of the occlusion.

Figure 11A:
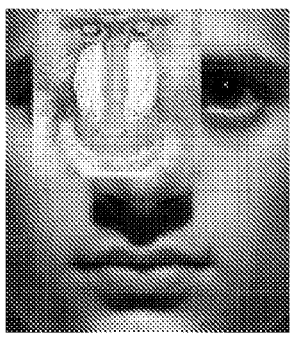
FIGS. 11A, 11B, 11C, 11D, and 11E display recognition under varying levels of occlusion, respectively: (A) 30% occluded test face images from Extended Yale B; (B) Estimated sparse errors, $\hat{e}_1$; (C) plotted estimated sparse coefficients, $\hat{x}_1$; (D) reconstructed images, $y_r$; and (E) plotted recognition rates of Algorithm 1 and of three competitors.
Figure 11B:
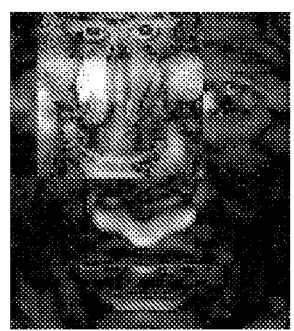
Figure 11C:
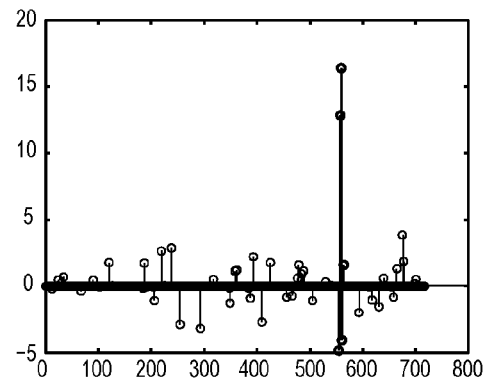
Figure 11D:
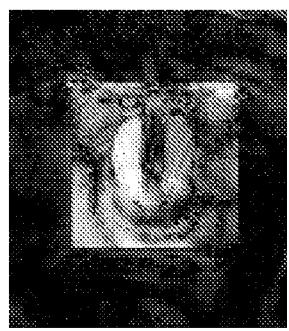
Figure 11D:
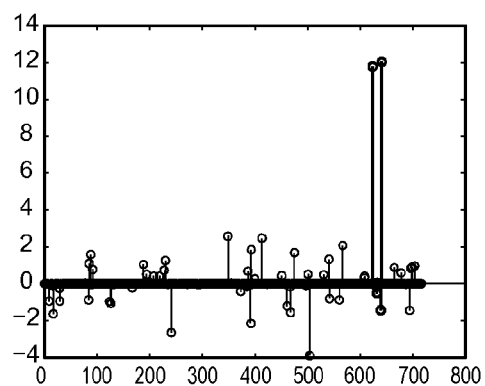
Figure 11D:
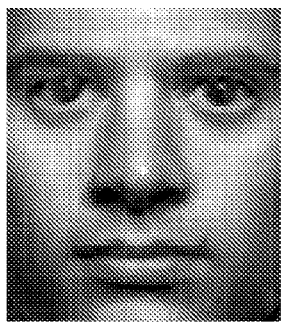
Figure 11D:
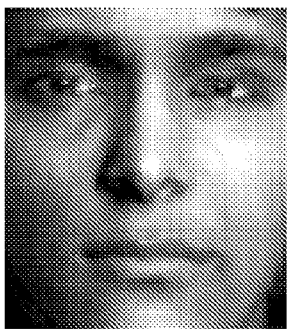

FIG. 11A shows two representative results of Algorithm 1 with 30% occlusion. In the second row, the entire center of the face is occluded; this is a difficult recognition task even for humans. FIG. 11B shows the magnitude of the estimated error $\hat{e}_1$. Notice that $\hat{e}_1$ compensates not only for occlusion due to the baboon, but also for the violation of the linear subspace model caused by the shadow under the nose. FIG. 11C plots the estimated coefficient vector $\hat{x}_1$. The dark, tall entries are coefficients corresponding to the true class of the test image. In both examples, the estimated coefficients are indeed sparse, and have large magnitude only for training images of the same person. In both cases, Algorithm 1 correctly classifies the occluded image.

The disclosed method is quantitatively compared to three popular techniques in the vision literature. The Principal Component Analysis (PCA) approach of Turk et al. is not robust to occlusion, but provides a standard baseline for comparison. M. Turk and A. Pentland, "Eigenfaces for recognition," *Journal of Cognitive Neuroscience*, vol. 3, no. 1, pp. 71-86, 1991. Following Georghiades et al., the system 100 normalizes the image pixels to have zero mean and unit variance before applying PCA. A. Georghiades, P. Belhumeur, and D. Kriegman, "From few to many: Illumination cone models for face recognition under variable lighting and pose,"

*IEEE Transactions on Pattern Analysis and Machine Intelligence*, vol. 23, no. 6, pp. 643-660, 2001. For PCA, Independent Component Analysis (ICA), and Local Non-negative Matrix Factorization (LNMF), the number of basis components is chosen to give the optimal test performance over the range {100, 200, 300, 400, 500, 600}. ICA architecture I attempts to express the training set as a linear combination of statistically independent basis images. LNMF approximates the training set as an additive combination of basis images, computed with a bias toward sparse bases.

Figure 11E:
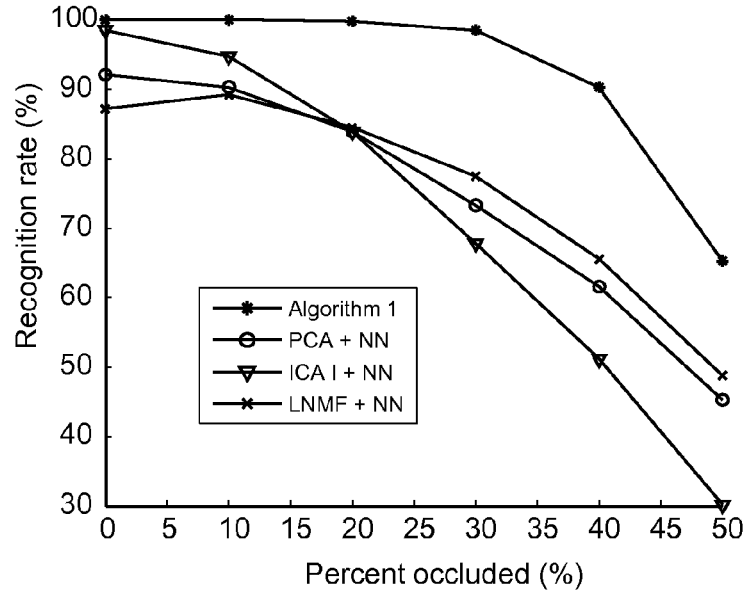

FIG. 11E shows the recognition rates of all four algorithms, with the top-most curve being that from Algorithm 1, which significantly outperforms its competitors for all levels of occlusion. For up to 30% occlusion, Algorithm 1 performs almost perfectly, correctly identifying over 98% of test subjects. Even at 40% occlusion, only 9.7% of subjects are misclassified (Table 3).

TABLE 3

QUANTITATIVE PERFORMANCE: RECOGNITION RATE OF ALGORITHM 1 ON EXTENDED YALE B WITH VARYING LEVELS OF OCCLUSION

| | Occlusion | | | | | |
|---|---|---|---|---|---|---|
| | 0% | 10% | 20% | 30% | 40% | 50% |
| Rec. Rate | 100% | 100% | 99.8% | 98.5% | 90.3% | 65.3% |

This result has interesting implications for the debate over the use of holistic versus local features in face recognition. It has been suggested that both ICA I and LNMF are robust to occlusion: because their bases are locally concentrated, occlusion corrupts only a fraction of the coefficients. By contrast, if one uses $l^2$-minimization (orthogonal projection) to express an occluded image in terms of a holistic basis such as the training images themselves, all of the coefficients may be corrupted (as in FIG. 4D). The implication here is that the problem is not the choice of representing the test image in terms of a holistic or local basis, but rather how that representation is computed. Properly harnessing redundancy and sparsity is directly correlated to error correction and robustness. Extracting local or disjoint features can only reduce redundancy, and subsequently reduce robustness.

Recognition may be achieved despite random corruption. The previous examples considered structured occlusions that blocked contiguous regions of the face. Notice, however, that the disclosed method makes no assumptions about the support of the occluded region; it could be chosen completely at random. In this example, a varying percentage of randomly chosen pixels from the Extended Yale B test images are corrupted, replacing their values with independently identically distributed (iid) samples from a uniform distribution. The percentage of occluded pixels is varied from 0% to 70%.

FIGS. 12A, 12B, 12C, 12D, and 12E display recognition under random corruption, respectively: (A) images from Extended Yale B with random corruption, by rows from top to bottom, in an amount of 30%, 50%, and 70% corrupted; (B) estimated errors, $\hat{e}^1$; (C) plotted estimated sparse coefficients, $\hat{x}_1$; (D) reconstructed images, $y_r$; and (E) plotted recognition rates of Algorithms 1 and those of three competitors.

Figures 12A, 12B, 12C, 12D:
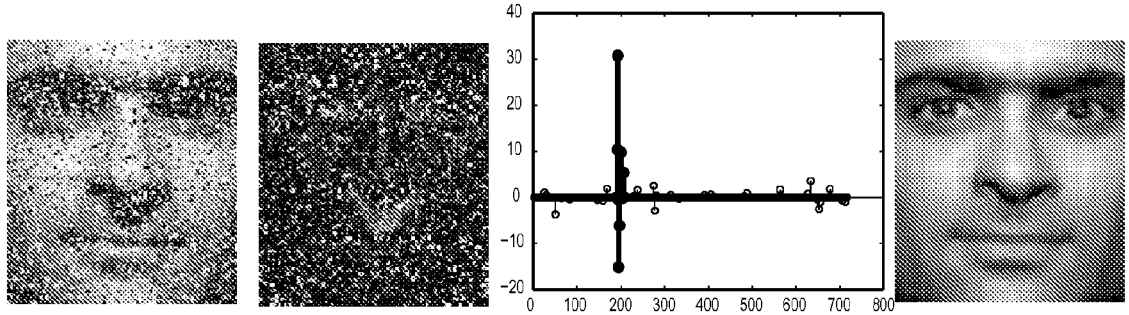
FIGS. 12A, 12B, 12C, 12D, and 12E display recognition under random corruption, respectively: (A) images from Extended Yale B with random corruption, by rows from top to bottom, in an amount of 30%, 50%, and 70% corrupted; (B) estimated errors, $\hat{e}_1$; (C) plotted estimated sparse coefficients, $\hat{x}_1$; (D) reconstructed images, $y_r$; and (E) plotted recognition rates of Algorithms 1 and those of three competitors.

FIG. 12A visualizes several results. To the human eye, the corrupted images are barely recognizable as faces; determining their identity seems out of the question. Yet even in this extreme circumstance, Algorithm 1 correctly recovers the identity of the subject as shown in FIG. 12D. While such random patterns of corruption are not typical of real-world occlusions, this robustness might be useful for recognition over extremely unreliable communication channels, or even for recognizing faces in outdoor environments (e.g. in the presence of rain or partially occluding foliage).

Figure 12E:
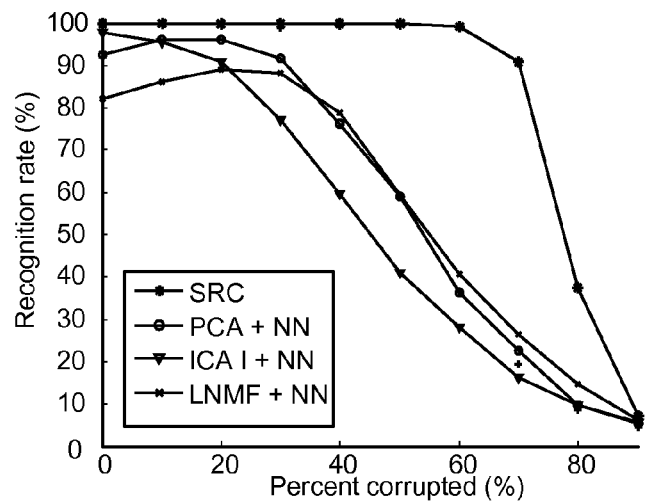
Figure 14D:
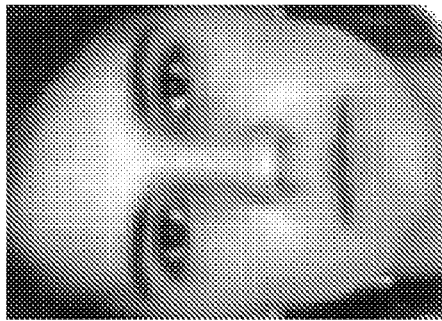
FIGS. 14A, 14B, 14C, and 14D display recognition despite disguises, respectively: (A) a test image from the Aleix-Robert (AR) Database, occluded by sunglasses; (B) magnitude of estimated sparse error, $\hat{e}_1$; (C) estimated sparse coefficient vector, $\hat{x}_1$; and (D) reconstructed image, $y_r$.
Figure 14C:
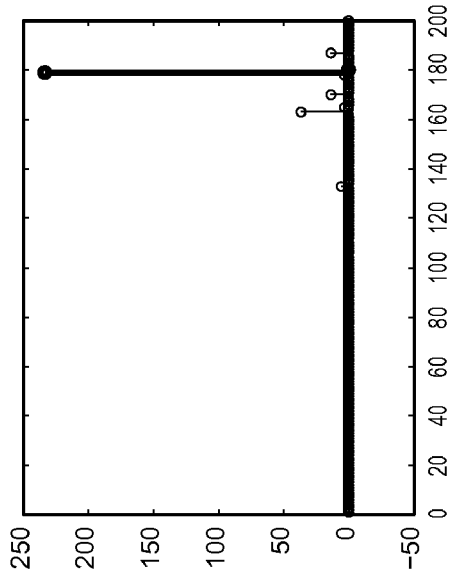
Figure 14B:
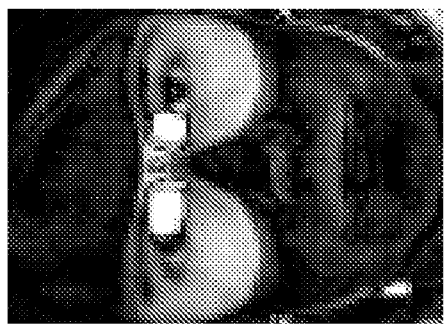
Figure 14A:
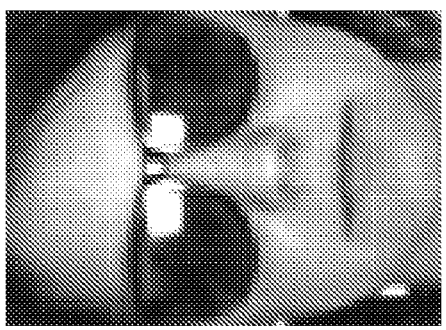
Figure 15D:
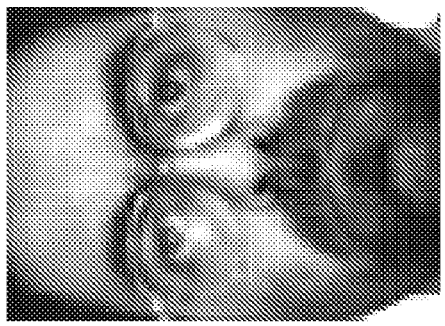
FIGS. 15A, 15B, 15C, and 15D display a failed example of recognition, respectively: (A) a test image from the AR database, roughly 40% occluded by a scarf; (B) magnitude of estimated sparse error, $\hat{e}_1$; (C) estimated sparse coefficient vector, $\hat{x}_1$; and (D) training image with the largest coefficient, a bearded man.
Figure 15C:
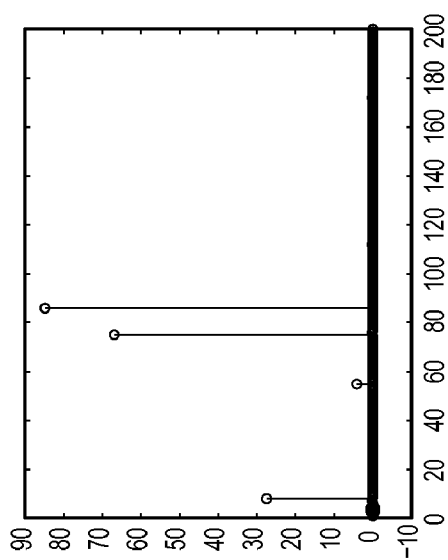
Figure 15B:
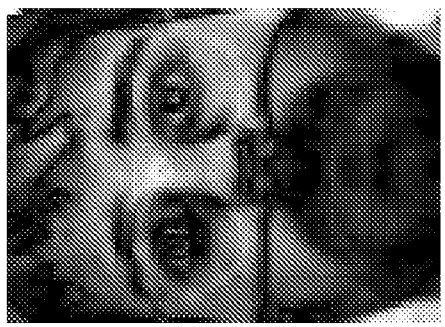
Figure 15A:
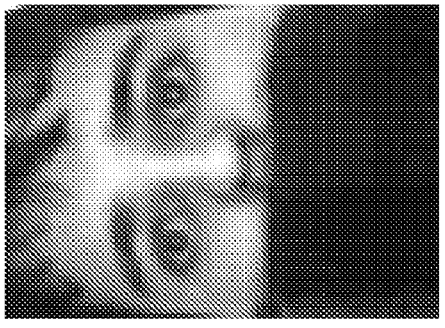

FIG. 12E plots the recognition performance of Algorithm 1 and the three competitors previously discussed as a function of the level of corruption. From 0 up to 50 percent occlusion, Algorithm 1 correctly classifies all subjects. Even at 70 percent occlusion, the recognition rate is still 93.2% (see Table 4). From FIG. 12E, it is seen that Algorithm 1 dramatically outperforms competitors. At 50 percent corruption, none of the others achieves higher than 60% recognition rate, while the proposed approach performs flawlessly.

TABLE 4

RECOGNITION RATE OF ALGORITHM 1 ON EXTENDED YALE B WITH VARYING LEVEL OF RANDOM CORRUPTION

| | Corruption (%) | | | | | | | | | |
|---|---|---|---|---|---|---|---|---|---|---|
| | 0 | 10 | 20 | 30 | 40 | 50 | 60 | 70 | 80 | 90 |
| Rec. Rate (%) | 100 | 100 | 100 | 100 | 100 | 100 | 99.8 | 93.2 | 44.2 | 9.3 |

Notice from FIG. 12E that the recognition rates for PCA and LNMF actually increase with 10 and 20 percent corruption. This phenomenon is due to the differences in the statistics of the training and test image: the test images are taken from more extreme lighting conditions and hence are darker in certain areas (see FIG. 20). The uniform noise contains more bright pixels than the test images, and when this corruption is filtered through the PCA and LNMF bases, its main effect is to increase the magnitude of the coefficients, essentially compensating for this overall illumination difference. Notice, however, that as the magnitude of the noise grows larger than 30%, the performance of these algorithms degrades significantly, while the performance of Algorithm 1 remains stable and superior.

Experiments in human vision indicate that the eye and eyebrow region is most important for human face recognition; if the eyebrows are removed, even familiar faces become quite difficult to recognize. The effect of occluding various image regions is tested on Algorithm 1, using the Extended Yale B database. Three separate test sets are generated in which a black patch occludes the eyes, nose and mouth, respectively.

FIGS. 13A to 13D display an effect of occluding different regions, respectively, the nose, the mouth, and eyes, and a recognition rate of each. In each, the black box occludes 20% of the image. With the nose area occluded, Algorithm 1 still achieves 98.7% recognition, whereas occluding the eyes and eyebrows reduces the recognition rate to 95.6%. This corroborates prior results, wherein eyes appear to be the most important feature for Algorithm 1 as well.

Recognition may be achieved despite a subject wearing a disguise on his or her face. For this experiment, the system 100 uses a subset of the Aleix-Robert (AR) Face Database, consisting of 600 images (6 each) of 100 subjects, 50 male and 50 female. All of the images are cropped, resized to 83×60 pixels, and normalized to have $l^2$-norm 1. For training, the system 100 used 200 images of unoccluded frontal views with neutral facial expression, giving a matrix B of size 4, 980×5180. The system 100 estimated EBP(B)≈845, indicating that perfect reconstruction is possible up to 16.9% occlusion.

FIGS. 14A, 14B, 14C, and 14D display recognition despite disguises, respectively: (A) a test image from the AR Database, occluded by sunglasses; (B) magnitude of estimated sparse error, $\hat{e}_1$; (C) estimated sparse coefficient vector, $\hat{x}_1$; and (D) reconstructed image, $y_r$. Two separate test sets of 200 images were considered. The first test set contains images of the subjects wearing sunglasses, which occlude roughly 20% of the image. FIG. 14 shows a successful example from this test set. Notice that $\hat{e}_1$ compensates for misalignment of the image edges as well as occlusion due to sunglasses. Larger misalignments do cause problems, however. Most of the failures on this dataset seem to be due to registration errors.

FIGS. 15A, 15B, 15C, and 15D display a failed example of recognition, respectively: (A) a test image from the AR database, roughly 40% occluded by a scarf; (B) magnitude of estimated sparse error, $\hat{e}_1$; (C) estimated sparse coefficient vector, $\hat{x}_1$; and (D) a training image 174 with the largest coefficient, a bearded man. The second test set considered contains images of the subjects wearing a scarf, which occludes roughly 40% of the image. Since the occlusion level is more than twice EBP(B), Algorithm 1 is unlikely to succeed in this domain. FIG. 15 shows that this is indeed the case. Notice that the image with the largest coefficient (FIG. 15D) is that of a bearded man whose mouth region most closely resembles the scarf.

Table 5, below, compares Algorithm 1 to the three competitors described in the previous section. On faces occluded by sunglasses, Algorithm 1 achieves a recognition rate of 87%, more than 17% better than the nearest competitor. For occlusion by scarves, its recognition rate is 59.5%, better than chance but far below the recognition rate with sunglasses. This confirms that although Algorithm 1 is provably robust to arbitrary occlusions up to EBP(B), beyond that point it is sensitive to occlusions that resemble regions of a training image 174 from a different individual. Because the amount of occlusion exceeds the breakdown point, additional assumptions are needed to achieve good recognition. Below is described how spatial continuity of the occlusion can be exploited within the disclosed framework, allowing successful recognition even in this difficult circumstance.

TABLE 5

PERFORMANCE ON THE AR DATABASE: IN THE DOMAIN WHERE ITS ASSUMPTIONS HOLD, ALGORITHM 1 ACHIEVES THE BEST RECOGNITION RATE

| Algorithms | Recognition rate with sunglasses | Recognition rate with scarves |
|---|---|---|
| Algorithm 1 | 87.0% (97.5%) | 59.5% (93.5%) |
| Results in ( ) use partition. | | |
| PCA + NN | 70.0% | 12.0% |
| ICA I + NN | 53.5% | 15.0% |
| LNMF + NN | 33.5% | 24.0% |

FIGS. 16A, 16B, and 16C display a valid test image, respectively: (A) test image, 30% occluded; (B) recovered coefficients; and (C) value of Equation 12, written below, for each class, i. Practical recognition systems are sometimes confronted with invalid test images: images of some person not in the gallery of training images, or even images of some completely different object. Thus, in addition to returning a best match within the training set, an effective recognition system 100 should also return a measure of confidence as to whether the test image represents any of the gallery subjects, or even reject invalid images outright. One simple and effective heuristic comes from the observation that the coefficients $\hat{x}$ associated with invalid test images are generally not concentrated on any individual subject, but rather are spread across several training subjects as in FIG. 16. We therefore reject images for which $$\max_i \|\delta_i(\hat{x})\|_1 \div \|\hat{x}\|_1 < \upsilon \qquad (12)$$

where $\upsilon$ is a preselected threshold.

This idea was tested on the Extended Yale B database (150), using Subsets 1 and 2 for training and Subset 3 for testing as before. The simulation was executed at varying levels of occlusion (10%, 30%, 50%) by replacing a randomly chosen block of each test image with an unrelated image. However, in this example, only half of the subjects in the training set are included. The system 100 was tested for its ability to determine whether a given test subject is in the training database or not by sweeping the threshold u through a range of values in [0, 1], generating the receiver operator characteristic (ROC) curves in FIG. 18.

Figure 18A:
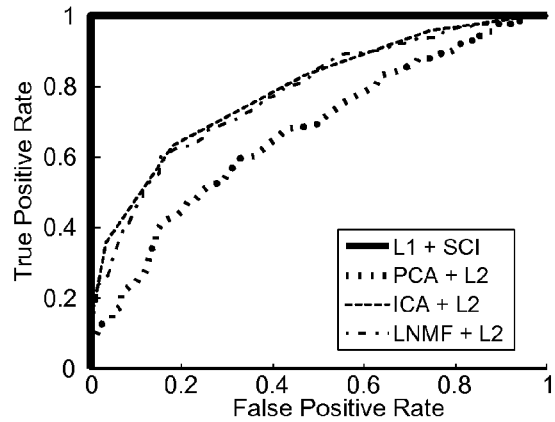
FIGS. 18A, 18B, 18C, and 18D display receiver operator characteristics (ROC) curves for outlier rejection, respectively: (A) No Occlusion; (B) 10% occlusion; (C) 30% occlusion; and (D) 50% occlusion, in which the top-most curve in each represents computation with sparse representation as in Algorithm 1 and then rejecting outliers via Equation 12.
Figure 18B:
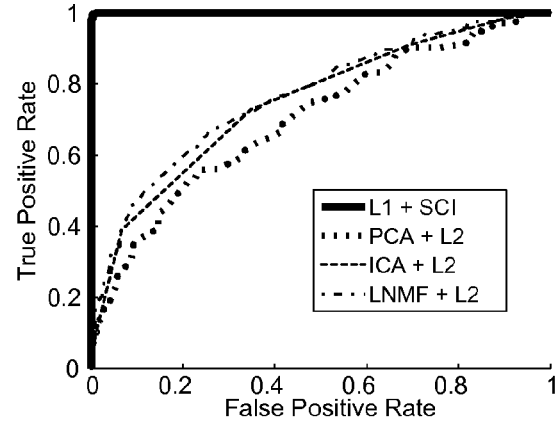
Figure 18C:
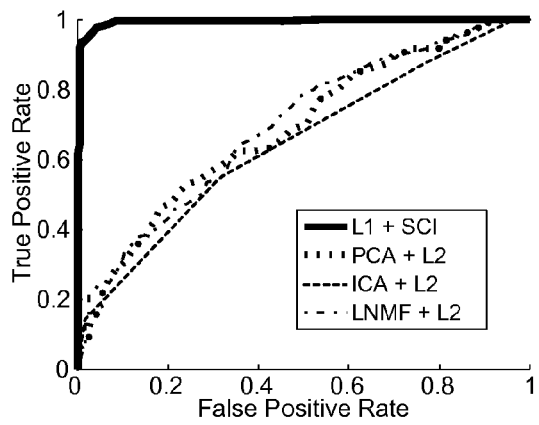
Figure 18D:
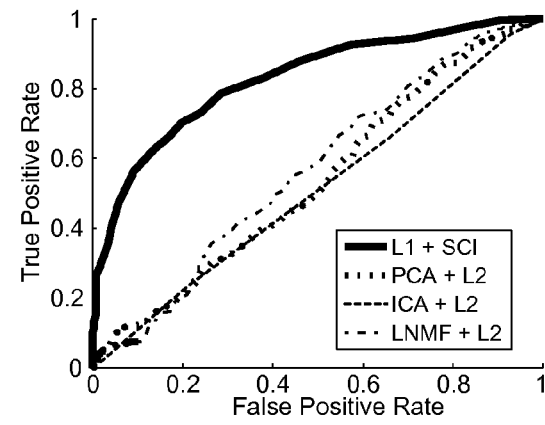

FIGS. 17A, 17B, and 17C display an invalid test image to contrast FIGS. 16A-16C, respectively: (A) test image, 30% occluded; (B) recovered coefficients; and (C) value of Equation 12 for each class, i, wherein the coefficients for the valid test image (FIG. 16B) are much more sparse, and the ratio from Equation 12 is much larger. For comparison, outlier rejection was considered by thresholding the Euclidean distance between features of the test image 174 and features of the nearest training images within the PCA, ICA, and LNMF feature spaces. These curves are shown in FIGS. 18A through 18B.

FIGS. 18A, 18B, 18C, and 18D display receiver operator characteristics (ROC) curves for outlier rejection, respectively: (A) No Occlusion; (B) 10% occlusion; (C) 30% occlusion; and (D) 50% occlusion, in which the top-most curve in each represents computation with sparse representation as in Algorithm 1 and then rejecting outliers via Equation 12. The vertical axis in each of FIGS. 18A through 18D is a true positive rate. The horizontal axis is a false positive rate. The upper, solid curve in each is generated by computing a sparse representation as in Algorithm 1. Notice that the heuristic of Equation 12 performs nearly perfectly at 10% and 30% occlusion. At 50% occlusion, it still outperforms its three competitors, and is the only one of four algorithms that performs significantly better than chance.

In the above experiments, with no assumptions on the support of the occlusion, e, Algorithm 1 was still able to tolerate arbitrary occlusions of up to 30% of the image pixels. Moreover, in cases where the occlusion is roughly orthogonal to all of the training images (e.g., the corruption example in FIG. 12), the algorithm tolerates up to 70% corruption. Nevertheless, thus far the fact that, in many real recognition scenarios, the occlusion falls on some patch of image pixels which is a priori unknown, but is known to be connected, has not been exploited. A somewhat traditional approach to exploiting this information in face recognition is to partition the image into blocks and process each block independently. The results for individual blocks are then aggregated, for example, by voting, while discarding blocks believed to be occluded. The major difficulty with this approach is that the occlusion cannot be expected to respect any fixed partition; while only a few blocks are assumed to be completely occluded, some or all of the remaining blocks may be partially occluded. Thus, in such a scheme there is still a need for robust techniques within each block.

If the amount of occlusion is known to be less than EBP(B), Algorithm 1 can and should be directly applied, as it will achieve superior performance. If, however, this cannot be guaranteed, performing an $l^1$-minimization within each block can increase the level of occlusion the algorithm tolerates, at the expense of generality. Moreover, such an approach strictly improves existing block techniques based on non-robust methods such as PCA.

Figures 19A, 19B, 19C, 19D:
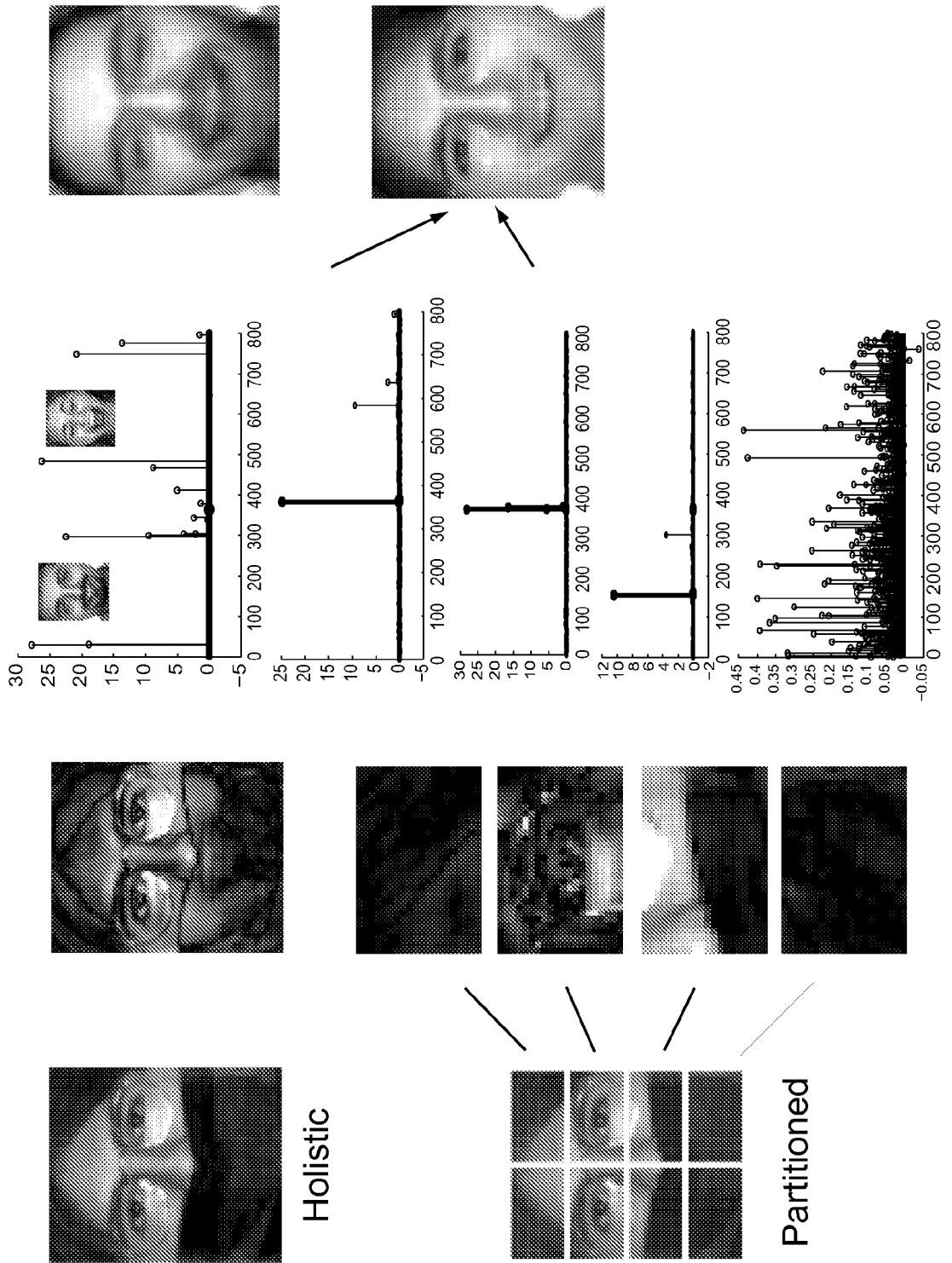
FIGS. 19A, 19B, 19C, and 19D display a partition scheme to tackle contiguous disguise, respectively: (A) test image, occluded by scarf, both holistic and partitioned; (B) estimated sparse error $\hat{e}_1$; (C) estimated sparse coefficients $\hat{x}_1$; and (D) reconstructed images, y.

FIGS. 19A, 19B, 19C, and 19D display a partition scheme to tackle contiguous disguise, respectively: (A) test image, occluded by scarf, both holistic and partitioned; (B) estimated sparse error $\hat{e}_1$; (C) estimated sparse coefficients $\hat{x}_1$; and (D) reconstructed image, y. The small images pictured in FIG. 19B are the training images corresponding to large coefficients. The top row visualizes the performance of Algorithm 1 on the whole image (holistic). Notice that the two largest coefficients correspond to a bearded man and a screaming woman (top of FIG. 19D), two images whose mouth region resembles the occluding scarf. The second row visualizes the partition-based scheme described above. FIG. 19C shows the performance of all the algorithms for both types of occlusion. That is, FIG. 19C compares the sparse coefficients recovered from the image as a whole (top) to those recovered from individual blocks (bottom four graphs). For this occlusion, recognition based on blocks succeeds, whereas the wholistic version of the algorithm fails, as shown in FIG. 19D.

Each of the training images is partitioned into L blocks of size a×b, producing a set of matrices $A^{(1)}, \ldots, A^{(L)} \in \Re^{p \times n}$, where p=ab. The test is similarly partitioned image y into $y^{(1)} \ldots y^{(L)} \in \Re^p$. The l-th block of the test image is written as a sparse linear combination $A^{(l)}x^{(l)}$ of l-th blocks of the training images, plus a sparse error $e^{(l)} \in \Re^p$: $y^{(l)} = A^{(l)}x^{(l)} + e^{(l)}$. One can again recover a sparse w=[x e] $\in \Re^{n+p}$ by $l^1$-minimization:

$$\hat{w}^{(l)} \doteq \underset{w \in \mathcal{R}^{n+p}}{\operatorname{argmin}} \|w\|_1 \text{ s.t.} \lfloor A^l I \rfloor w = y^{(l)}. \quad (13)$$

From this decomposition, completely occluded blocks are detected via Equation 13. The same classifier as in Algorithm 1 is applied in each of the non-occluded blocks. These valid classification results are then aggregated by majority vote.

The images are partitioned into eight blocks of size 20×30 pixels, and set the threshold υ=0.26. Doing so increases the overall recognition rate on scarf images from 59.5% to 93.5%, and also improves the recognition rate on sunglass images from 87.0% to 97.5%. Table 6 shows a more complete breakdown of the recognition rate by gender and type of occlusion. Interestingly, females are consistently more difficult to recognize. This may be due to the presence of additional distinguishing features (i.e. facial hair) on the male face, as well as increased variability in female hair appearance.

TABLE 6

GENDER/CONDITION BREAKDOWN
OF RECOGNITION RATE ON AR USING BLOCKS

| Case | Rec. rate | Case | Rec. rate |
| --- | --- | --- | --- |
| Sunglasses | 97.5% | Scarves | 93.5% |
| Men | 97.5% | Women | 93.5% |
| Men, sunglasses | 100% | Women, sunglasses | 95% |
| Men, scarves | 95% | Women, scarves | 92% |

One of many important considerations in designing recognition systems is selecting the number of training images as well as the conditions (viewpoint, expression, lighting) under which they are to be taken.

The set of training images should be extensive enough to span the conditions that occur in the test set, e.g., they should be "sufficient" from a pattern recognition standpoint. The notion of equivalence breakdown point (EBP) discussed above provides a different, quantitative measure of the quality of the training set: higher EBP implies greater robustness to occlusion.

Figure 20:
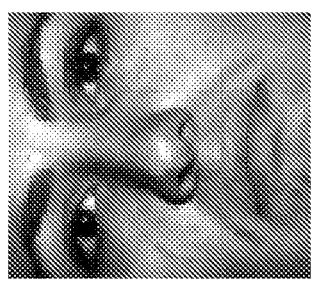
FIG. 20 displays a robust design in four subsets of Extended Yale B containing increasingly extreme lighting conditions to exhibit an equivalence breakdown point (EBP) for each subset.
Figure 20:
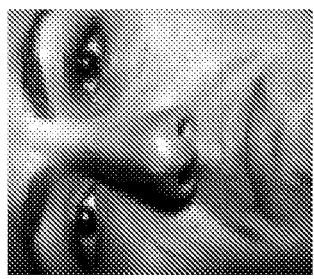
Figure 20:
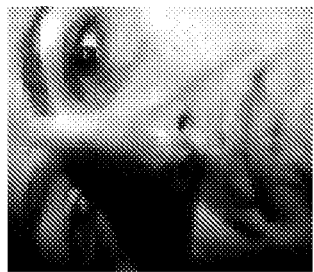
Figure 20:

In fact, these two concerns, sufficiency and robustness, are complementary. FIG. 20 displays a robust design in four subsets of Extended Yale B containing increasingly extreme lighting conditions to exhibit an equivalence breakdown point (EBP) for each subset. Table 7 shows the estimated EBP for each training subset. Notice that the highest EBP, ≈1,330, is achieved with Subset 4, which has the most extreme lighting conditions.

TABLE 7

| | Training | | | |
| --- | --- | --- | --- | --- |
| | 1 | 2 | 3 | 4 |
| Est. EBP | 1,124 | 1,122 | 1,190 | 1,330 |

Figure 21:
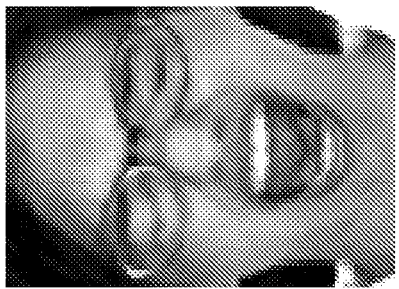
FIG. 21 displays a robust design using four facial expressions from the AR database to exhibit an EBP from different pairs of the four facial expressions.
Figure 21:
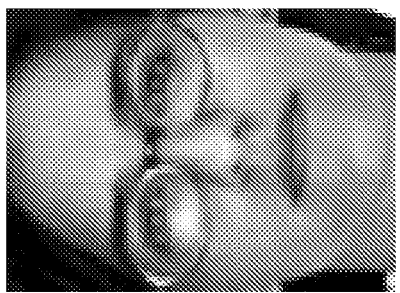
Figure 21:
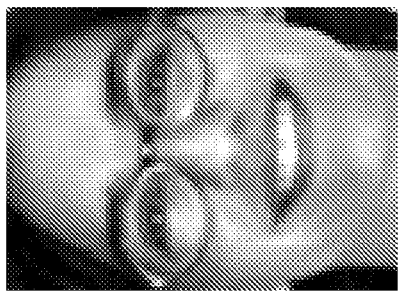
Figure 21:
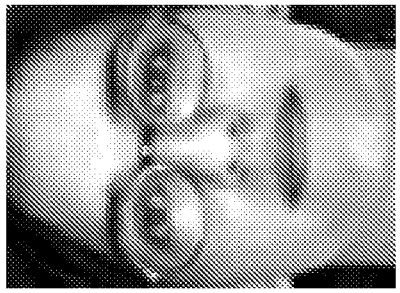

FIG. 21 displays a robust design using four facial expressions from the AR database to exhibit an EBP from different pairs of the four facial expressions. Table 8 shows the estimated EBP for subsets of the AR database with different facial expressions. The dataset contains four facial expressions, Neutral, Happy, Angry, and Scream, pictured in FIG. 20. Training sets are generated from all pairs of expressions and the EBP of each is computed. The highest breakdown points are achieved by the Neutral+Happy and Happy+Scream combinations, while the lowest comes from Neutral+Angry. Notice that the Neutral and Angry images are quite similar in appearance, while (for example) Happy and Scream are very dissimilar.

TABLE 8

| | Training | | | | | |
|---|---|---|---|---|---|---|
| | N + H | N + A | N + S | H + A | H + S | A + S |
| Est. EBP | 585 | 421 | 545 | 490 | 550 | 510 |

Thus, both for varying lighting (FIG. 20) and expression (FIG. 21), training sets with wider variation in the images allow greater robustness to occlusion. Designing a training set that allows recognition under widely varying conditions does not hinder Algorithm 1; in fact it helps it. However, the training set should not contain too many similar images, as in the Neutral+Angry example of FIG. 21. In the language of signal representation, the training images should form an incoherent dictionary.

Automatic face recognition remains one of the most active areas in computer vision. While classical algorithms remain popular for their speed and simplicity, they tend to fail on large-scale, practical tests, falling short of the ultimate goal of truly automating face recognition for real-world applications such as access control for facilities, computer systems and automatic teller machines. These applications are interesting both for their potential sociological impact and also because they allow the possibility of carefully controlling the acquisition of the training data, allowing more tractable and reliable solutions. In this setting, one promising direction, set forth above, casts the recognition problem as one of finding a sparse representation of the test image in terms of the training set as a whole, up to some sparse error due to occlusion.

While the above achieves impressive results on public datasets taken under controlled laboratory conditions such as the Extended Yale B database, it does not address two aspects of real world face recognition: significant variations in both the image domain and in the image value.

Figure 22A:
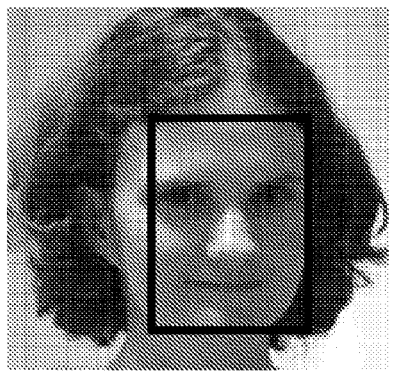
FIGS. 22A, 22B, and 22C display the compound effect of registration and illumination of a test subject, respectively: (A) an input face (black box) from Viola and Jones' face detector; (B) the input face well aligned (white box) with the training by Algorithm 2, but using only 24 frontal illuminations for training images for recognition; and (3) informative representation obtained by using both the well-aligned input face and sufficient illumination in the training.
Figure 22A:
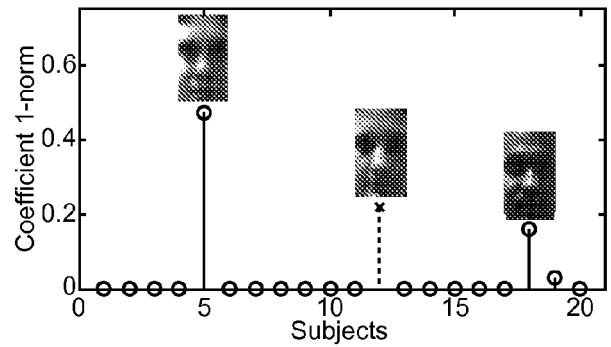
Figure 22B:
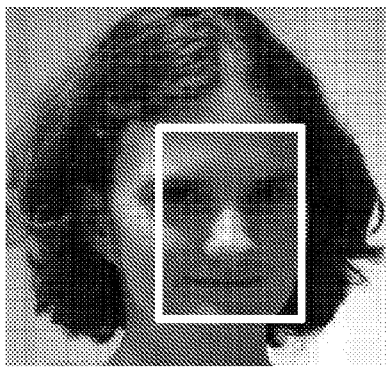
Figure 22B:
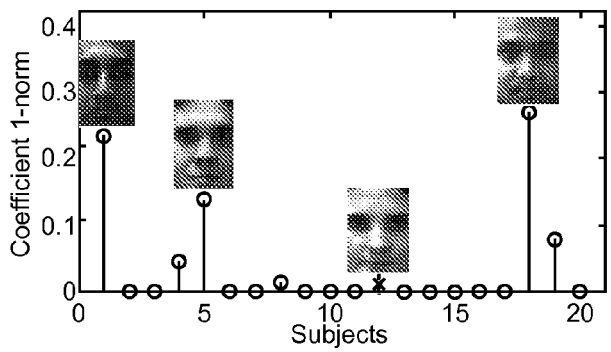
Figure 22C:
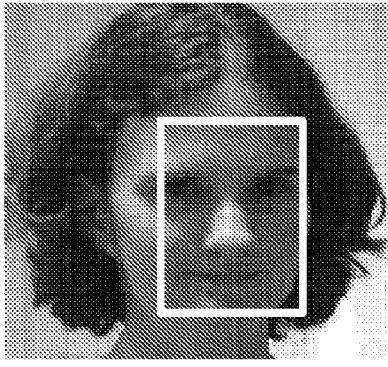
Figure 22C:
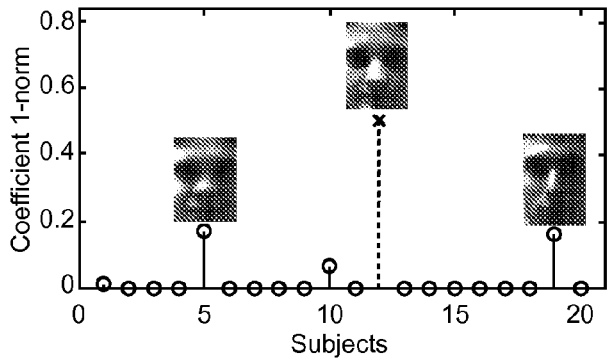
Figure 23D:
FIGS. 23A, 23B, 23C, and 23D display a comparison of a subject wearing sunglasses by $l^1$ (top) and $l^2$ (bottom) minimization, wherein respectively: (A) the dashed line is the initial face boundary given by the face detector and the solid line is the result of alignment; (B) a warped testing image using the estimated transformation of $y_o$; (C) reconstructed face $A_i x$ using the training images; and (D) image of the error, e.
Figure 23D:
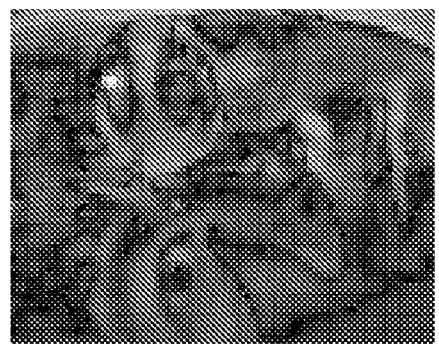
Figure 23C:
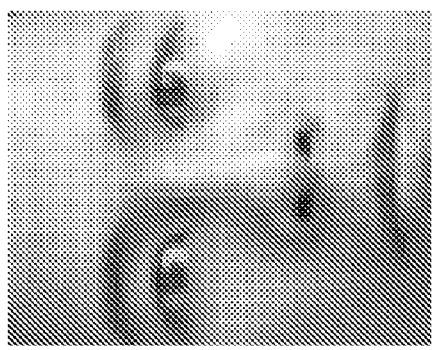
Figure 23C:
Figure 23B:
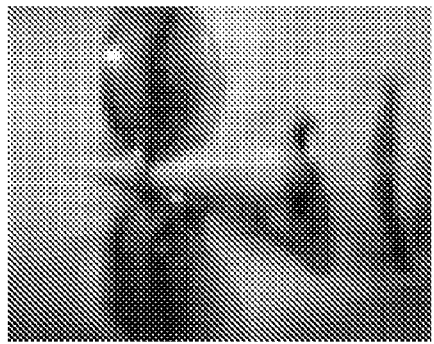
Figure 23B:
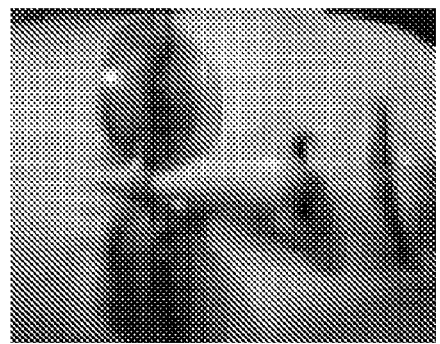
Figure 23A:
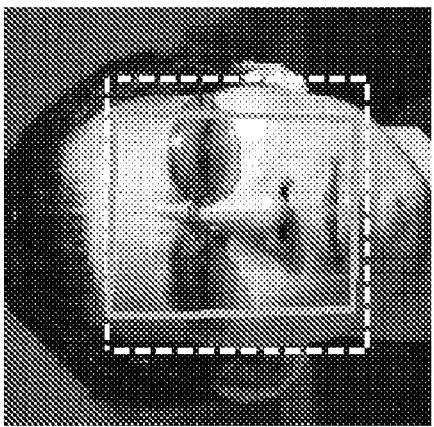
Figure 23A:
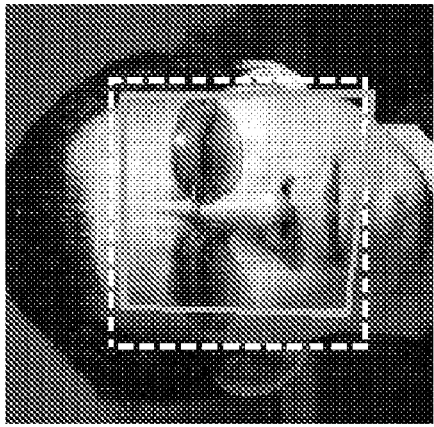

FIGS. 22A, 22B, and 22C display the compound effect of registration and illumination of a test subject, respectively: (A) an input face (black box) from Viola and Jones' face detector; (B) the input face well aligned (white box) with the training by Algorithm 2 (described below), but using only 24 frontal illuminations for training images for recognition; and (3) informative representation obtained by using both the well-aligned input face and sufficient illumination in the training. The task is to identify the test subject among 20 subjects. If the test face image, say obtained from an off-the-shelf face detector, has even a small amount of registration error against the training images (caused by mild pose, scale, or misalignment), the representation is no longer informative, even if sufficient illuminations are present in the training as shown in FIG. 22A. In addition, in order to sufficiently interpolate the illumination of a typical indoor (or outdoor) environment, illuminations from behind the subject are also needed in the training. Otherwise, even for perfectly aligned test images, the representation will not necessarily be sparse or informative, as shown in FIG. 22B. Unfortunately, most public face databases lack images with a significant component of rear (more than 90 degrees from frontal) illumination, either for training or testing.

Herein is shown how the two strongly coupled issues of registration and illumination can be naturally addressed within the sparse representation framework. Face registration, a challenging nonlinear problem, can be solved by a series of linear programs that iteratively minimize the sparsity of the registration error. This leads to an efficient and effective alignment algorithm for face images that works for a large range of variation in translation, rotation, scale, and pose, even when the face is only partially visible due to eyeglasses, hats, closed eyes and open mouth, sensor saturation, etc. Also proposed is a sufficient, if not the smallest, set of training illuminations that is capable of interpolating typical indoor and outdoor lighting, along with a practical hardware system for capturing them. Finally, demonstrated is the effectiveness of the proposed new methods with a complete face recognition system that is simple, stable, and scalable. The proposed algorithm performs robust automatic recognition of subjects from loosely controlled images taken both indoors and outdoors, using labeled frontal views of the subjects' faces under the proposed illuminations for training and an off-the-shelf face detector (124) to detect faces in images. Herein is used OpenCV implementation of the Viola and the Jones' face detector. P. Viola and M. J. Jones, "Robust real-time face detection," IJCV, 57:137-154, 2004.

As demonstrated in FIG. 22A, the main limitation of the sparse representation and classification (SRC) of Algorithm 1 is the assumption of pixel-accurate alignment between the test image 174 and the training set (150). This leads to brittleness under pose and misalignment, making it inappropriate for deployment outside a laboratory setting. Below is shown how this weakness can be rectified while still preserving the conceptual simplicity and good recognition performance of SRC.

SRC assumes access to the database (150) of multiple registered training images per subject, taken under varying illuminations. The images of subject i, stacked as vectors, form a matrix $A_i \in \Re^{m \times n}$. Taken together, all of the images form a large matrix $A=[A_1|A_2| \ldots |A_K] \in \Re^{m \times n}$. As discussed, a well-aligned test image $y_0$ can be represented as a sparse linear combination $Ax_o$ of all of the images in the database—assuming sufficient illumination of each plus a sparse error $e_o$ due to occlusion. The sparse representation can be recovered by minimizing the sum or the l-norm of x and $$\min \|x\|_1 + \|e\|_1 \text{ subj } y_0 = Ax + e \tag{14}$$

The l-norm of a vector x is the sum of absolute values of the entries.

Now suppose that $y_0$ is subject to some pose or misalignment, so that instead of observing $y_0$, observed is the warped image $y = y_0 \circ \tau^{-1}$, for some transformation $\tau \in T$ where T is a finite-dimensional group of transformations acting on the image domain. The transformed image y no longer has a sparse representation of the form $y = Ax_0 + e_0$, and naively applying Algorithm 1 is no longer appropriate, as seen in FIG. 22A.

Notice that if the true deformation $\tau^{-1}$ can be found, then its inverse $\tau$ can be applied to the test image and it again becomes possible to find a sparse representation of the resulting image, as $y \circ \tau = Ax_0 + e_0$. This sparsity provides a strong cue for finding the correct deformation $\tau$: conceptually, one would like to seek a transformation T that allows the sparsest representation, by solving $$\hat{\tau} = \arg\min_{x,e,\tau \in T} \|x\|_1 + \|e\|_1 \text{ subj } y \circ \tau = Ax + e. \tag{15}$$

For fixed $\tau$, this problem is jointly convex in x and e. However, as a simultaneous optimization over the coefficients x, error representation e, and transformation $\tau$, it is a difficult, non-convex optimization problem. One source of difficulty is the presence of multiple faces in the matrix A: Equation 15 has many local minima that correspond to aligning y to different subjects. In this sense, the misaligned recognition problem differs from the well-aligned version. For the well-aligned case, it is possible to directly solve for a global representation, with no concern for local minima. With possible misalignment, it is more appropriate to seek the best alignment of the test face with each subject i:

$$\hat{\tau} = \arg\min_{x,e,\tau \in T} \|x\|_1 + \|e\|_1 \ subj \ y \circ \tau_i = A_i x + e, \quad (16)$$

wherein $\|x\|_1$ is no longer penalized since $A_i$ includes only images of subject i and so x is no longer expected to be sparse. While the problem (16) is still nonconvex, for cases of practical interest in face recognition, a good initial guess for the transformation is available, e.g., from the output of a face detector 124. This initialization may be refined to an estimate of the true transformation by repeatedly linearizing about the current estimate of τ, and seeking representations of the form;

$$y_0\tau + J\Delta\tau = A_i x + e. \quad (17)$$

Here, $$J = \frac{\partial}{\partial \tau} y \circ \tau$$

is the Jacobian of y∘τ with respect to the transformation parameters τ, and Δτ is the step in τ. Equation 17 is underdetermined if the registration error e is allowed to be arbitrary. Near the correct alignment, the aligned testing image is expected to differ from $A_i x$ only for the minority of the pixels corrupted by occlusions. Thus, a deformation step Δτ is sought that best sparsifies the registration error e, in terms of its $l^1$-norm:

$$\Delta \hat{\tau}_1 = \underset{x,e,\Delta\tau \in T}{\operatorname{argmin}} \|e\|_1 \ subj \ y + J\Delta\tau = A_i x + e. \quad (18)$$

Notice that this is different from the popular choice that minimizes the 2-norm of the registration error:

$$\Delta \hat{\tau}_2 = \underset{x,e,\Delta\tau \in T}{\operatorname{argmin}} \|e\|_2 \ subj \ y + J\Delta\tau = A_i x + e, \quad (19)$$

which is also equivalent to finding the deformation step Δτ by solving the least-square problem: $\min\|y+J\Delta\tau - A_i x\|_2$. Empirically, if there is only small noise between $y_0$ and $A_i x$, both Equations 18 and 19 are found to have similar performance. However, if there are occlusions in $y_0$, iterative $l^1$-minimization of Equation 18 is significantly better than iterative $l^2$-minimization of Equation 19. FIGS. 23A-23D show an example.

FIGS. 23A, 23B, 23C, and 23D display a comparison of a subject wearing sunglasses by $l^1$ (top) and $l^2$ (bottom) minimization, wherein respectively: (A) the dashed line is the initial face boundary given by the face detector and the solid line is the result of alignment; (B) a warped testing image using the estimated transformation of $y_o$; (C) reconstructed face $A_i x$ using the training images; and (D) image of the error, e.

In addition to normalizing the training images (which is done once), the image alignment system 166 may normalize the warped testing image y∘τ as the algorithm runs. Without normalization, the algorithm may fall into a degenerate global minimum corresponding to expanding a single black pixel in the test image. Normalization is done by replacing the linearization of y∘τ with a linearization of the normalized version $$\tilde{y}(\tau) = \frac{y \circ \tau}{\|y \circ \tau\|_2}.$$

The proposed alignment algorithm can be extended to work in a multi-scale fashion, with benefits both in convergence behavior and computational cost. The alignment algorithm is simply run to completion on progressively less downsampled versions of the training and testing images, using the result of one level to initialize the next.

Once the best transformation $\tau_i$ has been computed for each subject i, the training sets $A_i$ can be aligned to y, and a global sparse representation problem of the form in Equation 14 can be solved to obtain a discriminative representation in terms of the entire training set. Moreover, the per-subject alignment residuals $\|e\|_1$ can be used to prune unpromising candidates from the global optimization, leaving a much smaller and more efficiently solvable problem. The complete optimization procedure is summarized as Algorithm 2 in Table 9, shown below.

One issue in linear illumination models is whether to enforce nonnegativity in the coefficients x: whether to model illumination using a cone or a subspace. Nonnegative combinations are guaranteed to correspond to physically plausible illuminations, but will not be sufficient to represent all physical illuminations unless the training images actually span the boundary of the illumination cone. Because the image acquisition system 164 is flexible, it can directly generate a set of illuminations that span most of the illumination cone, without resorting to negative coefficients and risking overfitting. Thus, in Algorithm 2, x is enforced to be nonnegative.

TABLE 9

Algorithm 2
(Deformable Sparse Recovery and Classification for Face Recognition)

| | |
|---|---|
| 1: | Input: Frontal training images $A_1, A_2, ..., A_K \in \mathfrak{R}^{m \times n_i}$ for K subjects, a test image $y \in \mathfrak{R}^m$ and a deformation group T considered. |
| 2: | for each subject k, |
| 3: | $\tau^{(0)} \leftarrow I$. |
| 4: | do |
| 5: | $\tilde{y}(\tau) = \frac{y \circ \tau}{\|y \circ \tau\|_2}; J \leftarrow \frac{\partial}{\partial \tau}\tilde{y}(\tau)\Big|_{\tau^{(i)}};$ |
| 6: | $\Delta\tau = \arg\min \|e\|_1 \ subj \ \tilde{y} + J\Delta\tau = A_k x + e, x \geq 0.$ |
| 7: | $\tau^{(i+1)} \leftarrow \tau^{(i)} + \Delta\tau;$ |
| 8: | while $\|\tau^{(i+1)} - \tau^{(i)}\| \geq \varepsilon.$ |
| 9: | end |
| 10: | Keep the top S candidates $k_1, ..., k_s$ with the smallest residuals $\|e\|_1$. |
| 11: | Set $A \leftarrow [A_{k_1} \circ \tau_{k_1}^{-1} \| A_{k_2} \circ \tau_{k_2}^{-1} \| ... \| A_{k_s} \circ \tau_{k_s}^{-1}]$ |
| 12: | Solve the $l^1$-minimization problem: $\hat{x} = \arg\min_{x,e} \|x\|_1 + \|e\|_1 \ subj \ y = Ax + e, x \geq 0.$ |
| 13: | Compute residuals $r_i(y) = \|y - A_i\hat{x}\|_2$ for $i = k_1, ..., k_s$. |
| 14: | Output: identify $(y) = \arg\min_i r_i(y)$. |

One important free parameter in Algorithm 2 is the class of deformations T. In experiments, 2D similarity transformations, T=SE(2)×$\mathfrak{R}_+$, were used for compensating error incurred by face detector, or 2D projective transformations, T=GL(3), for handling some pose variation. The parameter S decides how many top candidates get considered together to provide a sparse representation for the test image. If S=1, the algorithm reduces to classification by registration error; but considering the test image might be an invalid subject, S=10 is typically chosen. Since valid images have a sparse representation in terms of this larger set, invalid test images may be rejected using the sparsity concentration index proposed above. A fast linear program of the image alignment system 166 has been implemented for Algorithm 2 in C. Running on a 2.8 GHz Mac Pro, alignment takes 0.65 second per subject for the database 150.

Simulations and experiments were performed to demonstrate the effectiveness of the individual alignment procedure outlined in the previous section, and which clarifies its operating range.

2D Deformation. The effectiveness of alignment by Algorithm 2 is verified with images from the CMU Multi-PIE Database. R. Gross, I. Matthews, J. Cohn, T. Kanade, and S. Baker, "Multi-PIE," *IEEE Conference on Face and Gesture Recognition,* 2008. Selected are 120 subjects in Session 2, in which are used 11 illuminations per person from Session 2 for training, and test on one new illumination from Session 3. The training images are illuminations {0, 1, 3, 5, 7, 9, 11, 13, 14, 16, 18} of Gross et al., and the testing image is the illumination 10. Eye corners are manually selected in both training and testing as the ground truth for registration. The images are down-sampled to 80×60 pixels—the default unless otherwise stated—and the distance between the two outer eye corners are normalized to be 50 pixels for each person. Artificial deformation is introduced to the test image with a combination of translation or rotation. A registration is considered successful if the difference between the final registration error is within 1% of the error by manual registration.

Figure 24A:
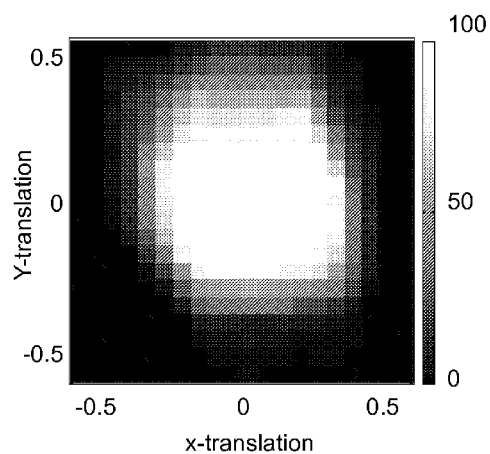
FIGS. 24A and 24B display a fraction of subjects for which the algorithm successfully aligns a synthetically-perturbed test image, wherein the amount of translation is expressed as a fraction of the distance between the outer eye corners and the amount of in-plane rotation in degrees, respectively: (A) the simultaneous translation in x and y directions; and (B) the simultaneous translation in y direction and in-plane rotation, θ.
Figure 24B:
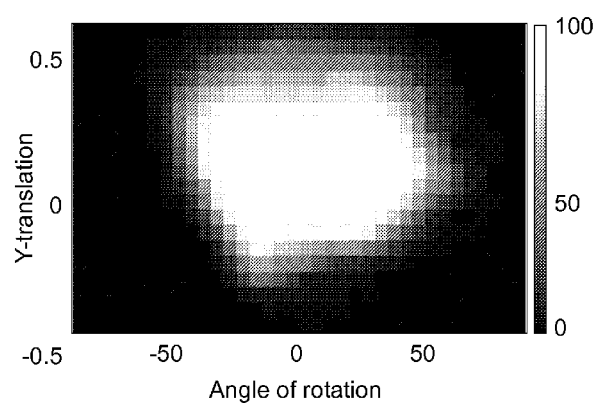

FIGS. 24A and 24B display a fraction of subjects for which Algorithm 2 successfully aligns a synthetically-perturbed test image 174, wherein the amount of translation is expressed as a fraction of the distance between the outer eye corners and the amount of in-plane rotation in degrees, respectively: (A) the simultaneous translation in x and y directions; and (B) the simultaneous translation in y direction and in-plane rotation, θ. FIGS. 24A and 24B show the percentage of successful registrations for the 120 subjects for each artificial deformation. The results suggest that Algorithm 2 works extremely well with translation up to 20% of the eye distance (or 10 pixels) in all directions and up to 30° in-plane rotation. Alignment by Algorithm 2 has also been tested with scale variation and it can handle up to 25% change in scale.

Statistics have also been gathered of the Viola and Jones' face detector on the Multi-PIE datasets. For 4,600 frontal images of 230 subjects under 20 different illuminations, using manual registration as the ground truth, the average misalignment error of the detected faces is about six (6) pixels and the variation in scale is 17%. This falls safely inside the range of attraction for alignment by Algorithm 2.

3D Pose Variation. As densely sampled pose and illumination face images are not available in any of the public databases, including Multi-PIE, a separate, proprietary dataset 150 has been collected using the image alignment system 166, which will be explained in more detail below. Frontal face images of a subject are employed under the 38 illuminations proposed below as training images. For testing, the image of the subject is collected under a typical indoor lighting condition at pose ranging from −90° to +90° with step size 5.625°, a total of 33 poses. Viola and Jones' face detector is used to initialize the alignment by Algorithm 2.

Figure 25:
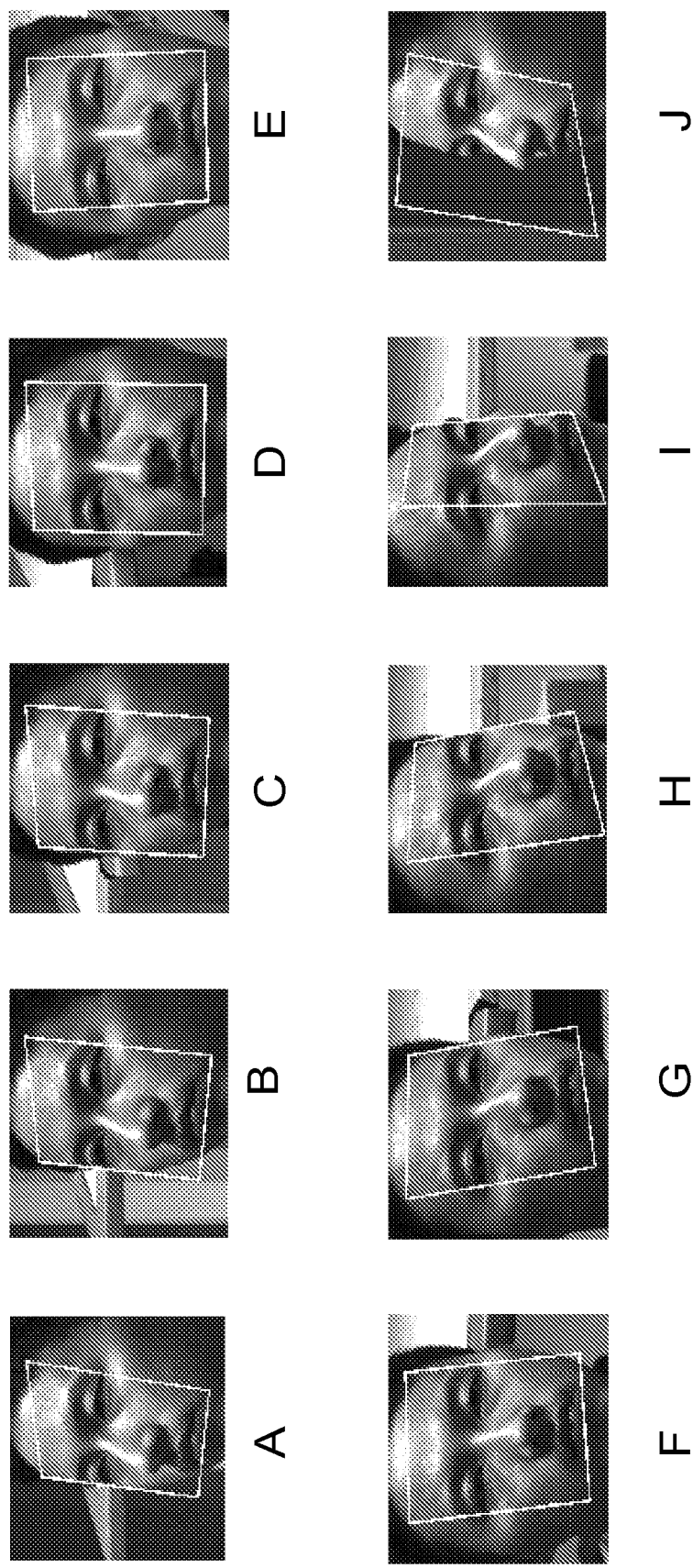
FIG. 25 displays alignment of A through J poses of a subject to frontal training images, wherein A through I show good alignment for −45° to +45° and J is one in which the algorithm fails based on an extreme pose.

FIG. 25 displays alignment of A through J poses of a subject to frontal training images, wherein A through I show good alignment for −45° to +45° and J is one in which the algorithm fails based on an extreme pose.

The modification to SRC roots solidly in the tradition of adding deformation robustness to face recognition algorithms. Only one previous work, however, investigated face alignment in the context of sparse signal representation and SRC. J. Huang, X. Huang, and D. Metaxas, "Simultaneous image transformation and sparse representation recovery," *CVPR,* 2008. J. Huang et al. consider the case where the training images themselves are misaligned and allow one deformation per training image. They linearize the training rather than the test, which is computationally more costly as it effectively triples the size of the training set. In addition, as they align the test image to all subjects simultaneously, it potentially is more prone to local minima when the number of subjects increases, as will be seen in the following experimental comparisons.

Extended Yale B. In this experiment, the exact experimental settings from Huang et al. are used. Twenty (20) subjects are selected and each has 32 frontal images (selected at random) as training and another 32 for testing. An artificial translation of 10 pixels (in both x and y directions) is introduced to the test. For Algorithm 2, all the images are down-sampled to 88×80 for memory reasons, whereas the work Huang et al. uses random projections. Algorithm 2 achieves the recognition rate of 88.59%, which is on par with the result reported in Huang et al. This special setting, however, is disadvantageous to Algorithm 2: the use of cropped test images introduces boundary effects, and the presence of very extreme illuminations makes enforcing nonnegativity of x—as in Algorithm 2—less appropriate.

CMU Multi-PIE. In this experiment, 160 subjects from the CMU Multi-PIE are chosen, 11 training images from Session 2 and one (1) test image from Session 3 per person. The setting is exactly the same as the previous experiment on 2D deformation, except that the present experiment has more subjects. The experiment is again carried out with down-sampled images of size 80×60. An artificial translation of 5 pixels (in both x and y directions) was induced in the test image. The algorithm of Huang et al. achieves a recognition rate of 73.75%, while Algorithm 2 achieves a rate of 90.625%. The Huang et al. algorithm has two free parameters: l and d. For this experiment, these parameters are chosen as l=1 and d=514 (higher values may get a better recognition rate at the expense of higher running time).

Above, the assumption was made that the test image, although taken under some arbitrary illumination, can be linearly interpolated by a finite number of training illuminations. It has been shown that for a convex Lambertian surface, one only needs about nine (9) basis illuminations to linearly interpolate all other illuminations. R. Basri and D. Jacobs, "Lambertian reflectance and linear subspaces," PAMI, 25(2): 218-233, 2003. Although a human face is neither perfectly Lambertian nor convex, it has been observed in various empirical studies that one can often get away using a similar number of frontal illuminations to interpolate a wide range of new frontal illuminations that are taken under the same laboratory conditions. This is the case for many public face datasets, including AR, ORL, PIE, and Multi-PIE.

Unfortunately, in practice, it has been found that a training database (150) consisting purely of frontal illuminations is not sufficient to linearly interpolate images of a faces taken under typical indoor or outdoor conditions. The representation computed is not always sparse or informative, as shown by the example in FIG. 22B. Subsequently, the recognition could become inaccurate. Thus, to ensure Algorithm 2 works in practice, a set of training illuminations must be found that are indeed sufficient to linearly interpolate a variety of practical indoor and outdoor illuminations. To this end, a system has been designed that can illuminate a subject from all directions above horizontal, while acquiring frontal images of the subject.

Figure 26A:
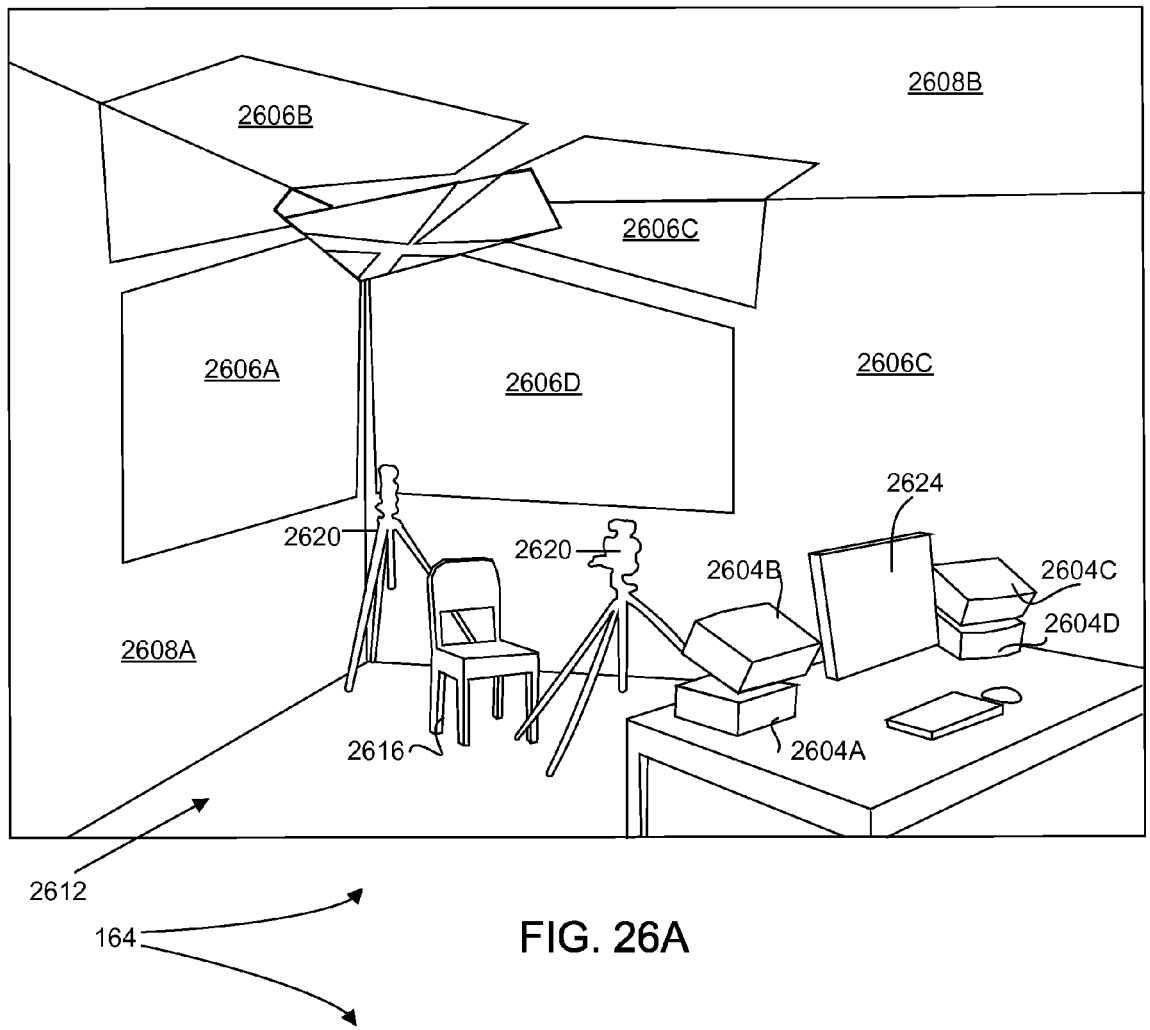
FIGS. 26A and 26B are, respectively, a perspective view of a training images acquisition system and a block diagram of the training images acquisition system.
Figure 26B:
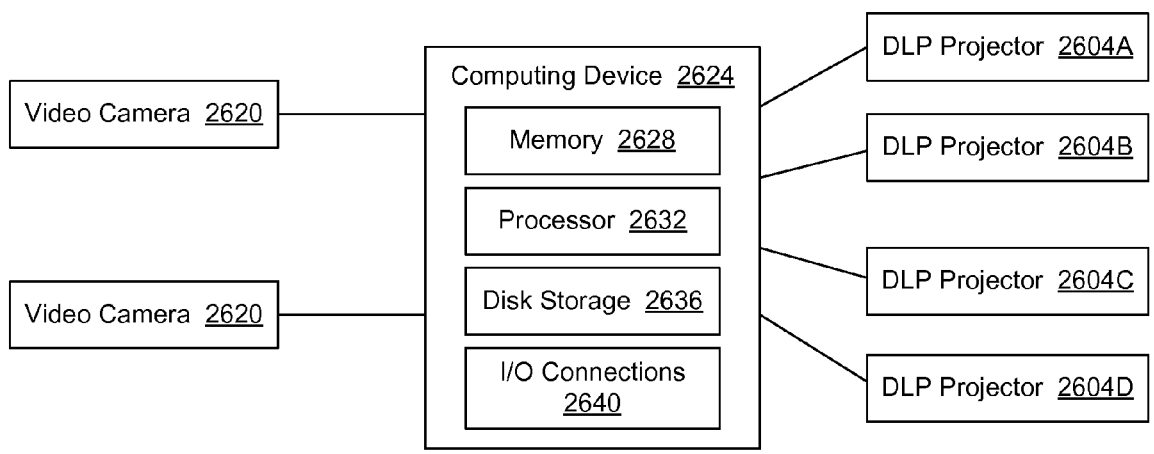

FIGS. 26A and 26B are, respectively, a perspective view of a training images acquisition system 164 and a block diagram of the training images acquisition system 164. An illumination system, which is part of the training images acquisition system 164, includes four projectors 2604 (A, B, C, and D) that display corresponding bright patterns 2606 (A, B, C, D) onto the three adjacent reflective surfaces (e.g., walls) 2608 (A—left, B—top, and C—right) in the corner of a dark room 2612. The light reflects off of the reflective surfaces 2608 and illuminates the head of a subject indirectly. Any plurality of adjacent reflective surfaces may be used, such as screens with reflective coatings, so long as they form an angle at a point of adjacency, enabling reflection of light from the projectors 2604 at various angles. Accordingly, a room is not required, but using a room corner may be more convenient, and for the sake of simplicity, will be referred to hereinafter. After taking the frontal illuminations—as the subject is facing the corner—a chair 2616 is rotated by about 180 degrees and pictures are taken from the opposite direction rear illuminations—with at least one camera 2620. Having two cameras 2620, however, speeds the process since only the chair 2616 needs to be moved in between frontal and rear illuminations. One camera 2620 may be located in the corner of the room 2612 and another between the chair 2616 and the projectors 2604.

The projectors 2604 and/or the cameras 2620 may be electronically connected into, or coupled with, a computing device 2624, which may control a pattern and intensity of illumination of the projectors 2604, as well as the timing of taking and recording the images from the cameras 2620. Examples of the illumination pattern may be seen in FIGS. 32A and 32B, each cell of which may be projected sequentially and at varying intensities. The projector-based system 164 has several advantages over flash-based illumination systems: (1) the illuminations can be defined in software; (2) it is easy to capture many different illuminations; (3) there is no need to mount cameras on walls or construct a large dome; and (4) no custom hardware is needed for the basic system 164.

Accordingly, as shown in the block diagram in FIG. 26B, the training images acquisitions system 164 may include the video cameras 2620, the projectors 2604, which may be digital light processing projectors (DLP) or liquid crystal display (LCD) projectors 2604, all coupled with the computer device 2624. Any number of the projectors 2604 may be used to achieve desired illumination patterns. In the present experiments, however, four projectors 2604 were found adequate.

The computing device 2624 may include, but is not limited to, a memory 2628, a processor 2636, disk storage 2636, and input/output (I/O) ports 2640 for receipt of connectors of the cameras 2620 and the projectors 2604. Software or computer code that runs on the processor 2632 of computing device 2624 enables defining a pattern of illumination from the set of projectors 2604. The illumination pattern may include a plurality of cells that sequentially illuminate a face of the subject from different angles off the walls (reflective surfaces) 2608 as will be explained in more detail below. The camera(s) 2620 may also be controlled by the computing device 2624 so that images are taken and recorded in the computing device 2624 in a synchronized fashion, after each respective cell of the illumination pattern from the projectors 2604 is changed. By automating both the illumination pattern and synchronized image acquisition, a set of 38 images may be obtained within a short period of time. Of course, the training images acquisition system 164 could acquire a different number of training images, so the number 38 is only an example of a sufficient number of training images.

Figure 27:
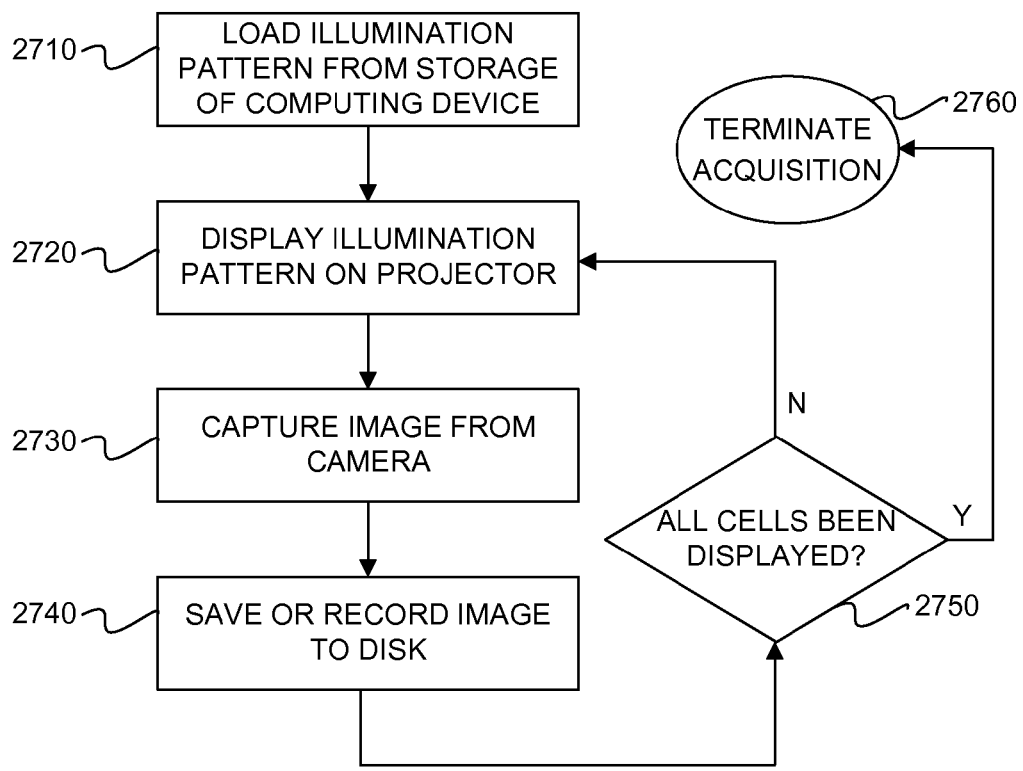
FIG. 27 is a flow chart of a method for sequentially displaying an illumination pattern of cells to capture an image of the subject at each respective illumination of the pattern.

FIG. 27 is a flow chart of a method for sequentially displaying an illumination pattern of cells to capture an image of the subject at each respective illumination of the pattern. At block 2710, an illumination pattern is loaded from the disk storage 2636 of the computing device 2624. At block 2720, the illumination pattern is displayed through the projector(s) 2604. At block 2730, the camera 2620 captures an image from the camera 2620 of the subject. At block 2740, the computing device 2624 stores (records) the image to at least disk storage 2636 to be made available for storage in the training images database 150 or the test images database 154. At block 2750, the computing device 2624 decides whether all the cells of the illumination pattern have been displayed. If not, the method returns to block 2720 to display the next cell of the illumination pattern for acquisition of the image for the subject. If all the cells have been displayed, the method terminates acquisition for that subject, at block 2760.

Figure 28:
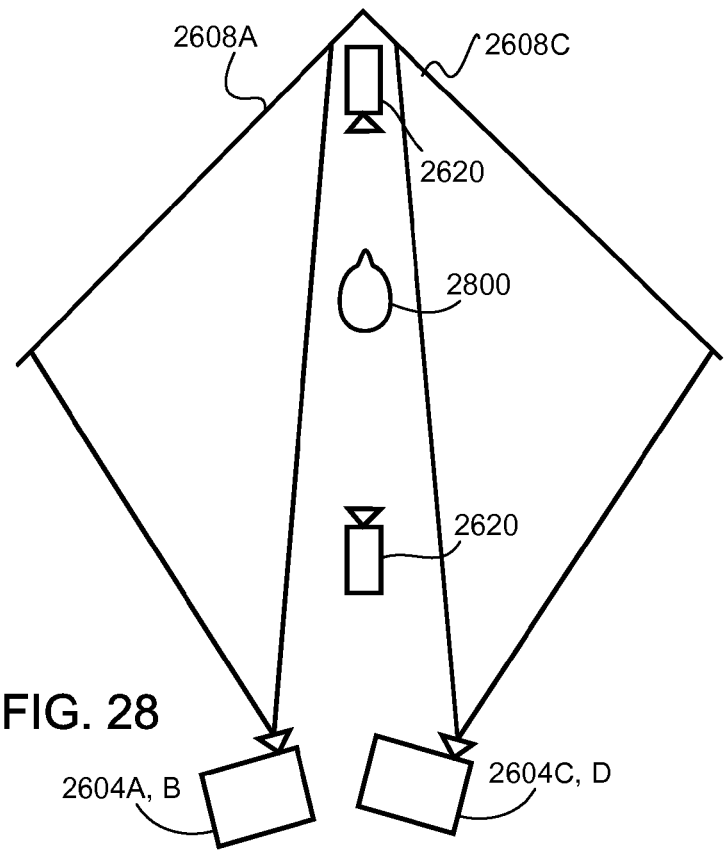
FIG. 28 is a top view of the training images acquisition system.

FIG. 28 is a top view of the training images acquisition system 164. As can be seen, the projectors 2604 illuminate the back two walls 2608A, C of the corner of the room 2612. The projected light actually does not directly hit a subject 2800 sitting in the chair 2616, but reflects onto the face of the subject 2800 off the walls 2608.

FIGS. 29A and 29B are, respectively, front and rear illuminations of the subject viewable from the top view of FIG. 28. In FIG. 29A, the projected light from the left projector 2604 bounces off the left of the back two walls 2608A to hit the front-sitting subject 2800 in the face at a specific angle with respect to the wall 2608A. By changing the cell within the illumination pattern (FIGS. 32A, 32B), the light may hit the subject 2800 at a variety of angles and off different walls 2608—so that all scenarios of illumination that may be encountered when in the field during test subject recognition can be represented using a linear combination of the acquired training images. Illumination from the rear in FIG. 29B is more difficult—at some point, some of the cells in the middle of the illumination pattern will cause illumination directly behind the head of the subject 2800. Images taken when illumination is behind the head of the subject 2800 are unusable. Other cells that provide illumination from a side angle with respect to the face of the subject 2800 may provide usable images, and may be an illumination scenario actually encountered in a real test image recognition scenario.

Figure 30:
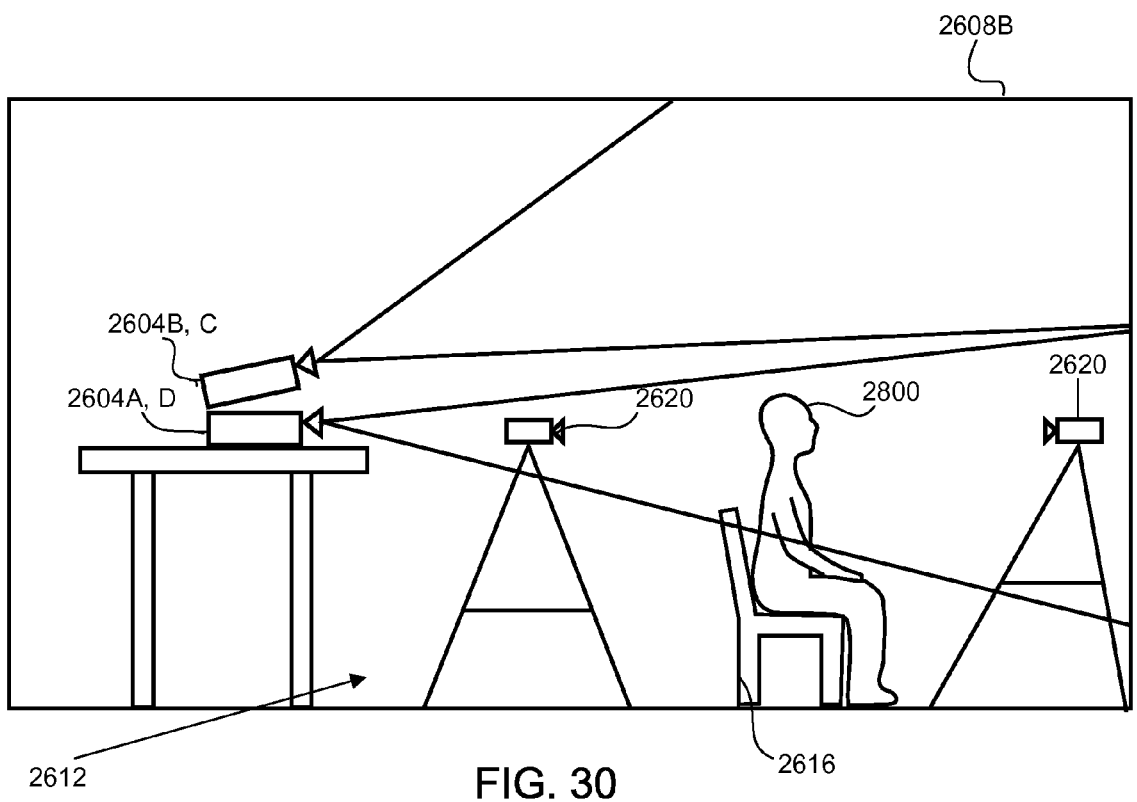
FIG. 30 is a side view of the training images acquisition system.

FIG. 30 is a side view of the training images acquisition system 164. Note that the illumination of a top set of projectors 2604B, C illuminate more into the upper corner and top wall 2608B of the room 2612, but which also illuminates the side walls 2608A and 2608C. The bottom set of projectors 2604A, D illuminate exclusively the side walls 2608A and 2608C, respectively.

Figure 31A:
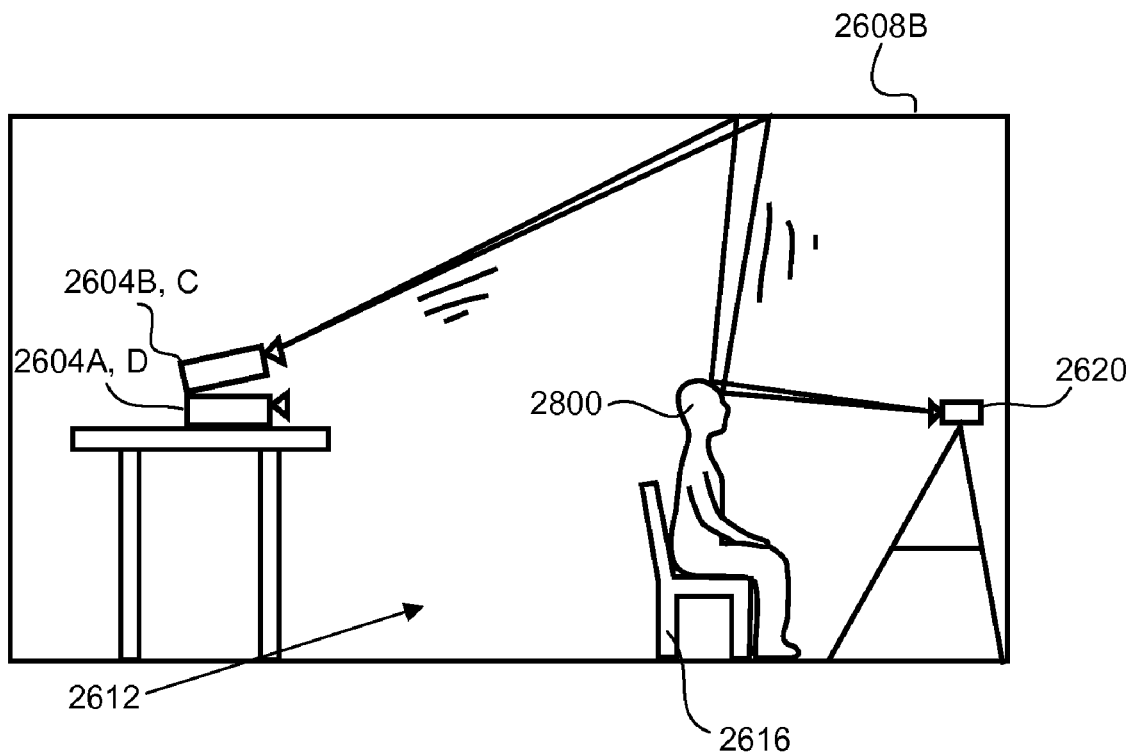
FIGS. 31A and 31B are, respectively, front and rear illuminations of the subject viewable from the side view of FIG. 30.
Figure 31B:
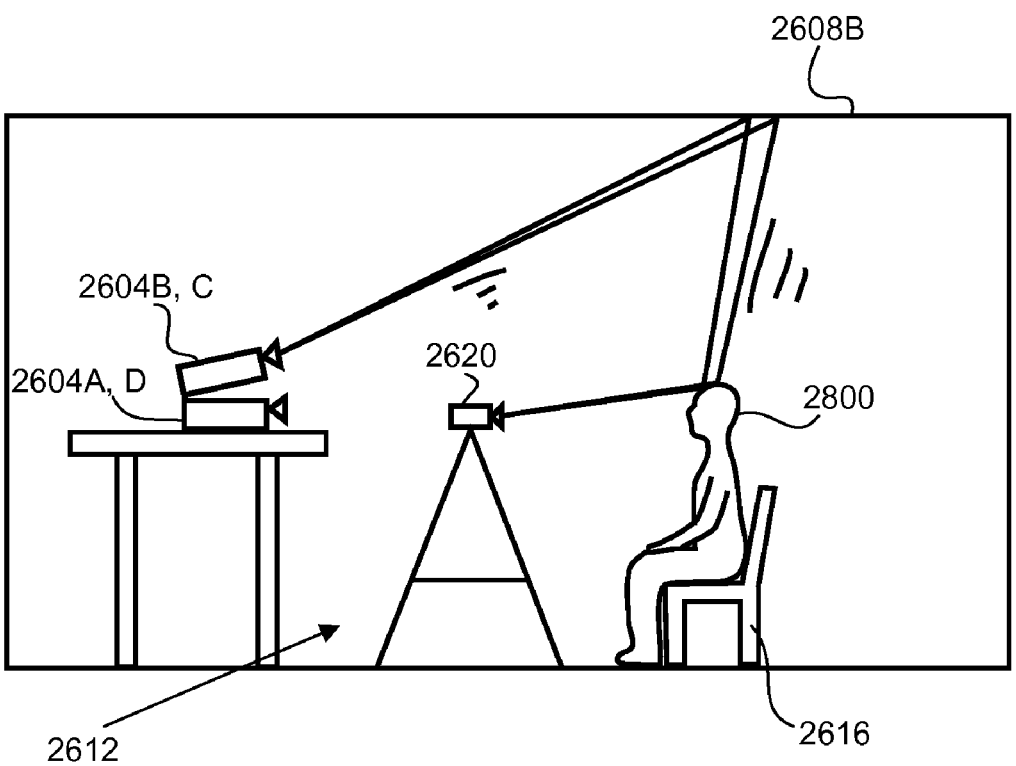

FIGS. 31A and 31B are, respectively, front and rear illuminations of the subject viewable from the side view of FIG. 30. Illumination from the top set of projectors 2604B and 2604C may bounce off the ceiling 2608B, and in FIG. 31A, hit the top of the face of the subject 2800 from a generally front approach. In FIG. 31B, the illumination pattern comes from a generally rear approach, but still glances the top of the face of the subject 2800.

With the image acquisition system 164 having projectors 2604, choice of illuminations is constrained only by the need to achieve a good SNR for representing typical test images and a reasonably short total acquisition time. Better SNR can be achieved with more illuminations but that will increase the capture time for each subject. Two experiments were run to guide choice of illuminations for the following large-scale experiments.

Figure 32A:
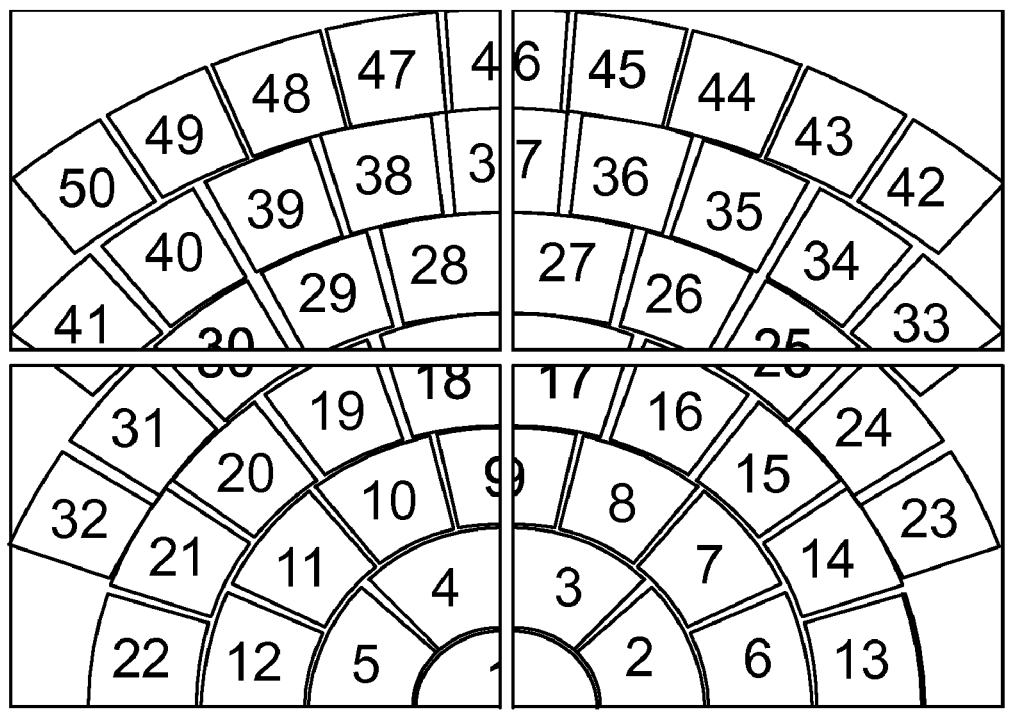
FIGS. 32A and 32B are, respectively, an illumination pattern of a coverage experiment and a chosen illumination pattern for implementation of the training images acquisition system.
Figure 32B:
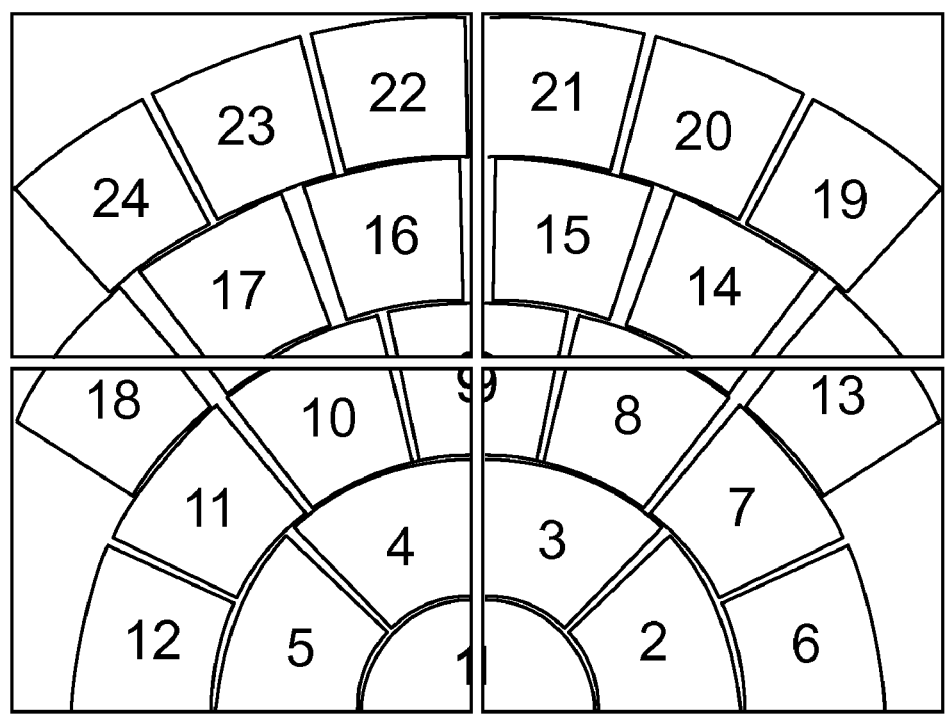

FIGS. 32A and 32B are, respectively, an illumination pattern of a coverage experiment and a chosen illumination pattern for implementation of the training images acquisition system 164. In the first (coverage) experiment, it was determined what coverage of the sphere is required to achieve good interpolation for test images. The subject was illuminated by 100 (50 front, 50 back) illuminations arranged in concentric rings centered at the front camera. Subsets of the training images were chosen, starting at the front camera and adding a ring at a time. Each time a ring was added to the training illumination set, the average $l^1$ registration error (residual) for a set of test images taken under sunlight was computed and plotted in FIG. 33A. The more rings of training illuminations are added, the lower the representation error becomes, with diminishing returns.

Figure 33A:
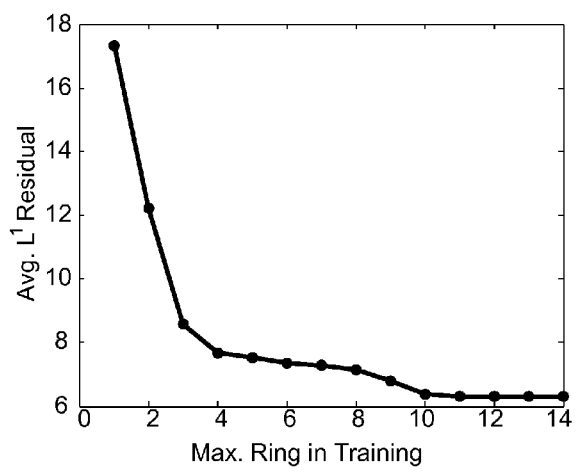
FIGS. 33A and 33B are, respectively, graphs displaying the coverage and granularity of the illumination pattern of the training images acquisition system during experiments in which the number of rings and the number of cells was varied.
Figure 33B:
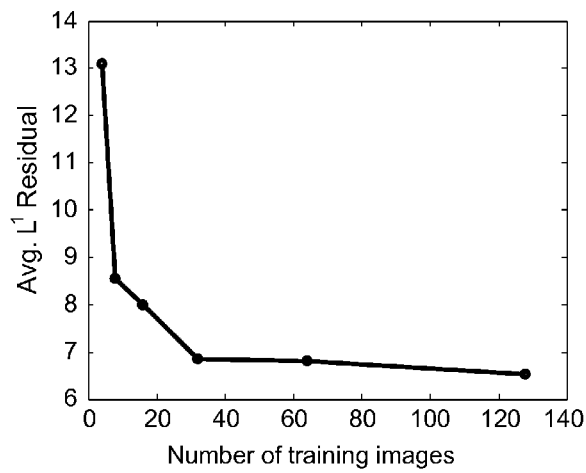

FIGS. 33A and 33B are, respectively, graphs displaying the coverage and granularity of the illumination pattern of the training images acquisition system during experiments in which the number of rings and the number of cells was varied. In the second (granularity) experiment, it was determined how finely divided the illumination sphere should be. At the first granularity level, the projectors 2604 illuminate the covered area uniformly. At each subsequent granularity level, each illuminated cell is divided in two along its longer side, but with intensity doubled. For each granularity level, the average $l^1$ registration error is computed as in the coverage experiment, results of which are shown in FIG. 33B. Again, diminishing returns are observed as more illuminations are added.

In the plot for the coverage experiment in FIG. 33A, clearly seen are two plateau regions: one is after 4 rings and one is after 10 rings. The first four rings represent the typical frontal illuminations, which are present in most public face datasets; however, it is evident that the residual stabilizes after 10 rings, which include some illuminations from the back of the subject. This suggests that although the frontal illuminations can span a majority of illumination on the face, some illuminations from the back are needed in the training to emulate the effect of ambient illumination from all directions. In the plot for the granularity experiment in FIG. 33B, observe that the residual reaches a plateau after four divisions, corresponding to a total of 32 illuminations. Based on the results from both experiments, it was decided to partition the area covered by the first 10 rings into a total of 38 cells, as displayed in FIG. 32B. The chosen pattern includes all 24 cells for frontal illuminations and cells 1-5 and 7-11 are omitted for rear illumination to make up the total of 38 cells. For the large-scale experiments, these 38 illuminations were collected for all subjects. It is very likely that with more careful experiments, one could further reduce the number of required illuminations; for instance, some of the frontal illuminations may be redundant. But, the additional images are retained in the training images database 150 as the additional images do not add too much cost to the alignment and recognition Algorithm 2.

Figure 34:
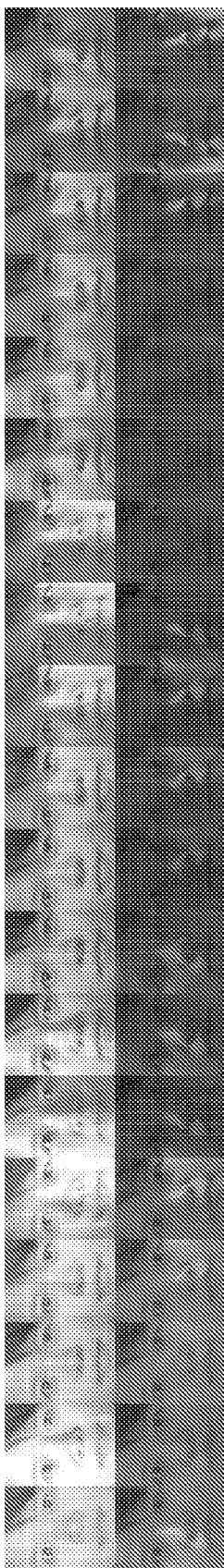
FIG. 34 displays an example of a set of 38 training images acquired from the training images acquisition system using the pattern of FIG. 32B.

FIG. 34 displays an example of a set of 38 training images acquired from the training images acquisition system using the pattern of FIG. 32B.

Figure 35:
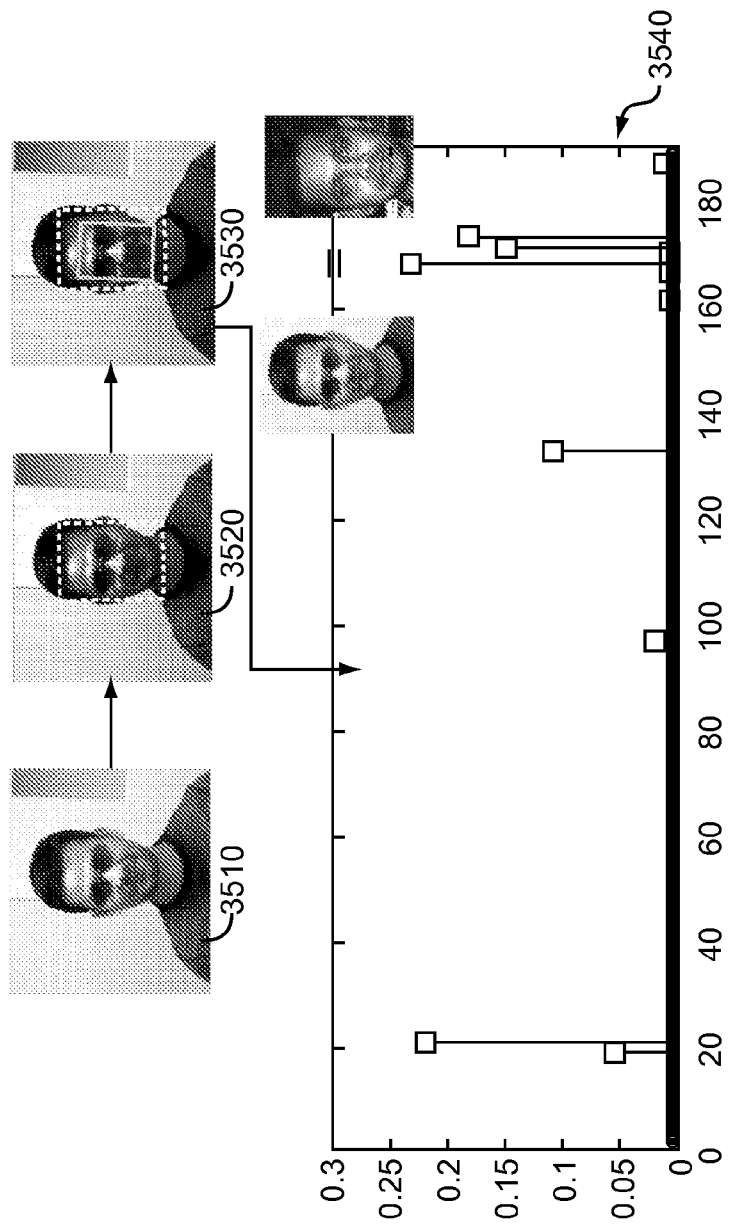
FIG. 35 displays the flow of a test image through the steps of acquisition, face detection, alignment with the training images database, and recognition.

FIG. 35 displays the flow of a test image through the steps of acquisition, face detection, alignment with the training images database 150, and recognition. At block 3510, a test image is submitted to the system 100. At block 3520, the face detector 124 detects the object (face) in the test image. At block 3530, the alignment portion of Algorithm 2 (steps 2 through 9) is executed by the image alignment system 166 to align the object to the training images of the database 150. At block 3540, the aligned object undergoes $l^1$ minimization—steps 10 to 14 of Algorithm 2—by the $l^1$-minimizer 126 so that the recognizer 130 can classify the object, thus completing recognition of the identity of the object within the test image.

To verify the performance of Algorithm 2 in terms of recognition by the system 100, comprehensive experiments were conducted on large-scale face databases (150). The first test is on the largest public face database available that is suitable for testing Algorithm 2, the CMU Multi-PIE. The goal was to show that Algorithm 2 can indeed be used to achieve good performance on such a dataset with test images obtained from an off-the-shelf face detector 124, even though using a small number of—not necessarily sufficient—training illuminations. Algorithm 2 was then tested on a face dataset (150) developed from images collected by the image acquisition system 164 disclosed herein. The goal was to show that with a sufficient set of training illuminations for each subject, Algorithm 2 indeed works stably and robustly with practical illumination, misalignment, pose, and occlusion, as indicated by the experiment shown in FIG. 22C.

CMU Multi-PIE provides the most extensive test of Algorithm 2 among public datasets 150. This database contains images of 337 subjects across simultaneous variation in pose, expression, and illumination. Of these 337 subjects, all 249 subjects present in Session 1 were used as a training set. The remaining 88 subjects are considered "outliers" or invalid images. For each of the 249 training subjects, frontal images of 7 frontal illuminations—0, 1, 7, 13, 14, 16, 18—taken with neutral expression were included. See R. Gross, I. Matthews, J. Cohn, T. Kanade, and S. Baker, "Multi-PIE," *FGR,* 2008. For each directional illumination, the ambient-illuminated image 0 is subtracted therefrom. These extreme frontal illuminations would be sufficient to interpolate other frontal illuminations, as will also be corroborated by the next experiment on the dataset 150 generated by the image acquisition system 164. For the test set, all 20 illuminations from Sessions 2-4 are used. These were recorded at distinct times over a period of several months.

TABLE 10

| Rec. Rates | Session 2 | Session 3 | Session 4 |
| --- | --- | --- | --- |
| $LDA_d$ ($LDA_m$) | 5.1 (49.4)% | 5.9 (44.3)% | 4.3 (47.9)% |
| $NN_d$ ($NN_m$) | 26.4 (67.3)% | 24.7 (66.2)% | 21.9 (62.8)% |
| $NS_d$ ($NS_m$) | 30.8 (77.6)% | 29.4 (74.3)% | 24.6 (73.4)% |
| Algorithm 2 | 91.4% | 90.3% | 90.2% |

Using the dataset 150 is challenging due to the large number of subjects, and due to natural variation in subject appearance over time. Table 10 shows the result of Algorithm 2 on each of the 3 testing sessions. Algorithm 2 achieves recognition rates above 90% for all three sessions, with input directly obtained from the Viola and Jones' face detector—no manual intervention. Results of Algorithm 2 are compared to baseline linear-projection-based algorithms, such as Nearest Neighbor (NN), Nearest Subspace (NS), and Linear Discriminant Analysis (LDA). Results on PCA are not listed as its performance is always below that of Nearest Subspace. Since these algorithms assume pixel-accurate alignment, they are not expected to work well if the test is not well-aligned with the training. In Table 10, the results of those algorithms are shown with two types of input: (1) the output of the Viola and Jones' detector 124, indicated by a subscript "d"; and (2) the input face aligned to the training with manually-selected outer eye corners, indicated by a subscript "m." Notice that, despite careful manual registration, these baseline algorithms perform significantly worse than Algorithm 2, which uses input directly from the face detector 124. The performance of the LDA algorithm on Multi-PIE reported here seems to agree with that reported already in R. Gross et al.

Figure 36:
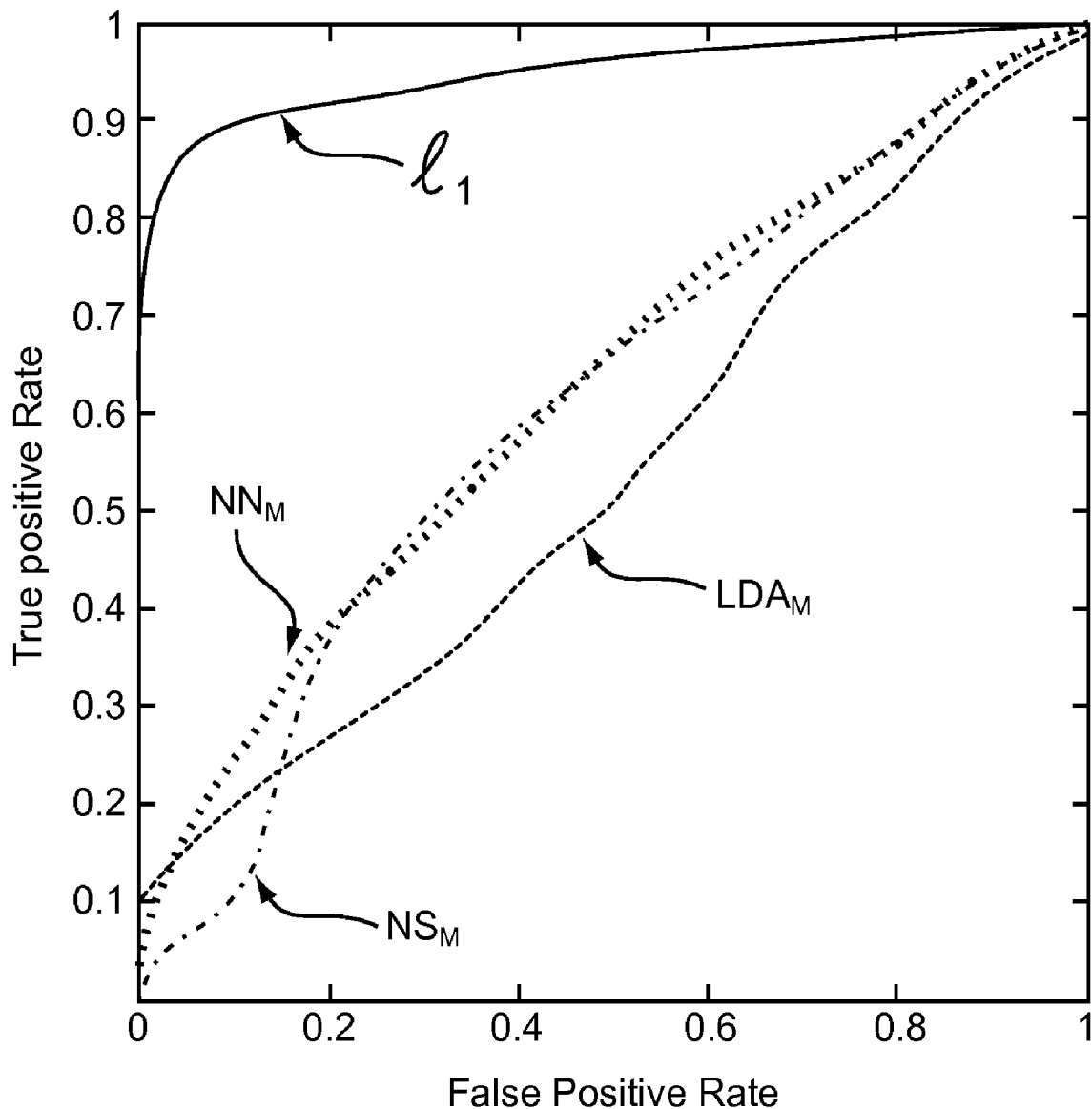
FIG. 36 is a graph of large-scale experiments on Multi-PIE displaying ROC curves for the algorithm (labeled as $l^1$), compared with those for $NN_m$, $NS_m$, and $LDA_m$.

FIG. 36 is a graph of large-scale experiments on Multi-PIE displaying ROC curves for the algorithm (labeled as $1^1$), compared with those for $NN_m$, $NS_m$, and $LDA_m$. The ability of Algorithm 2 to reject invalid images of the 88 subjects not appearing in the training database was tested. FIG. 36 plots the receiver operating characteristic (ROC) curve for each algorithm. Rejecting invalid images not in the entire database is much more difficult than deciding if two face images are the same subject. The curves in FIG. 36 should not be confused with typical ROC curves for face similarity by prior methods.

Figure 37:
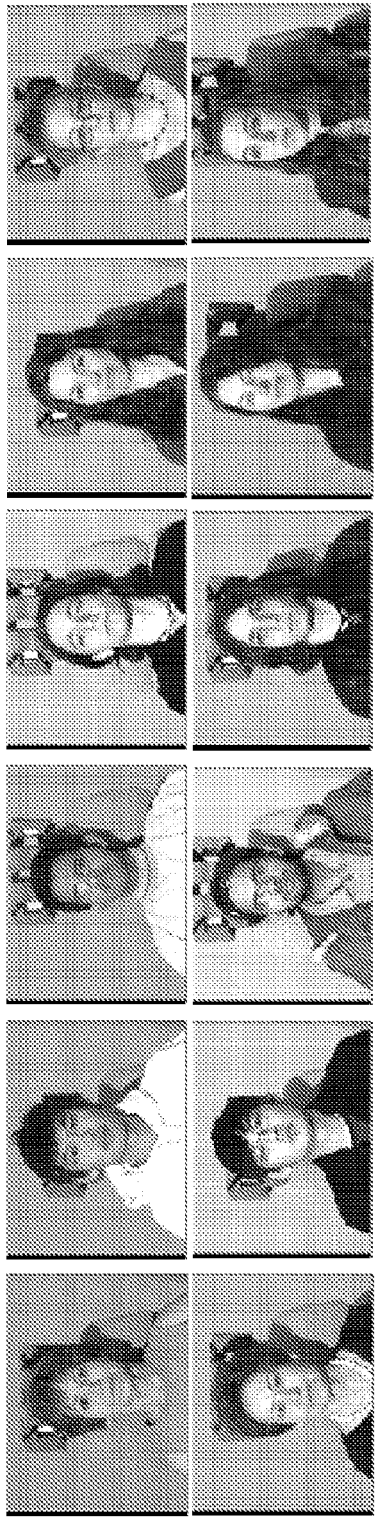
FIG. 37 displays representative examples of failed Multi-PIE subjects.

FIG. 37 displays representative examples of failed Multi-PIE subjects. Algorithm 2 errors are mostly caused by a few subjects who significantly change their appearances between sessions (such as hair, facial hair, and eyeglasses). Some representative examples are shown in FIG. 37. In fact, for those subjects, alignment and recognition fail on almost all test illuminations.

Limited tests of Algorithm 2 were run on images with pose and expression in Multi-PIE. Using the same training images as above, Algorithm 2 was tested on images in Session 2 with 15° pose, for all 20 illuminations. The recognition rate is 77.5%. Algorithm 2 was also tested on images with smiles in Session 3. For illumination 0 (ambient), the rate is 58.5%, for illumination 10, the rate is 68.6%.

Using the training acquisition system 164 described herein, the frontal view of 74 subjects without eyeglasses were collected that had fewer than the 38 illuminations shown in FIG. 32B. For testing Algorithm 2, 593 images of these subjects were taken with a different camera under a variety of practical conditions.

To see how training illuminations affect the performance of Algorithm 2 in practice, compared were how well a few frontal illuminations can interpolate: (1) other frontal illuminations taken under the same laboratory conditions, and (2) typical indoor and outdoor illuminations. To this end, 20 subjects were selected from the face database 150 that were acquired by the image acquisition system 164; 7 illuminations per subject were used as training images. The illuminations were chosen to be similar to the 7 illuminations used in the previous experiment on Multi-PIE, specifically illumination set {6, 9, 12, 13, 18, 21, 22} shown in FIG. 32B to mimic the illumination set {0, 1, 6, 7, 13, 14, 18} in Multi-PIE. Algorithm 2 was then tested on the remaining 17 (24−7) frontal illuminations for all the 20 subjects. The recognition rate is 99.7%, nearly perfect. Algorithm 2 was also tested on 173 frontal images of these subjects taken under a variety of indoor and outdoor conditions (in category 1 specified below), similar to the one shown in FIGS. 22A, 22B, and 22C, and the recognition drops down to 93.6%. One would expect the rate to drop even further when the number of subjects increases.

Figure 38:
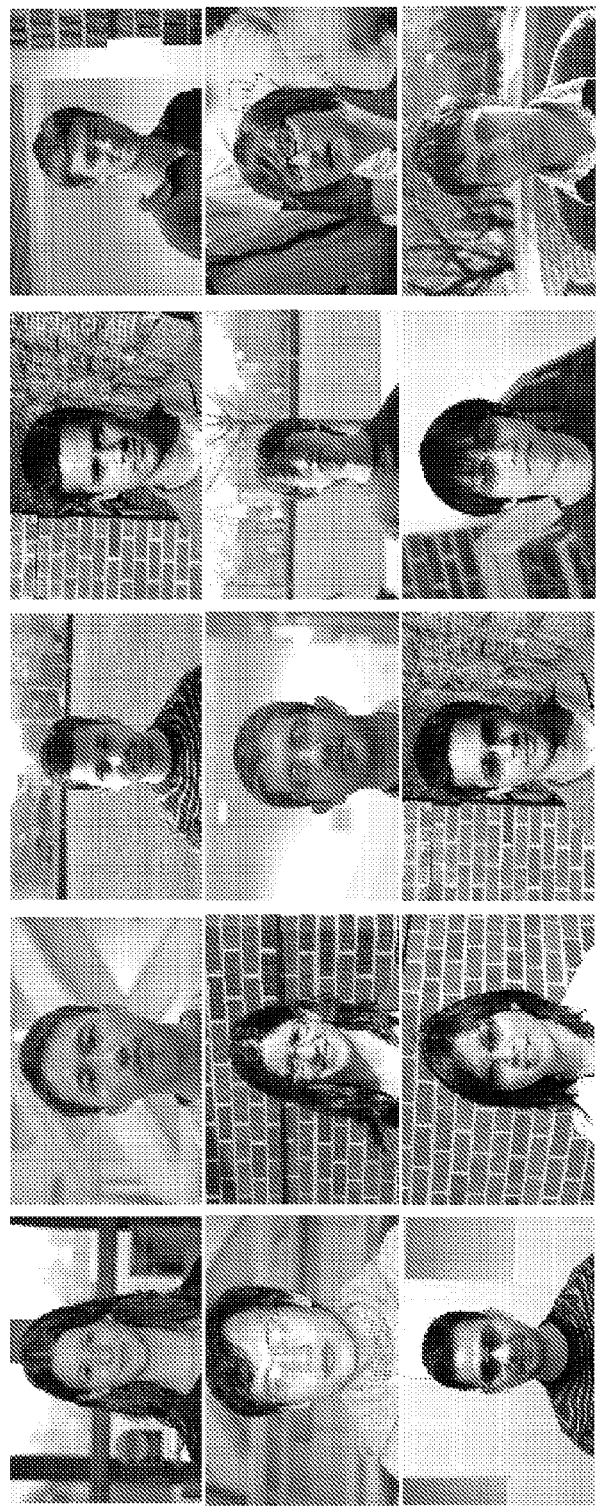
FIG. 38 displays representative examples of subjects classified in categories 1-3, with a row for each category, wherein category 1 are subjects without eyeglasses, category 2 are subjects with eyeglasses, and category 3 are subjects with sunglasses.
Figure 39:
FIG. 39 displays representative examples of subjects classified in category 4, or subjects with noticeable expressions, poses, mild blur, and sometimes occlusion, wherein the top row includes those successfully recognized and the bottom row includes those that were unrecognized.
Figure 40:
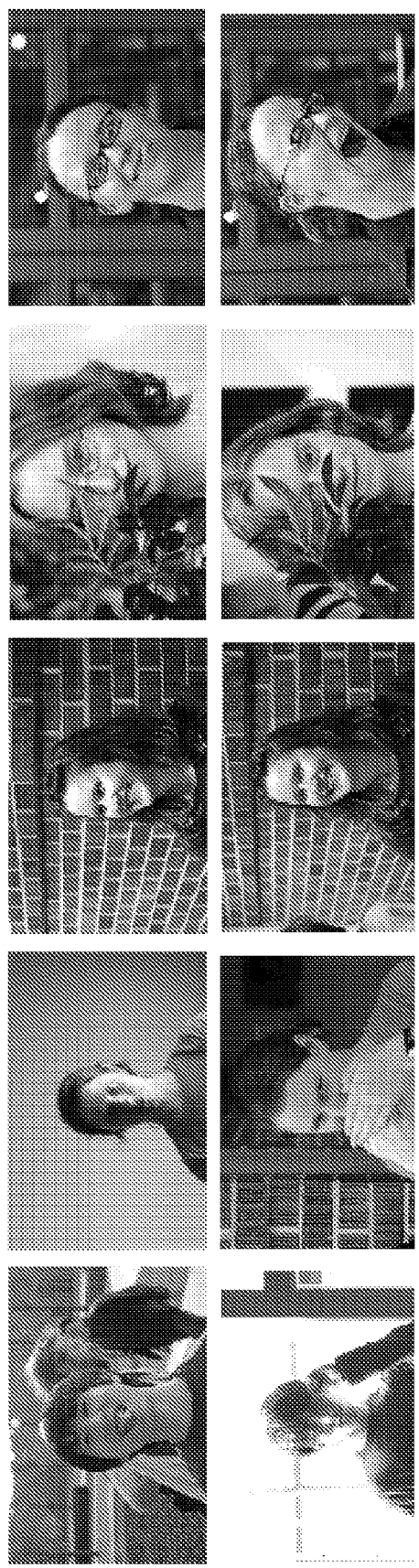
FIG. 40 display representative examples of subjects classified in category 5, or subjects with little control, wherein the top row includes those successfully recognized and the bottom row includes those that were unrecognized.

FIG. 38 displays representative examples of subjects classified in categories 1-3, with a row for each category, wherein category 1 are subjects without eyeglasses, category 2 are subjects with eyeglasses, and category 3 are subjects with sunglasses. FIG. 39 displays representative examples of subjects classified in category 4, or subjects with noticeable expressions, poses, mild blur, and sometimes occlusion, wherein the top row includes those successfully recognized and the bottom row includes those that were unrecognized. FIG. 40 display representative examples of subjects classified in category 5, or subjects with little control, wherein the top row includes those successfully recognized and the bottom row includes those that were unrecognized.

Finally, large-scale tests were conducted with sufficient training illuminations. All 74 subjects and 38 illuminations were used in the training and test phases on 593 images taken under a variety of conditions. Based on the main variability in the test images, the test images were partitioned into five main categories:

Category 1: 242 images of 47 subjects without eyeglasses, generally frontal view, under a variety of practical illuminations (indoor and outdoor) (FIG. 38, row 1).

Category 2: 109 images of 23 subjects with eyeglasses (FIG. 38, row 2).

Category 3: 19 images of 14 subjects with sunglasses (FIG. 38, row 3).

Category 4: 100 images of 40 subjects with noticeable expressions, poses, mild blur, and sometimes occlusion (FIG. 39, both rows).

Category 5: 123 images of 17 subjects with little control (out of focus, motion blur, significant pose, large occlusion, funny faces, extreme expressions) (FIG. 40, both rows).

Viola and Jones' face detector (124) were applied on these images and directly used the detected faces as the input to Algorithm 2. Table 11 (below) reports the performance of Algorithm 2 on each category. The errors include failures of the face detector 124 on some of the more challenging images.

TABLE 11

|  | Test Categories | | | | |
| --- | --- | --- | --- | --- | --- |
|  | C1 | C2 | C3 | C4 | C5 |
| Rec. Rates (%) | 95.9 | 91.5 | 63.2 | 73.7 | 53.5 |

Proposed herein is a new Algorithms 2 and the corresponding system 100 for recognizing human faces from images taken under practical conditions. The proposed system 100 is relatively simple in implementation, and hence the results are relatively easy to reproduce. The proposed Algorithm 2 is scalable both in terms of computational complexity and recognition performance. The system 100 is directly compatible with off-the-shelf face detectors 124 and achieves stable performance under a wide range of variations in illumination, misalignment, pose, and occlusion. Very good recognition performance is achieved on large-scale tests with public datasets and the practical face images as acquired by the image acquisition system 164, using only frontal 2D images in the training without any explicit 3D face model.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device, including a mobile device such as a mobile phone or personal digital assistant). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A computer-implemented method for recognition of high-dimensional data in the presence of occlusion, comprising:
   receiving by a computer a target data that includes an occlusion and is of an unknown class, wherein the target data comprises a known object;
   sampling with the computer a plurality of training data files comprising a plurality of distinct classes of the same object as that of the target data; and
   identifying the class of the target data by the computer through linear superposition of the sampled training data files using $l^1$ minimization, wherein a linear superposition with a sparsest number of coefficients is used to identify the class of the target data.

2. The method of claim 1, wherein the plurality of training data files contain the target data, and wherein recognizing the class of the target data is through execution of an algorithm that includes $l^1$ minimization to remove the occlusion such that allows identification of the target data.

3. The method of claim 2, wherein the object of the target data comprises a test voice file and wherein the plurality of training data files comprise training voice files.

4. The method of claim 2, wherein the object of the target data comprises a test image (y) that is partially occluded with a plurality of pixels, and wherein the plurality of training data files comprises a plurality of training images.

5. The method of claim 4, wherein a single matrix (A) represents the sampled plurality of training images, and wherein the algorithm recovers a representation of the form $y = Ax_o + e$, wherein $x_o$ comprises a solution that yields the sparsest number of coefficients, and wherein e comprises a vector of errors, which is also a sparse representation of y.

6. A computer-implemented method for recognition of high-dimensional data in the presence of occlusion, comprising:
   receiving by a computer a test data (y) that includes an occlusion and which identity is unknown, wherein the test data comprises a known object;
   sampling with the computer a plurality of labeled training data files represented by matrix $A=[A_1 \ldots A_k]$ that comprise a plurality (k) of distinct identities, wherein the sampled training data files are of the same object as that of y; and
   expressing, with the computer, y as a sparse linear combination of the plurality of training data files (A) plus a sparse error (e) due to the occlusion using $l^1$-minimization, wherein the identity of the test data y is recognized by the computer.

7. The method of claim 6, wherein the object of the test data y comprises a test voice or audio file.

8. The method of claim 6, wherein the object of the test data y comprises a test image that is partially occluded with a plurality of pixels, and wherein the plurality of training data files comprises a plurality of training images.

9. The method of claim 8, wherein expressing y as a sparse linear combination of A and e comprises:
   generating coefficients ($x_o$) such that $y = Ax_o + e$, wherein $e \in \mathfrak{R}^m$ comprises an error vector of non-zero entries in m space, and $x_o$ and e comprise simultaneous sparse representations of y through $l^1$-minimization, wherein non-zero entries of $e \in \mathfrak{R}^m$ lie on a set of size $\rho m$ corresponding to the occluded pixels, where m comprises the total number of pixels in the test image and $\rho$ comprises a fraction corresponding to the number of occluded pixels.

10. A computer-implemented method for recognition of high-dimensional data in the presence of occlusion, comprising:
    receiving by a computer a test data (y) that includes an occlusion and which identity is unknown, wherein the test data comprises a known object;
    partitioning by the computer a plurality of n training samples into k classes to produce a matrix $A=[A_1 \ldots A_k]$, wherein the object of the training samples is the same as that of the test data y;
    setting $B=[A_1 \ldots A_k I]$;
    computing $\hat{w}_1 = \arg\min_{w=[xe]} \|w\|_1$ such that $Bw = y$ by $l^1$ linear programming;
    for i=1: k, computing a residual $r_i \|y - A\delta_i(\hat{x}_1) - \hat{e}_1\|_2$; and
    outputting by the computer $\hat{i}(y) = \arg\min_{i=1,\ldots,k} r_i$ to assign y to a class whose coefficients best approximate it, thereby recognizing the identity of the test data y.

11. The method of claim 10, wherein the object of the test data y comprises a test voice or audio file.

12. The method of claim 10, wherein the object of the test data y comprises a test image that is at least partially occluded with a plurality of pixels, and wherein the plurality of n training samples comprises a plurality of training images.

13. The method of claim 10, wherein at least one class of the k classes of the n training samples comprises the test data y.

14. A system for recognition of high-dimensional data in the presence of occlusion, comprising:
    a processor coupled with a memory;
    a database coupled with the processor;
    a user interface to receive a target data that includes an occlusion and that is of an unknown class, wherein the target data comprises a known object;
    a feature extractor coupled with the database and the processor to sample a plurality of training data files comprising a plurality of distinct classes of the same object as that of the target data, wherein the database comprises the training data files;
    an $l^1$ minimizer coupled with the processor to linearly superimpose the sampled training data files using $l^1$ minimization; and
    a recognizer coupled with the $l^1$ minimizer to identify the class of the target data through use of the superimposed sampled training data files, wherein a linear superposition with a sparsest number of coefficients is used to identify the class of the target data.

15. The system of claim 14, wherein the $l^1$ minimizer executes an algorithm that includes $l^1$ minimization to remove the occlusion such that allows identification of the target data.

16. The system of claim 15, wherein the object of the target data comprises a test voice file and wherein the plurality of training data files comprise training voice files.

17. The system of claim 15, wherein the object of the target data comprises a test image (y) that is partially occluded with a plurality of pixels, and wherein the plurality of training data files comprises a plurality of training images.

18. The system of claim 17, wherein a single matrix (A) represents the sampled plurality of training images, the algorithm recovers a representation of the form $y=Ax_o+e$, wherein $x_o$ comprises a solution that yields the sparsest number of coefficients, and wherein $e \in \Re^m$ comprises a vector of errors including a sparse representation of y, wherein non-zero entries of $e \in \Re^m$ lie on a set of size $\rho m$ corresponding to the occluded pixels, where m comprises the total number of pixels in y, and $\rho$ comprises a fraction corresponding to the number of occluded pixels.

19. A system for recognition of high-dimensional data in the presence of occlusion, comprising:
- a processor coupled with a memory;
- a database coupled with the processor, the database including a plurality of n training samples;
- a user interface to receive a target data (y) that includes an occlusion and that is of an unknown class, wherein the target data comprises a known object;
- a feature extractor coupled with the processor and the database to partition a plurality of n training samples into k classes to produce a matrix $A=[A_1 \ldots A_k]$, wherein the object of the training samples is the same as that of the test data y, wherein the feature extractor sets $B=[A_1 \ldots A_k \, I]$;
- an $l^1$ minimizer coupled with the processor to:
  - compute $\hat{w}_1 = \arg\min_{w=[xe]} \|w\|_1$ such that $Bw=y$ by $l^1$ linear programming;
  - for i=1: k, compute a residual $r_i = \|y - A\delta_i(\hat{x}_1) - \hat{e}_1\|_2$; and
- a recognizer coupled with the $l^1$ linear minimizer to output $\hat{i}(y) = \arg\min_{i=1,\ldots,k} r_i$ and to assign y to a class whose coefficients best approximate it to thereby recognize the identity of the test data y.

20. The system of claim 19, wherein the object of the test data y comprises a test voice or audio file.

21. The system of claim 19, wherein the object of the test data y comprises a test image that is at least partially occluded with a plurality of pixels, and wherein the plurality of n training samples comprises a plurality of training images.

22. The system of claim 19, wherein at least one class of the k classes of the n training samples comprises the test data y.

* * * * *